United States Patent
Shionoya et al.

(10) Patent No.: US 11,716,545 B2
(45) Date of Patent: Aug. 1, 2023

(54) IMAGE CAPTURING DEVICE, IMAGE PROCESSING DEVICE AND DISPLAY DEVICE FOR SETTING DIFFERENT EXPOSURE CONDITIONS

(71) Applicant: NIKON CORPORATION, Tokyo (JP)

(72) Inventors: Takashi Shionoya, Koganei (JP); Toshiyuki Kanbara, Tokyo (JP); Naoki Sekiguchi, Yashio (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 17/027,161

(22) Filed: Sep. 21, 2020

(65) Prior Publication Data

US 2021/0037218 A1 Feb. 4, 2021

Related U.S. Application Data

(63) Continuation of application No. 15/765,129, filed as application No. PCT/JP2016/078280 on Sep. 26, 2016, now Pat. No. 10,810,716.

(30) Foreign Application Priority Data

Sep. 30, 2015 (JP) ................... 2015-194612

(51) Int. Cl.
*H04N 23/84* (2023.01)
*G06T 3/40* (2006.01)
(Continued)

(52) U.S. Cl.
CPC ......... *H04N 23/843* (2023.01); *G06T 3/4015* (2013.01); *G06T 5/002* (2013.01);
(Continued)

(58) Field of Classification Search
CPC ......... G06T 5/50; G06T 3/4015; G06T 5/002; H04N 5/36961; H04N 9/045; H04N 5/243;
(Continued)

(56) References Cited

U.S. PATENT DOCUMENTS 6,987,535 B1    1/2006 Matsugu et al.
2007/0285526 A1 12/2007 Mann et al.
(Continued)

FOREIGN PATENT DOCUMENTS

EP    2 640 065 A1    9/2013
JP    2000-209425 A    7/2000
(Continued)

OTHER PUBLICATIONS

Dec. 20, 2016 International Search Report issued in International Patent Application No. PCT/JP2016/078280.
(Continued)

*Primary Examiner* — Gevell V Selby
(74) *Attorney, Agent, or Firm* — Oliff PLC

(57) ABSTRACT

An image capturing device includes: an image capturing element having a first image capturing region that captures an image of a photographic subject and outputs a first signal, and a second image capturing region that captures an image of the photographic subject and outputs a second signal; a setting unit that sets an image capture condition for the first image capturing region to an image capture condition that is different from an image capture condition for the second image capturing region; a correction unit that performs correction upon the second signal, for employment in interpolation of the first signal; and a generation unit that generates an image of the photographic subject that has been captured by the first image capturing region by employing a (Continued)

signal generated by interpolating the first signal according to the second signal as corrected by the correction unit.

26 Claims, 29 Drawing Sheets

(51) Int. Cl.
| | |
|---|---|
| H04N 23/10 | (2023.01) |
| H04N 23/12 | (2023.01) |
| H04N 23/73 | (2023.01) |
| H04N 23/76 | (2023.01) |
| H04N 25/53 | (2023.01) |
| H04N 25/57 | (2023.01) |
| H04N 25/60 | (2023.01) |
| H04N 25/533 | (2023.01) |
| H04N 25/583 | (2023.01) |
| H04N 25/704 | (2023.01) |
| G06T 5/00 | (2006.01) |
| G06T 5/50 | (2006.01) |
| H04N 23/67 | (2023.01) |

(52) U.S. Cl.
CPC .............. *G06T 5/50* (2013.01); *H04N 23/10* (2023.01); *H04N 23/12* (2023.01); *H04N 23/73* (2023.01); *H04N 23/76* (2023.01); *H04N 25/53* (2023.01); *H04N 25/533* (2023.01); *H04N 25/57* (2023.01); *H04N 25/583* (2023.01); *H04N 25/60* (2023.01); *H04N 25/704* (2023.01); *H04N 23/67* (2023.01)

(58) Field of Classification Search
CPC ............. H04N 5/35554; H04N 5/2353; H04N 5/3535; H04N 5/357; H04N 5/353; H04N 5/355; H04N 5/232; H04N 9/07; H04N 5/23212
See application file for complete search history.

(56) References Cited

U.S. PATENT DOCUMENTS

| | | | |
|---|---|---|---|
| 2008/0284871 A1 | 11/2008 | Kobayashi | |
| 2010/0238343 A1 | 9/2010 | Kawarada | |
| 2014/0218594 A1 | 8/2014 | Hirose | |
| 2015/0077590 A1 | 3/2015 | Kuriyama et al. | |
| 2015/0117832 A1 | 4/2015 | Aoki et al. | |
| 2015/0207984 A1* | 7/2015 | Hamano | H04N 5/232123 |
| | | | 348/349 |
| 2016/0112644 A1 | 4/2016 | Nishi | |
| 2016/0219232 A1* | 7/2016 | Murata | H04N 5/232122 |
| 2016/0286104 A1 | 9/2016 | Murata | |
| 2016/0301847 A1 | 10/2016 | Okazawa | |
| 2016/0337578 A1* | 11/2016 | Kikuchi | H04N 5/23293 |
| 2017/0104943 A1 | 4/2017 | Toyoda | |
| 2019/0066271 A1* | 2/2019 | Kanbara | H04N 5/3535 |
| 2019/0182419 A1* | 6/2019 | Sekiguchi | H04N 5/23212 |
| 2020/0366862 A1* | 11/2020 | Tsuchiya | H04N 5/3745 |

FOREIGN PATENT DOCUMENTS

| | | |
|---|---|---|
| JP | 2006-197192 A | 7/2006 |
| JP | 2012-235332 A | 11/2012 |
| JP | 2015-092660 A | 5/2015 |
| WO | 2013/164915 A1 | 11/2013 |
| WO | 2014/192152 A1 | 12/2014 |
| WO | 2015/045375 A1 | 4/2015 |

OTHER PUBLICATIONS

Mar. 14, 2019 Search Report issued in European Patent Application No. 16851450.3.
Jun. 13, 2019 Office Action issued in U.S. Appl. No. 15/765,129.
Jun. 4, 2019 Office Action issued in Japanese Patent Application No. 2017-543261.
Jan. 7, 2020 U.S. Office Action issued U.S. Appl. No. 15/765,129.
Mar. 24, 2020 Office Action issued in Japanese Patent Application No. 2017-543261.
Apr. 3, 2020 Office Action issued in European Patent Application No. 16851450.3.
Jun. 17, 2020 Notice of Allowance Issued in U.S. Appl. No. 15/765,129.
Jul. 16, 2020 Notice of Allowance Issued in U.S. Appl. No. 15/765,129.
Sep. 7, 2021 Office Action issued in Japanese Patent Application No. 2020-108254.
Jun. 7, 2022 Decision of Refusal issued in Japanese Patent Application No. 2020-108254.
Jun. 7, 2022 Decision of Dismissal of Amendment issued in Japanese Patent Application No. 2020-108254.

* cited by examiner

IMAGE CAPTURING DEVICE, IMAGE PROCESSING DEVICE AND DISPLAY DEVICE FOR SETTING DIFFERENT EXPOSURE CONDITIONS

CROSS-REFERENCE TO RELATED APPLICATIONS

This is a Continuation of application Ser. No. 15/765,129, filed Mar. 30, 2018 (now U.S. Pat. No. 10,810,716), which in turn is a National Phase Application of PCT/JP2016/078280, filed Sep. 26, 2016, which claims the benefit of Japanese Patent Application No. 2015-194612, filed Sep. 30, 2015. The disclosure of each of the prior applications is hereby incorporated by reference herein in its entirety.

TECHNICAL FIELD

The present invention relates to an image capturing device, to an image processing device, and to a display device.

BACKGROUND ART

An image capturing device is per se known (refer to Patent Document #1) that is equipped with an imaging element that is capable of setting different image capture conditions for various regions of the screen. However, when processing captured image data that has been generated for several regions whose image capture conditions are different, no consideration has been accorded to the image capture conditions.

CITATION LIST

Patent Literature

Patent Document #1: Japanese Laid-Open Patent Publication 2006-197192.

SUMMARY OF INVENTION

According to a first aspect, an image capturing device comprises: an image capturing element having a first image capturing region that captures an image of a photographic subject and outputs a first signal, and a second image capturing region that captures an image of the photographic subject and outputs a second signal; a setting unit that sets an image capture condition for the first image capturing region to an image capture condition that is different from an image capture condition for the second image capturing region; a correction unit that performs correction upon the second signal outputted from the second image capturing region, for employment in interpolation of the first signal outputted from the first image capturing region; and a generation unit that generates an image of the photographic subject that has been captured by the first image capturing region by employing a signal generated by interpolating the first signal according to the second signal as corrected by the correction unit.

According to a second aspect, an image capturing device comprises: an image capturing element having a first image capturing region that captures an image of a photographic subject and outputs a first signal, and a second image capturing region that captures an image of the photographic subject and outputs a second signal; a setting unit that sets an image capture condition for the first image capturing region to an image capture condition that is different from an image capture condition for the second image capturing region; a correction unit that performs correction upon the second signal outputted from the second image capturing region, for employment in interpolation of a pixel in the first image capturing region that outputs the first signal; and a generation unit that generates an image of the photographic subject that has been captured by the first image capturing region by employing a signal generated by interpolating the pixel that outputs the first signal according to the second signal corrected by the correction unit.

According to a third aspect, an image capturing device comprises: an image capturing element having a first image capturing region that captures an image of a photographic subject and outputs a first signal, and a second image capturing region that captures an image of the photographic subject and outputs a second signal; a setting unit that sets an image capture condition for the first image capturing region to an image capture condition that is different from an image capture condition for the second image capturing region; a correction unit that performs correction upon the second signal outputted from the second image capturing region, for reducing noise included in the first signal outputted from the first image capturing region; and a generation unit that reduces noise included in the first signal by employing the second signal corrected by the correction unit, and generates an image of the photographic subject that has been captured by the first image capturing region.

According to a fourth aspect, an image capturing device comprises: an image capturing element having a first image capturing region that captures an image of a photographic subject and outputs a first signal, and a second image capturing region that captures an image of the photographic subject and outputs a second signal; a setting unit that sets an image capture condition for the first image capturing region to an image capture condition that is different from an image capture condition for the second image capturing region; a correction unit that performs correction upon the second signal outputted from the second image capturing region, for employment in image processing of the first signal outputted from the first image capturing region; and a generation unit that performs the image processing of the first signal by employing the second signal corrected by the correction unit, and generates an image of the photographic subject that has been captured by the first image capturing region.

According to a fifth aspect, an image capturing device comprises: an image capturing element having a first image capturing region that captures an image of a photographic subject and outputs a first signal, and a second image capturing region that captures an image of the photographic subject and outputs a second signal; a setting unit that sets an image capture condition for the first image capturing region and an image capture condition for the second image capturing region; a processing unit that, as processing to interpolate the first signal by employing the second signal outputted from the second image capturing region, performs different processing depending upon the image capture condition for the second image capturing region set by the setting unit; and a generation unit that generates an image of the photographic subject that has been captured by the first image capturing region, by employing a signal generated by interpolating the first signal by the processing unit.

According to a sixth aspect, an image capturing device comprises: an image capturing element having a first image capturing region that captures an image of a photographic subject and outputs a first signal, and a second image capturing region that captures an image of the photographic subject and outputs a second signal; a setting unit that sets an image capture condition for the first image capturing region to an image capture condition that is different from an image capture condition for the second image capturing region; a correction unit that corrects the first signal outputted from the first image capturing region, and performs correction upon the second signal outputted from the second image capturing region, for employment in interpolation of the corrected first signal; and a generation unit that generates an image of the photographic subject that has been captured by the first image capturing region by employing a signal generated by interpolating the first signal corrected by the correction unit according to the second signal corrected by the correction unit.

According to a seventh aspect, an image capturing device comprises: an image capturing element having a first image capturing region that captures an image of a photographic subject and outputs a first signal, and a second image capturing region that captures an image of the photographic subject and outputs a second signal; a setting unit that sets an image capture condition for the first image capturing region to an image capture condition that is different from an image capture condition for the second image capturing region; a correction unit that corrects the first signal outputted from the first image capturing region, and performs correction upon the second signal outputted from the second image capturing region, for employment in interpolation of a pixel that outputs the corrected first signal; and a generation unit that generates an image of the photographic subject that has been captured by the first image capturing region by employing a signal generated by interpolating the pixel that outputs the first signal corrected according to the second signal corrected by the correction unit.

According to an eighth aspect, an image processing device comprises: a correction unit that, for employment in interpolation of a first signal outputted from a first image capturing region of an image capturing element that captures an image of a photographic subject, performs correction upon a second signal outputted from a second image capturing region of the image capturing element for which an image capture condition is different from an image capture condition for the first image capturing region; and a generation unit that generates an image of the photographic subject that has been captured by the first image capturing region by employing a signal generated by interpolating the first signal according to the second signal corrected by the correction unit.

According to a ninth aspect, an image processing device comprises: a correction unit that, in order to reduce noise included in a first signal outputted from a first image capturing region of an image capturing element that captures an image of a photographic subject, performs correction upon a second signal outputted from a second image capturing region of the image capturing element for which an image capture condition is different from an image capture condition for the first image capturing region; and a generation unit that reduces noise included in the first signal by employing the second signal corrected by the correction unit and generates an image of the photographic subject that has been captured by the first image capturing region.

According to a tenth aspect, a display device comprises: a correction unit that, for employment in interpolation of a first signal outputted from a first image capturing region of an image capturing element that captures an image of a photographic subject, performs correction upon a second signal outputted from a second image capturing region of the image capturing element for which an image capture condition is different from an image capture condition for the first image capturing region; and a display unit that displays an image of the photographic subject that has been captured by the first image capturing region, generated by employing a signal generated by interpolating the first signal according to the second signal corrected by the correction unit.

According to a 11th aspect, a display device comprises: a correction unit that, for reducing noise included in a first signal outputted from a first image capturing region of an image capturing element that captures an image of a photographic subject, performs correction upon a second signal outputted from a second image capturing region of the image capturing element for which an image capture condition is different from an image capture condition for the first image capturing region; and a display unit that displays an image of the photographic subject that has been captured by the first image capturing region, generated by reducing noise included in the first signal by employing the second signal corrected by the correction unit.

According to a 12th aspect, an image capturing device comprises: an image capturing unit having a first region that captures incident light, and a second region, different from the first region, that captures incident light; a setting unit that sets an image capture condition for the first region so as to be different from an image capture condition for the second region; a correction unit that corrects first image data generated by capturing light incident upon the first region under the image capture condition set by the setting unit, based on the image capture condition for the second region set by the setting unit; and a generation unit that generates an image from the first image data corrected by the correction unit, and second image data generated by capturing light incident upon the second region.

According to a 13th aspect, an image capturing device comprises: an image capturing unit having a first region that captures incident light, and a second region, different from the first region, that captures incident light; a setting unit that sets an image capture condition for the first region so as to be different from an image capture condition for the second region; a correction unit that corrects first image data generated by capturing light incident upon the first region under the image capture condition set by the setting unit based on the image capture condition for the second region set by the setting unit, and that corrects second image data generated by capturing light incident upon the second region under the image capture condition set by the setting unit based on the image capture condition for the first region set by the setting unit; and a generation unit that generates an image from the first image data corrected by the correction unit, and the second image data corrected by the correction unit.

According to a 14th aspect, an image processing device comprises: a setting unit that sets an image capture condition for a first region of an image capturing unit so as to be different from an image capture condition for a second region of the image capturing unit; a correction unit that corrects first image data generated by capturing light incident upon the first region under the image capture condition set by the setting unit, based on the image capture condition for the second region set by the setting unit; and a generation unit that generates an image from the first image data corrected by the correction unit, and second image data generated by capturing light incident upon the second region.

According to a 15th aspect, an image processing device comprises: a setting unit that sets an image capture condition for a first region of an image capturing unit so as to be different from an image capture condition for a second region of the image capturing unit; a correction unit that corrects first image data generated by capturing light incident upon the first region under the image capture condition set by the setting unit based on the image capture condition for the second region set by the setting unit, and corrects second image data generated by capturing light incident upon the second region under the image capture condition set by the setting unit based on the image capture condition for the first region set by the setting unit; and a generation unit that generates an image from the first image data corrected by the correction unit, and the second image data generated by capturing light incident upon the second region.

According to a 16th aspect, a display device comprises: a setting unit that sets an image capture condition for a first region of an image capturing unit so as to be different from an image capture condition for a second region of the image capturing unit; a correction unit that corrects first image data generated by capturing light incident upon the first region under the image capture condition set by the setting unit, based on the image capture condition for the second region set by the setting unit; and a display unit that displays an image generated from the first image data corrected by the correction unit, and second image data generated by capturing light incident upon the second region.

According to a 17th aspect, a display device comprises: a setting unit that sets an image capture condition for a first region of an image capturing unit so as to be different from an image capture condition for a second region of the image capturing unit; a correction unit that corrects first image data generated by capturing light incident upon the first region under the image capture condition set by the setting unit based on the image capture condition for the second region set by the setting unit, and corrects second image data generated by capturing light incident upon the second region under the image capture condition set by the setting unit based on the image capture condition for the first region set by the setting unit; and a display unit that displays an image generated from the first image data corrected by the correction unit, and the second image data generated by capturing light incident upon the second region.

DESCRIPTION OF EMBODIMENTS

First Embodiment

As one example of an electronic device that is equipped with an image processing device according to a first embodiment of the present invention, a digital camera will now be explained. This camera 1 (refer to FIG. 1) is built so as to be capable of performing image capture under different conditions for each of a plurality of regions of the image capturing surface of its imaging element (or image capturing element) 32a. An image processing unit 33 performs respectively appropriate processing for each of the various regions whose image capture conditions are different. The details of a camera 1 of this type will now be explained with reference to the drawings.

Explanation of Camera

Figure 1:
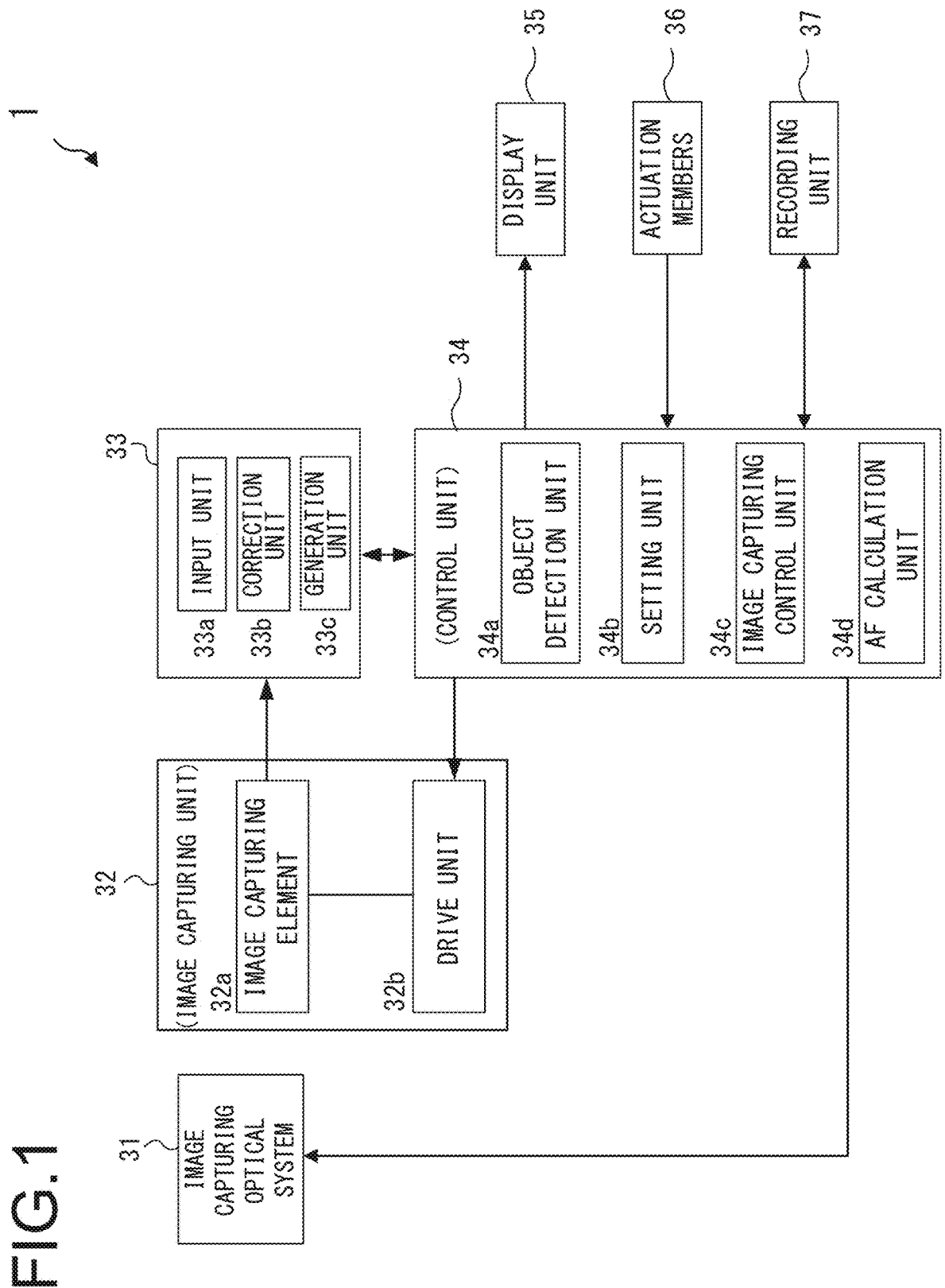
FIG. 1 is a block diagram showing an example of the structure of a camera according to a first embodiment.

FIG. 1 is a block diagram showing an example of the structure of the camera 1 according to this first embodiment. In FIG. 1, the camera 1 comprises an image capturing optical system 31, an image capturing unit (or an imaging unit) 32, the aforementioned image processing unit 33, a control unit 34, a display unit 35, actuation members 36, and a recording unit 37.

The image capturing optical system 31 conducts light flux from the photographic field to the imaging unit 32. This imaging unit 32 includes the imaging element 32a and a drive unit 32b, and photoelectrically converts an image of the photographic subject that has been formed by the image capturing optical system 31. The imaging unit 32 is capable of capturing the entire area of the image capturing surface of the imaging element 32a under the same conditions, and is also capable of capturing each of various regions of the image capturing surface of the imaging element 32a under conditions that are mutually different. The details of the imaging unit 32 will be described hereinafter. And the drive unit 32b generates a drive signal that is required for causing the imaging element 32a to perform charge accumulation control. Image capturing commands to the imaging unit 32 for charge accumulation time and so on are transmitted from the control unit 34 to the drive unit 32b.

The image processing unit 33 comprises an input unit 33a, a correction unit 33b, and a generation unit 33c. Image data acquired by the imaging unit 32 is inputted to the input unit 33a. The correction unit 33b performs pre-processing for correction of the image data that has been inputted as described above. The details of this pre-processing will be described hereinafter. And the generation unit 33c generates an image on the basis of the above described data that has been inputted and on the basis of the image data after pre-processing. Moreover, the generation unit 33c performs image processing upon the image data. This image processing may, for example, include color interpolation processing, pixel defect correction processing, contour emphasis processing, noise reduction processing, white balance adjustment processing, gamma correction processing, display brightness adjustment processing, saturation adjustment processing, and/or the like. Furthermore, the generation unit 33c generates an image for display by the display unit 35.

The control unit 34 is, for example, constituted of a CPU, and controls the overall operation of the camera 1. For example, the control unit 34 may perform predetermined exposure calculation on the basis of the photoelectrically converted signals acquired by the image capturing unit 32, thus determining exposure conditions required for the imaging element 32a to perform appropriate exposure, such as charge accumulation time (i.e. exposure time), an aperture value for the image capturing optical system 31, ISO sensitivities, and so on, and may send corresponding commands to the drive unit 32b. Furthermore, according to the scene imaging mode set on the camera 1 and/or the types of photographic subject elements that have been detected, the control unit 34 may determine image processing conditions for adjustment of saturation, contrast, sharpness, and so on, and may send corresponding commands to the image processing unit 33. This detection of photographic subject elements will be described hereinafter.

The control unit 34 comprises an object detection unit 34a, a setting unit 34b, an image capturing control unit 34c, and an AF calculation unit 34d. These units may be implemented in software by the control unit 34 executing a program stored in a non volatile memory not shown in the figures, or may be implemented with ASICs or the like.

From the image acquired by the image capturing unit 32, by performing per se known object recognition processing, the object detection unit 34a detects photographic subject elements such as people (i.e. human faces), animals such as dogs or cats or the like (i.e. animal faces), plants, vehicles such as bicycles, automobiles, trains or the like, stationary objects such as buildings, scenery elements such as mountains, clouds or the like, and/or objects whose specifications have been determined in advance. And the setting unit 34b divides the imaging screen at the image capturing unit 32 into a plurality of regions that include these photographic subject elements that have been detected as described above.

Furthermore, the setting unit 34b sets image capture conditions for each of this plurality of regions. Such image capture conditions may include the exposure conditions described above (charge accumulation time, ISO sensitivity, frame rate, and so on) and the image processing conditions described above (for example, a parameter for white balance adjustment, a gamma correction curve, a parameter for display brightness adjustment, a saturation adjustment parameter, and so on). It should be understood that it would be possible to set the same image capture conditions for all of the plurality of regions; or, alternatively, it would be also possible to set different image capture conditions for each different region of the plurality of regions.

The image capturing control unit 34c controls the image capturing unit 32 (i.e. the imaging element 32a) and the image processing unit 33 by applying the image capture conditions that have been set for each of the regions by the setting unit 34b. Due to this, it is possible to cause the image capturing unit 32 to perform image capture under exposure conditions that are different for each of the plurality of regions, and it is also possible to cause the image processing unit 33 to perform image processing under image processing conditions that are different for each of the plurality of regions. Any number of pixels may be included in each region; for example a region may include 1000 pixels, or a region may include only 1 pixel. Moreover, the numbers of pixels in different regions may be different.

The AF calculation unit 34d controls the automatic focus adjustment operation (auto-focus: AF) to a predetermined position upon the image capturing screen (hereinafter termed the focus detection position), so as to adjust the focus to the corresponding photographic subject. And, on the basis of the result of this calculation, the AF calculation unit 34d sends a drive signal to the drive unit 32b for shifting a focusing lens of the image capturing optical system 31 to an appropriate focusing position. The processing that the AF calculation unit 34d performs for automatic focus adjustment is termed "focus detection processing". The details of this focus detection processing will be described hereinafter.

The display unit 35 reproduces and displays images that have been generated by the image processing unit 33, images that have been image processed, images that have been read out by the recording unit 37, and so on. And the display unit 35 also displays an actuation menu screen, a setting screen for setting image capture conditions, and so on.

The actuation members 36 include actuation members of various types, such as a release button and a menu button and so on. And, corresponding to actuations of various types, the actuation members 36 send actuation signals to the control unit 34. The actuation members 36 also include a touch actuation member that is provided to a display surface of the display unit 35.

According to a command from the control unit 34, the recording unit 37 records image data and so on upon a recording medium consisting of a memory card or the like, not shown in the figures. Moreover, according to a command from the control unit 34, the recording unit 37 also reads out image data recorded upon the recording medium.

Explanation of the Laminated Type Imaging Element

Figure 2:
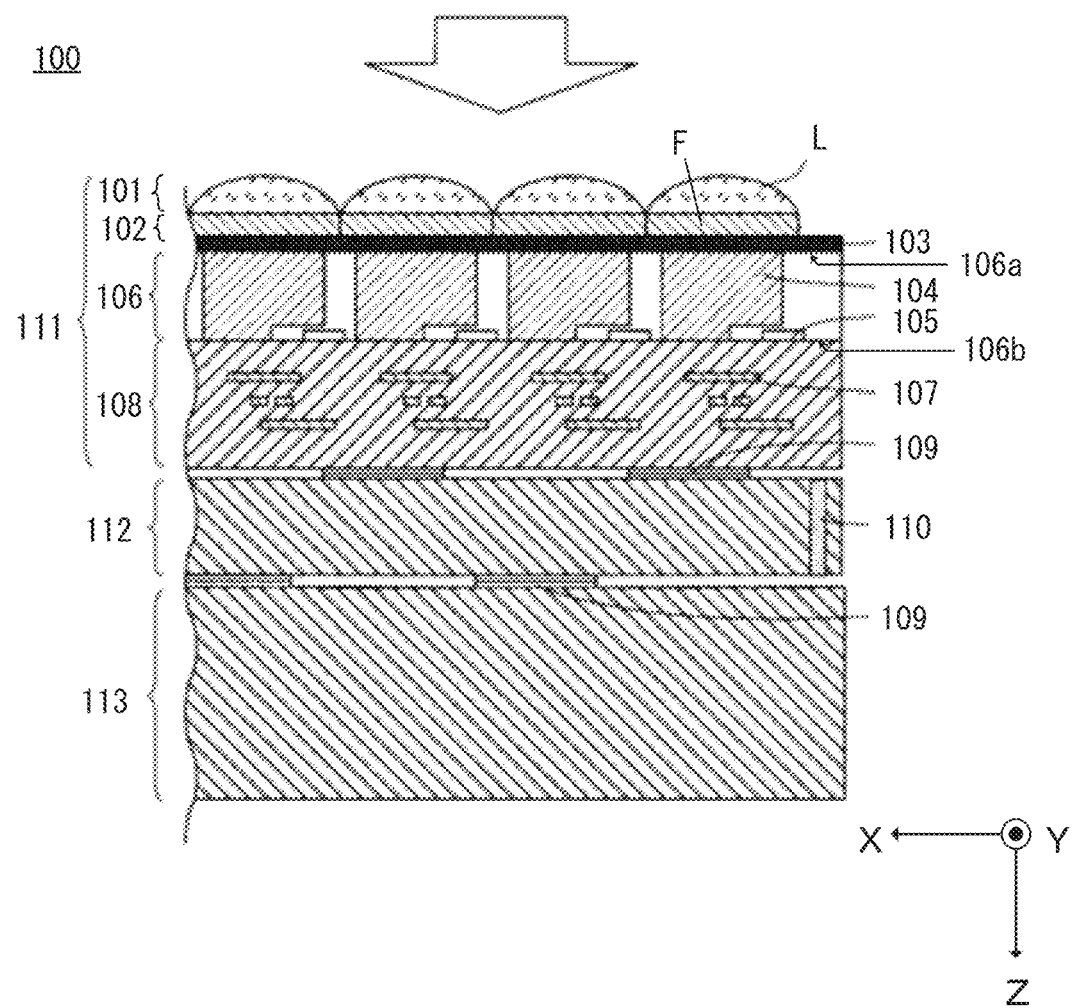
FIG. 2 is a sectional view of a laminated type imaging element.

As one example of the imaging element 32a described above, a laminated or stacked imaging element 100 will now be explained. FIG. 2 is a sectional view of this imaging element 100. The imaging element 100 comprises an image capturing chip 111, a signal processing chip 112, and a memory chip 113. The image capturing chip 111 is laminated to the signal processing chip 112. And the signal processing chip 112 is laminated to the memory chip 113. The image capturing chip 111 and the signal processing chip 112, and similarly the signal processing chip 112 and the memory chip 113, are electrically connected together by connecting portions 109. These connecting portions 109 may, for example, be bumps or electrodes. The image capturing chip 111 captures an optical image from the photographic subject, and generates image data. And the image capturing chip 111 outputs this image data to the signal processing chip 112 from the image capturing chip 111. The signal processing chip 112 performs signal processing on the image data outputted from the image capturing chip 111. Moreover, the memory chip 113 comprises a plurality of memories, and stores image data. It should be understood that it would also be acceptable for the imaging element 100 to comprise only an image capturing chip and a signal processing chip. If the imaging element 100 thus comprises only an image capturing chip and a signal processing chip, then a storage unit for storage of the image data may be provided at the signal processing chip, or may be provided separately from the imaging element 100.

As shown in FIG. 2, the incident light is mainly incident in the +Z axis direction, as shown by the white arrow sign. Moreover, as shown by the coordinate axes in the figure, the direction orthogonal to the Z axis and leftward on the drawing paper is taken as being the +X axis direction, and the direction orthogonal to both the Z axis and the X axis and toward the viewer from the drawing paper is taken as being the +Y axis direction. Coordinate axes are shown in some of the subsequent figures, so that the orientation of those figures with reference to the coordinate axes of FIG. 2 can be understood.

The image capturing chip 11 may, for example, be a CMOS image sensor. In concrete terms, the image capturing chip 111 may be a CMOS image sensor of the backside illumination type. The image capturing chip 111 comprises a micro-lens layer 101, a color filter layer 102, a passivation layer 103, a semiconductor layer 106, and a wiring layer 108. And, in the image capturing chip 111, the micro-lens layer 101, the color filter layer 102, the passivation layer 103, the semiconductor layer 106, and the wiring layer 108 are arranged in that order along the +Z axis direction.

The micro-lens layer 101 includes a plurality of micro-lenses L. The micro-lenses L condense the incident light onto photoelectric conversion units 104 that will be described hereinafter. The color filter layer 102 includes a plurality of color filters F. That is, the color filter layer 102 includes color filters F of a plurality of types having different spectral characteristics. In concrete terms, the color filter layer 102 includes first filters (R) that have the spectral characteristic of principally passing light having a red color component, second filters (Gb and Gr) that have the spectral characteristic of principally passing light having a green color component, and third filters (B) that have the spectral characteristic of principally passing light having a blue color component. In the color filter layer 102, for example, the first filters, the second filters, and the third filters may be arranged as a Bayer array. And the passivation layer 103 is formed as a nitride film or an oxide film, and protects the semiconductor layer 106.

The semiconductor layer 106 includes photoelectric conversion units 104 and readout circuits 105. In detail, the semiconductor layer 106 comprises a plurality of photoelectric conversion units 104 between its first surface 106a, which is its surface upon which light is incident, and its second surface 106b, which is its surface on the side opposite to the first surface 106. In the semiconductor layer 106, the plurality of photoelectric conversion units 104 are arranged along the X axis direction and along the Y axis direction. The photoelectric conversion units 104 are endowed with a photoelectric conversion function of converting light into electrical charge. Moreover, the photoelectric conversion units 104 accumulate the charges of these photoelectrically converted signals. The photoelectric conversion units 104 may, for example, be photo-diodes. The semiconductor layer 106 contains the readout circuits 105 in positions closer to its second surface 106b than the photoelectric conversion units 104. The readout circuits 105 are arranged in the semiconductor layer 106 along the X axis direction and the Y axis direction in the semiconductor layer 106. Each of the readout circuits 105 is built from a plurality of transistors, and reads out and outputs to the wiring layer 108 the image data generated by the charges that have been photoelectrically converted by the corresponding photoelectric conversion unit 104.

The wiring layer 108 comprises a plurality of metallic layers. The metallic layers may, for example, be Al wiring or Cu wiring or the like. Image data that has been read out by the readout circuits 105 is outputted via the wiring layer 108. This image data is outputted from the wiring layer 108 to the signal processing chip 112 via the connecting portions 109.

It should be understood that one of the connecting portions 109 may be provided for each of the photoelectric conversion units 104. Moreover, it would also be acceptable for each one of the connecting portions 109 to be provided to a group of the photoelectric conversion units 104. If each of the connection portions 109 is provided to a group of the photoelectric conversion units 104, then the pitch of the connecting portions 109 may be greater than the pitch of the photoelectric conversion units 104. Furthermore, the connecting portions 109 may be provided in a region that is peripheral to the region where the photoelectric conversion units 104 are disposed.

The signal processing chip 112 comprises a plurality of signal processing circuits. These signal processing circuits perform signal processing on the captured image data outputted from the image capturing chip 111. The signal processing circuits may, for example, be amplifier circuits that amplify the signal values of the captured image data, correlated double sampling circuits that perform noise reduction processing on the image data, analog/digital (A/D) conversion circuits that convert analog signals to digital signals, and so on. One of the signal processing circuits may be provided for each of the photoelectric conversion units 104.

Furthermore, each of the signal processing circuits may be provided to a group of the photoelectric conversion units 104. The signal processing chip 112 has a plurality of through electrodes or vias 110. These vias 110 may, for example, be through-silicon vias. The vias 110 connect circuits that are provided on the signal processing chip 112 to one another. The vias 110 may also be provided to the peripheral regions of the image capturing chip 111 and to the memory chip 113. It should be understood that it would also be acceptable to provide some of the elements included in the signal processing circuit on the image capturing chip 111. For example, in the case of the analog/digital circuit, a comparator that performs comparison of the input voltage to a reference voltage may be provided at the image capturing chip 111, and circuitry such as a counter circuit and/or a latch circuit and so on may be provided at the signal processing chip 112.

The memory chip 113 comprises a plurality of storage units. These storage units store image data that has been subjected to signal processing by the signal processing chip 112. The storage units may, for example, be volatile memories such as DRAMs or the like. One of the storage units may be provided for each of the photoelectric conversion units 104. Alternatively, each one of the storage units may be provided to a group of the photoelectric conversion units 104. The image data stored in the storage units is outputted to the image processing unit at a subsequent stage.

Figure 3:
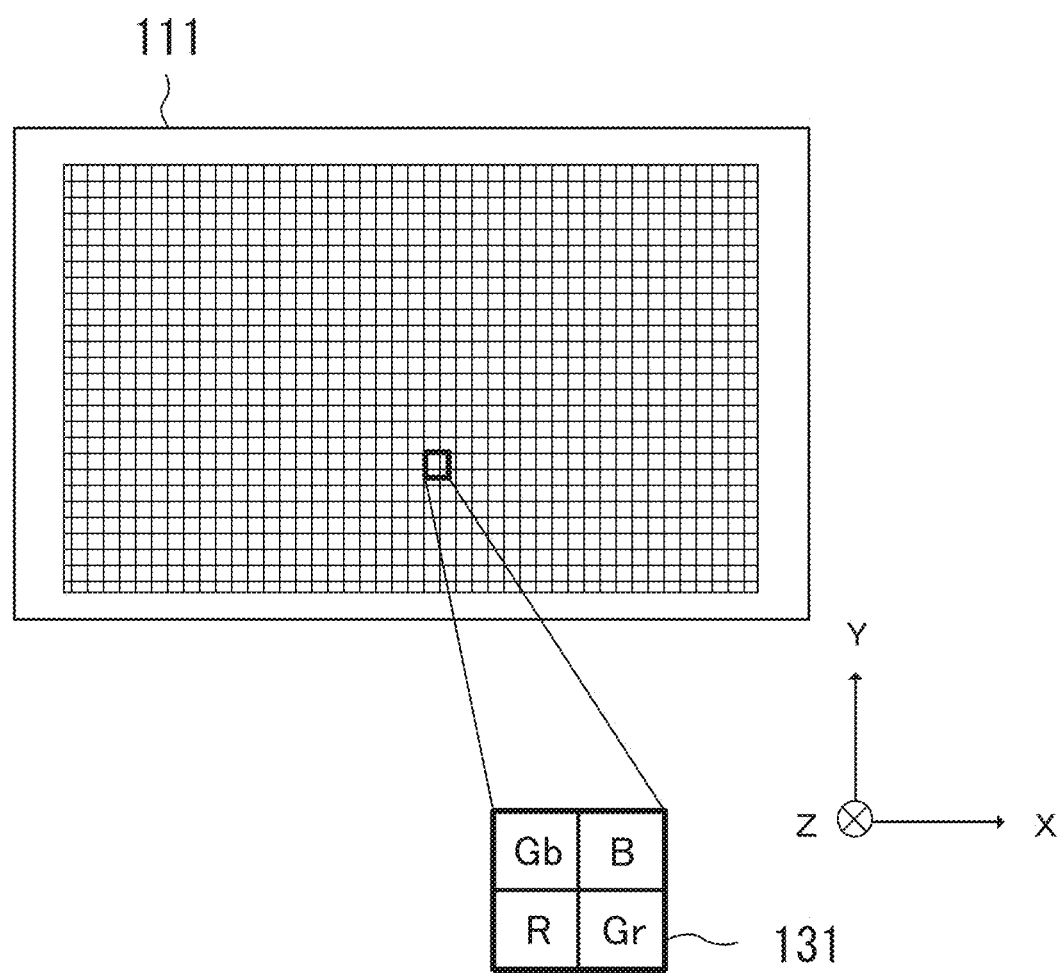
FIG. 3 is a figure for explanation of the arrangement of pixels upon an image capturing chip, and of unit regions thereof.

FIG. 3 is a figure for explanation of the arrangement of pixels on the image capturing chip 111, and for explanation of unit regions 131 thereof. In particular, this figure shows a situation in which the image capturing chip 111 is being viewed from its rear surface (i.e. from its image capturing surface). In the pixel region, for example, at least 20 million pixels may be arranged in the form of a matrix. In the FIG. 3 example, four adjacent pixels constitute a single unit region 131 that is 2 pixels×2 pixels. The lattice grid in the figure illustrates the concept that adjacent pixels are grouped together to form the unit regions 131. The number of pixels that constitute one unit region 131 is not limited to being four as above; it would be acceptable for this number to be around a thousand, for example for the unit region to be 32 pixels×32 pixels; and the number could be greater than that or less than that; the unit region could even be a single pixel.

As shown in the partial enlarged view of the pixel region, the unit region 131 in FIG. 3 is formed as a so-called Bayer array that consists of two green color pixels Gb and Gr, a blue color pixel B, and a red color pixel R. The green color pixels Gb and Gr are pixels that have green color filters as their color filters F, and that receive light of green color wavelength in the incident light. In a similar manner, the blue color pixels B are pixels that have blue color filters as their color filters F, and that receive light of blue color wavelength in the incident light, and the red color pixels R are pixels that have red color filters as their color filters F, and that receive light of red color wavelength in the incident light.

In this embodiment, a plurality of blocks are defined so that at least one of the unit regions 131 is included in each block. In other words, the minimum unit in each block is a single unit region 131. As described above, among the values that can be taken as the number of pixels forming a single unit region 131, the smallest number of pixels is a single pixel. Accordingly, if one block is defined in terms of pixel units, among the number of pixels that can define one block, the minimum number of pixels is a single pixel. The pixels that are included in one block can be controlled with control parameters that are different from another block. That is, in each block, all of the unit regions 131 within that block, in other words all of the pixels within that block, are controlled with the same image capture conditions. In other words, photoelectrically converted signals for which the image capture conditions are different can be acquired for the pixel group included in one block and for the pixel group included in a different block. Examples of control parameters are frame rate, gain, decimation ratio, number of rows or number of columns for adding the photoelectrically converted signals, charge accumulation time or accumulation number, number of bits for digitization (i.e. word length), and so on. The imaging element 100 not only can freely perform decimation in the row direction (i.e. in the X axis direction of the image capturing chip 111), but can also freely perform decimation in the column direction (i.e. in the Y axis direction of the image capturing chip 111). Furthermore, the control parameter may include parameters for the image processing.

Figure 4:
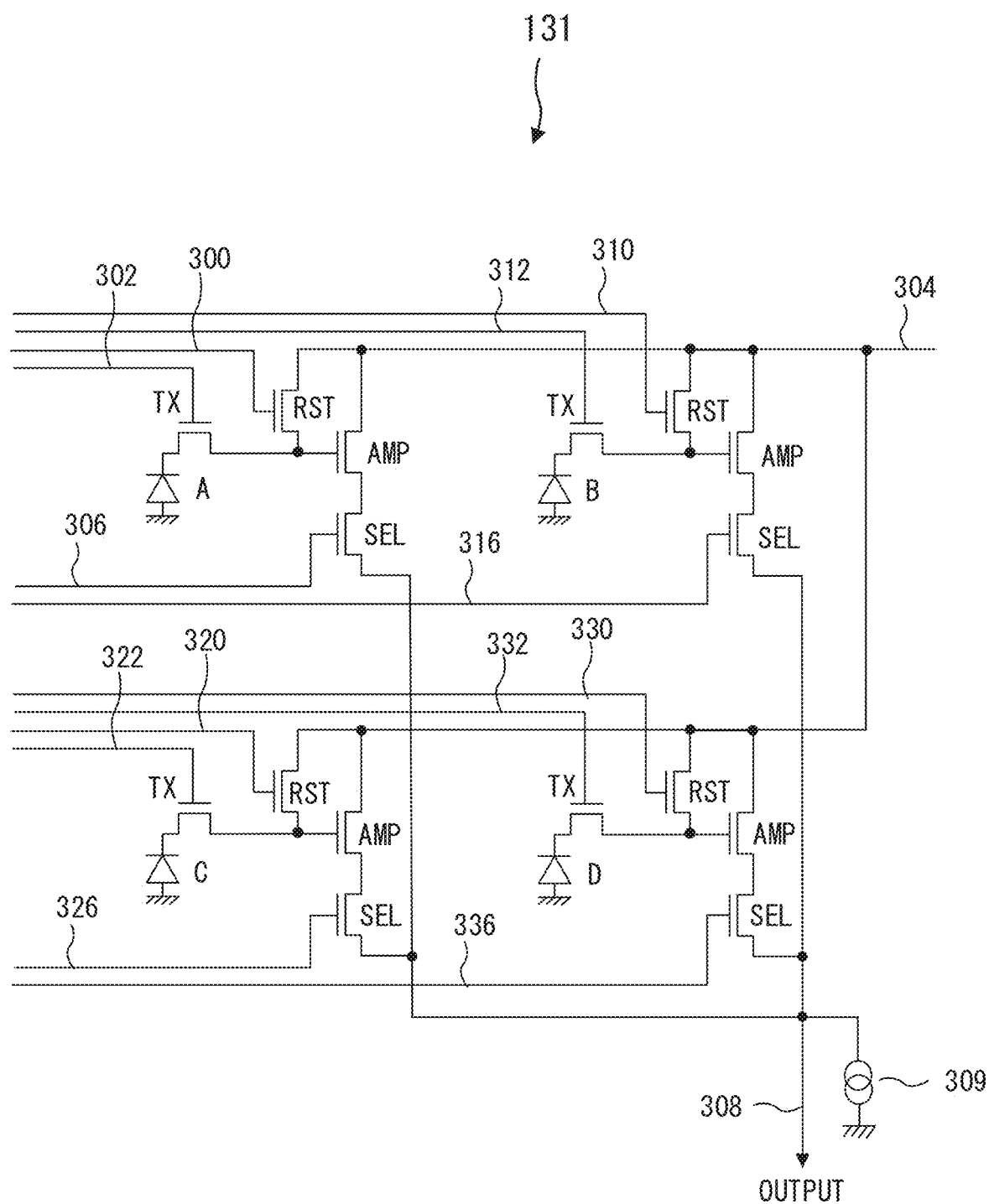
FIG. 4 is a figure for explanation of circuitry for one of the unit regions.

FIG. 4 is a figure for explanation of the circuitry for a single unit region 131. In the FIG. 4 example, a single unit region 131 consists of four adjacent pixels, that is 2 pixels×2 pixels. It should be understood that the number of pixels included in one unit region 131 is not limited to being four as above; it would be acceptable for this number to be a thousand or more, and at a minimum it could even be a single pixel. The two dimensional positions in the unit region 131 are designated in FIG. 4 by the reference symbols A through D.

Reset transistors (RST) of the pixels included in the unit region 131 are adapted to be capable of being turned on and off individually for each pixel. In FIG. 4, reset wiring 300 is provided for turning the reset transistor of the pixel A on and off, and reset wiring 310 for turning the reset transistor of the pixel B on and off is provided separately from the above described reset wiring 300. Similarly, reset wiring 320 for turning the reset transistor of the pixel C on and off is provided separately from the reset wiring 300 and the reset wiring 310. And, similarly, dedicated reset wiring 330 is also provided for turning the reset transistor of the other pixel D on and off.

Transfer transistors (TX) of the pixels included in the unit region 131 are also adapted to be capable of being turned on and off individually for each pixel. In FIG. 4, transfer wiring 302 for turning the transfer transistor of the pixel A on and off, transfer wiring 312 for turning the transfer transistor of the pixel B on and off, and transfer wiring 322 for turning the transfer transistor of the pixel C on and off are provided separately. And dedicated transfer wiring 332 is also provided for turning the transfer transistor of the other pixel D on and off.

Furthermore, selection transistors (SEL) of the pixels included in the unit region 131 are also adapted to be capable of being turned on and off individually for each pixel. In FIG. 4, selection wiring 306 for turning the selection transistor of the pixel A on and off, selection wiring 316 for turning the selection transistor of the pixel B on and off, and selection wiring 326 for turning the selection transistor of the pixel C on and off are provided separately. And dedicated selection wiring 336 is also provided for turning the selection transistor of the other pixel D on and off.

It should be understood that power supply wiring 304 is connected in common to all the pixels A through D included in the unit region 131. In a similar manner, output wiring 308 is connected in common to all the pixels A through D included in the unit region 131. Here, while the power supply wiring 304 is connected in common between a plurality of the unit regions, the output wiring 308 is provided separately for each of the unit regions 131. A load current source 309 supplies current to the output wiring 308. This load current source 309 may be provided at the image capturing chip 111, or may be provided at the signal processing chip 112.

By turning the reset transistors and the transfer transistors of the unit region 131 on and off individually, charge accumulation for the pixels A through D included in the unit region 131 can be controlled, with this control including their charge accumulation start timings, their charge accumulation end timings, and their transfer timings. Moreover, the photoelectrically converted signals from the pixels A through D can be outputted via the common output wiring 308 by turning the selection transistors of the unit region 131 individually on and off.

Here, a so called rolling shutter method is per se known for controlling charge accumulation by the pixels A through D included in the unit regions 131 in a regular sequence according to rows and columns. When columns are designated after pixels in each row are selected according to such a rolling shutter method, then, in the example of FIG. 4, the photoelectric conversion signals are outputted in the sequence "ABCD".

By constructing the circuitry based upon each of the unit regions 131 in this manner, the charge accumulation time for each unit region 131 can be individually controlled. To put it in another manner, photoelectrically converted signals at frame rates that are individually different for the respective unit regions 131 can be outputted. Furthermore, by performing charge accumulation (i.e. image capture) for the unit regions 131 that are included in a certain predetermined block on the image capturing chip 111, while idling the unit regions that are included in another block thereof, it is possible to perform image capture only for the certain predetermined block on the image capturing chip 111, and to output their photoelectrically converted signals. Yet further, it is also possible to output photoelectrically converted signals while changing over, between frames, the blocks for which charge accumulation (i.e. image capture) is performed (i.e. by changing over the blocks that are the subjects of charge accumulation control), thus performing image capture sequentially with different blocks of the image capturing chip 111.

As described above, the output wiring 308 is provided to correspond to each of the unit regions 131 individually. Since, in this imaging element 100, the image capturing chip 111, the signal processing chip 112, and the memory chip 113 are laminated together, accordingly, by employing electrical connections between the chips by using the connection portions 109 in the output wiring 308, it is possible to route the wiring without increasing the sizes of the chips in the surface direction.

Block Control of the Imaging Element

In this embodiment, the image capture conditions are settable individually for each of the plurality of blocks on the imaging element 32a. The control unit 34 (i.e. the image capturing control unit 34c) establishes correspondence between the plurality of regions described above and the blocks described above, and performs image capture for each region under the image capture conditions that have been set for that region.

Figure 5:
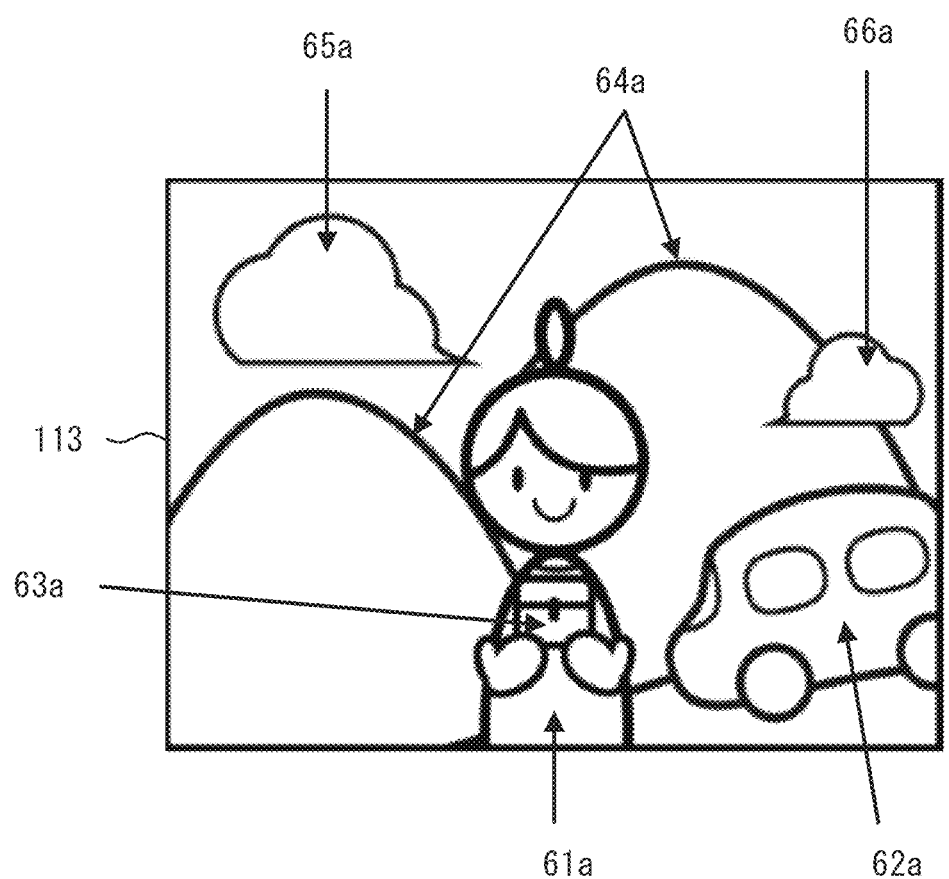
FIG. 5 is a figure schematically showing an image of a photographic subject that is focused upon the imaging element of the camera.

FIG. 5 is a figure schematically showing an image of a photographic subject that has been formed on the image capturing element 32a of the camera 1. Before the image capture command is executed, the camera 1 acquires a live view image by photoelectrically converting the image of the photographic subject. The term "live view image" refers to an image for monitoring that is repeatedly captured at a predetermined frame rate (for example at 60 fps).

Before the division into regions by the setting unit 34b, the control unit 34 sets the same image capture conditions for the entire area of the image capturing chip 111 (in other words, for the entire imaging screen). Here, the term "the same image capture conditions" refers to image capture conditions that are set in common for the entire imaging screen. The conditions in which, for example, the apex values vary by less than approximately 0.3 levels may be considered to be the same. These image capture conditions that are set to be the same over the entire area of the image capturing chip 111 are determined on the basis of exposure conditions corresponding to the photometric value of the luminance of the photographic subject, or on the basis of exposure conditions that have been set manually by the user.

In FIG. 5, an image that includes a person 61a, an automobile 62a, a bag 63a, mountains 64a, and clouds 65a and 66a is shown as formed on the image capturing surface of the image capturing chip 111. The person 61a is holding the bag 63a with both hands. And the automobile 62a is stopped behind the person 61a and to her right.

Division into Regions

On the basis of the live view image, the control unit 34 divides the screen of the live view image into a plurality of regions in the following manner. First, elements of the photographic subject are detected from the live view image by the object detection unit 34a. This detection of the photographic subject elements employs a per se known photographic subject recognition technique. In the example of FIG. 5, the object detection unit 34a detects the person 61a, the automobile 62a, the bag 63a, the mountains 64a, and the clouds 65a and 66a as photographic subject elements.

Next, the live view image screen is subdivided by the setting unit 34b into regions that include the photographic subject elements described above. The explanation of this embodiment will suppose that a region including a person 61a is defined as being a region 61, a region including an automobile 62a is defined as being a region 62, a region including a bag 63a is defined as being a region 63, a region including mountains 64a is defined as being a region 64, a region including a cloud 65a is defined as being a region 65, and a region including a cloud 66a is defined as being a region 66.

Setting of the Image Capture Conditions for Each Block

Figure 6:
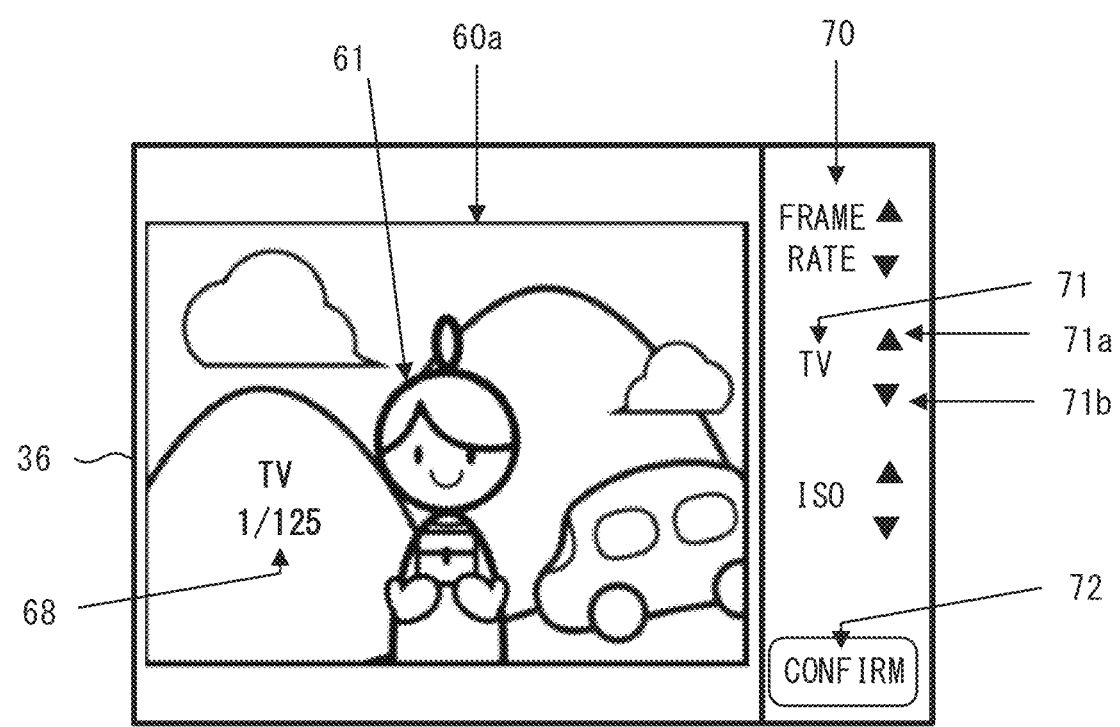
FIG. 6 is a figure showing an example of an image capture conditions setting screen.

When the screen has been divided into a plurality of regions by the setting unit 34*b*, the control unit 34 causes the display unit 35 to display a setting screen like the example shown in FIG. 6. FIG. 6 shows display of a live view image 60*a*, and moreover an image capture conditions setting screen 70 is displayed to the right of the live view image 60*a*.

On the setting screen 70, as an example of image capture conditions setting items, frame rate, shutter speed (TV), and gain (ISO) are shown listed in that order from the top. The frame rate is the number of frames of the live view image acquired in one second, or the number of frames of a moving video image recorded by the camera 1 in one second. The gain is ISO sensitivity. In addition to the image capture condition setting items shown in the FIG. 6 example, other suitable setting items may be included as appropriate. If all the setting items cannot be fitted into the setting screen 70, then it will be acceptable to arrange for the other setting items to be displayed by scrolling the setting items up and down.

In this embodiment, among the regions that have been divided by the setting unit 34*b*, the control unit 34 takes a region that has been selected by the user as the subject of setting (or changing) its image capture conditions. For example, in the case of this camera 1 that is capable of being operated by touch actuation, the user may perform tapping actuation on the display surface of the display unit 35, on which the live view image 60*a* is being displayed, at the position where the image of the main photographic subject, for which he wishes to set (or change) the image capture conditions, is being displayed. If, for example, tapping actuation has been performed by the user on the position where the image of the person 61*a* is being displayed, then the control unit 34 takes the region 61 in the live view image 60*a* that includes the person 61*a* as being the subject region for setting (or for changing) the image capture conditions, and also accentuates the display of the contour of the region 61.

In FIG. 6, the region 61 whose contour is displayed as accentuated (by being displayed with a thick outline, by being displayed as brighter, by being displayed with its color altered, by being displayed as surrounded by a broken line, by being displayed as blinking, or the like) indicates the region that is the subject of setting (or changing) its image capture conditions. In the example of FIG. 6, it will be supposed that the live view image 60*a* is being displayed with the contour of the region 61 accentuated. In this case, the region 61 is the subject of setting (or of changing) its image capture conditions. For example when, in the case of this camera 1 that is capable of being operated by touch actuation, tapping actuation is performed by the user on the display 71 of shutter speed (TV), then the control unit 34 causes the currently set value of shutter speed for the region that is being displayed as accentuated (i.e. for the region 61) to be displayed within the screen (as shown by a reference symbol 68).

In the following description, the explanation will suppose that the camera 1 is operated by touch actuation, but it would also be acceptable to arrange for setting (or changing) of the image capture conditions to be performed by actuation of one or more buttons included in the actuation members 36 or the like.

When tapping actuation is performed by the user on an upper icon 71*a* or on a lower icon 71*b* for shutter speed (TV), the setting unit 34*b* increases or decreases the displayed value 68 of shutter speed from its currently set value according to this tapping actuation, and also sends a command to the image capturing unit 32 (refer to FIG. 1) so as to cause the image capturing unit 32 to change the image capture conditions for the unit regions 131 (refer to FIG. 3) of the imaging element 32*a* that correspond to the region that is currently being displayed as accentuated (i.e. for the unit regions of the region 61), according to the above described tapping actuation. A confirm icon 72 is an actuation icon for confirming the image capture conditions that have been set. And, in a similar manner to the case of setting (or changing) the shutter speed (TV), the setting unit 34*b* also performs setting (or changing) of the frame rate and of the gain (ISO).

Although in the above explanation a case has been described in which the setting unit 34*b* performs setting of the image capture conditions on the basis of actuation by the user, it should be understood that this feature is not intended to be limitative. It will also be acceptable to arrange for the setting unit 34*b* not to set the image capture conditions on the basis of actuation by the user, but according to decision by the control unit 34. For example, if blown-out highlights or blocked-up shadows take place in a region of the image that includes a photographic subject element for which the luminance is maximum or minimum, then it will be acceptable to arrange for the setting unit 34*b* to set the image capture conditions so as to eliminate such blown-out highlights or blocked-up shadows, according to decision by the control unit 34.

For the regions that are not displayed as accentuated (i.e. the regions other than the region 61), the set image capture conditions are maintained without alteration.

Instead of displaying as accentuated the contour of the region that is the subject of setting (or of changing) its image capture conditions, it would also be acceptable to arrange for the control unit 34 to display that entire subject region with its brightness increased, or to display that entire subject region with its contrast increased, or to display that entire subject region as blinking. Moreover, it would also be acceptable to surround the subject region with a frame. Such a frame that is displayed as surrounding the subject region may be a double frame or a single frame, and the display style for such a surrounding frame, such as its line type, its color, its brightness, or the like, may be varied as appropriate. Furthermore, it would also be acceptable to arrange for the control unit 34 to provide, in the neighborhood of the subject region, a display of an arrow sign or the like that indicates that this is the region that is the subject of image capture conditions setting. It would also be acceptable to arrange for the control unit 34 to display the regions other than the subject region that is the subject of image capture conditions setting (or changing) as darkened, or to display such regions other than the subject region with their contrast reduced.

After the image capture conditions for each region have been set as explained above, when a release button not shown in the figures that is included in the actuation members 36 is actuated, or when a display that commands the start of image capture (such as a shutter release icon) is actuated, image capture is performed under the image capture conditions that were respectively set for the above described subdivided regions, by the imaging unit 32 controlled by the control unit 34. And the image processing unit 33 performs image processing upon the image data that has been acquired by the imaging unit 32. As described above, this image processing may be performed under image processing conditions that are different for each of the regions.

In response to a command from the control unit 34 after the above described image processing by the image processing unit 33, the recording unit 37 records the image data after image processing upon a recording medium constituted of a memory card or the like, not shown in the figures. After this, the image capture processing terminates.

Correction Processing

As described above, in this first embodiment, it is arranged that, after the regions on the image capture screen have been subdivided by the setting unit 34b, the image capture conditions can be set (or changed) for a region selected by the user, or for a region determined by the control unit 34. If different image capture conditions are set for the different subdivided regions, the control unit 34 will perform the following correction processing as necessary.

1. When Performing Image Processing

In the case in which the image processing to be performed on the image data acquired by applying the image capture conditions that are different for each of the subdivided regions is predetermined image processing, then, as pre-processing for the image processing, the image processing unit 33 (i.e. the correction unit 33b) performs correction processing on the image data that is positioned in the vicinity of boundary regions. The predetermined image processing is processing for calculating image data for a position for attention in the image that is the subject for processing with reference to image data of a plurality of reference positions surrounding the position for attention, and for example may include pixel defect correction processing, color interpolation processing, contour emphasis processing, noise reduction processing, and so on.

Correction processing is performed in order to alleviate discontinuity generated in the image after the image processing, originating in the fact that the image capture conditions are different between the different subdivided regions. In general, if the position for attention is located in the vicinity of a boundary between divided regions, both of image data to which the same image capture conditions as those for the image data at the position of attention have been applied, and image data to which different image capture conditions from those for the image data at the position of attention have been applied, may be present at a plurality of reference positions around the position for attention. In this embodiment, rather than calculating the image data for the position for attention by referring to the image data for the reference positions to which different image capture conditions have been applied just as it is without alteration, correction processing is performed as will now be described, based upon the consideration that it is more desirable to calculate the image data at the position for attention by referring to image data at the reference positions on which correction processing has been performed in order to suppress variance between sets of image data caused by the different image capture conditions.

Figure 7A:
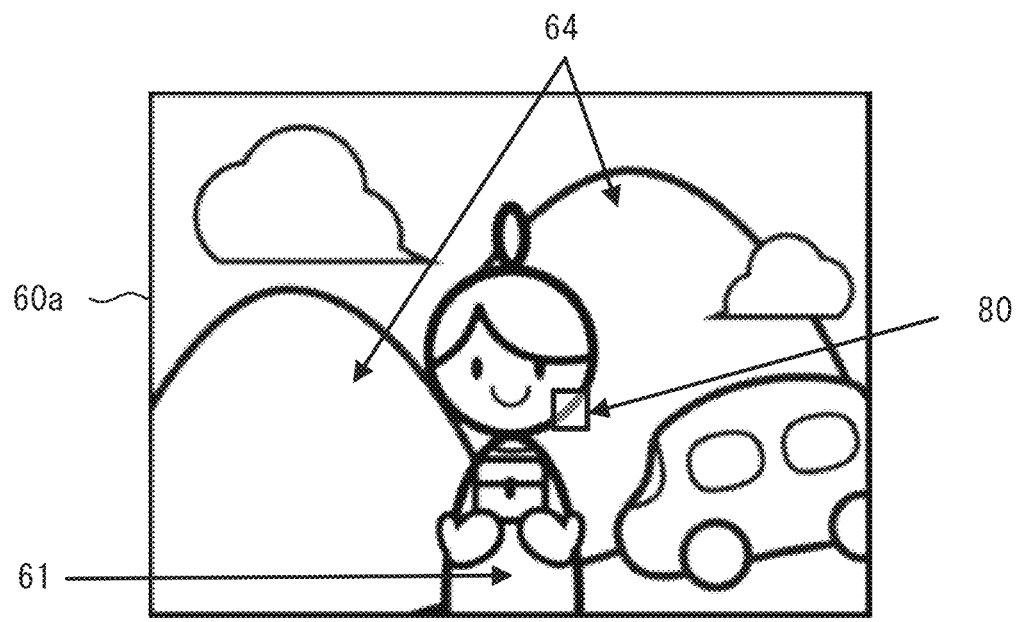
FIG. 7A is a figure showing an example of the neighborhood of a boundary of a first region in a live view image.
Figure 7B:
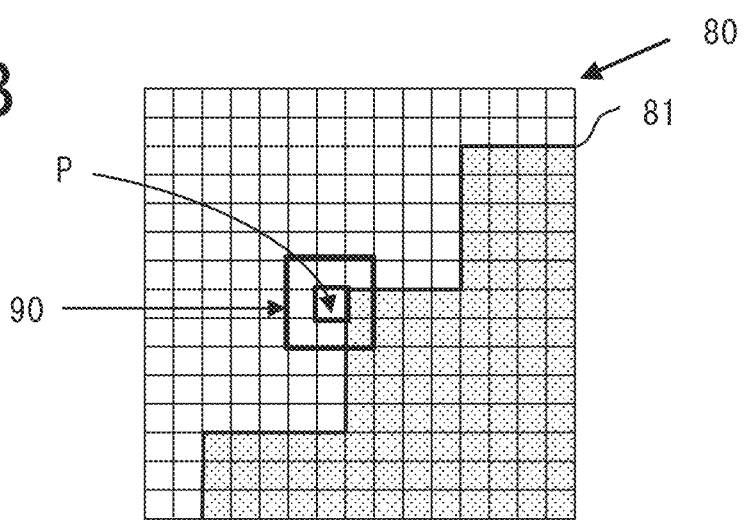
FIG. 7B is a figure showing the neighborhood of the boundary in an enlarged view.
Figure 7C:
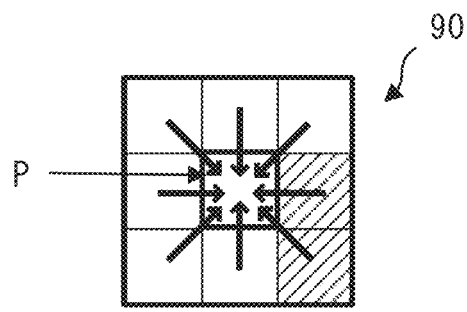
FIG. 7C is an enlarged view of a pixel for attention and of reference pixels.

FIG. 7A is a figure showing an example of a region 80 in the live view image 60a in the vicinity of a boundary between the region 61 and the region 64. In this example, it will be supposed that first image capture conditions are set to the region 61 that includes at least one person, and that second image capture conditions are set to the region 64 that includes mountains. And FIG. 7B is a figure showing the region 80 of FIG. 7A in the vicinity of the boundary in an enlarged view. Image data from pixels in the imaging element 32a corresponding to the region 61 for which the first image capture conditions are set is shown with a white background, while image data from pixels in the imaging element 32a corresponding to the region 64 for which the second image capture conditions are set is shown by shading. In FIG. 7B, the image data from the pixel for attention P in the region 61 is located in the vicinity of the boundary 81 between the region 61 and the region 64, in other words at their boundary portion. Pixels (in this example, eight pixels) that are included in a predetermined range 90 around the pixel for attention P (in this example, this range is 3×3 pixels in size) centered upon that pixel for attention P are taken as being reference pixels. Moreover, FIG. 7C is an enlarged view of the pixel for attention P and its reference pixels. The position of the pixel for attention P is the position for attention, and the positions of the reference pixels surrounding the pixel for attention P are the reference positions.

Normally, the image processing unit 33 (i.e. the generation unit 33c) performs image processing by referring directly to the image data of the reference pixels just as it is, without performing any correction processing. However, if the image capture conditions that were applied to the pixel for attention P (which are referred to as the first image capture conditions) and the image capture conditions that were applied to reference pixels surrounding the pixel for attention P (which are referred to as the second image capture conditions) are different, then the correction unit 33b performs correction processing as shown by the following Examples #1 through #3 on the image data for which the second image capture conditions were applied among the image data for the reference pixels. And the generation unit 33c performs image processing for calculating image data for the pixel for attention P by referring to the reference pixels after correction processing. In FIG. 7C, the image data outputted from the pixels shown with white background is image data that has been captured under the first image capture conditions, while the image data outputted from the pixels shown by shading is image data that has been captured under the second image capture conditions.

Example #1

If, for example, the only difference between the first image capture conditions and the second image capture conditions is the ISO sensitivity, with the ISO sensitivity of the first image capture conditions being 100 while the ISO sensitivity of the second image capture conditions is 800, then the image processing unit 33 (i.e. the correction unit 33b) performs multiplication by 100/800 as the correction processing for the image data that has been captured under the second image capture conditions in the image data for the reference pixels. By doing this, variance between the sets of the image data caused by the different image capture conditions is reduced.

Although the variance in the image data is small if the amount of light incident upon the pixel for attention P and the amounts of light incident upon the reference pixels are the same, it should be understood that, if originally the amount of incident light on the pixel for attention P and the amounts of incident light on the reference pixels are different, the variance in the image data may not become small. The same is the case in the examples described hereinafter.

Example #2

If, for example, the only difference between the first image capture conditions and the second image capture conditions is the shutter speed, with the shutter speed of the first image capture conditions being $1/1000$ sec. while the shutter speed of the second image capture conditions is $1/100$ sec., the image processing unit 33 (i.e. the correction unit 33b) performs multiplication by $1/1000 / 1/100 = 1/10$ as the correction processing for the image data, among the image data for the reference pixels, that has been captured under the second image capture conditions. By doing this, discrepancy in the image data caused by the different image capture conditions is reduced.

Example #3

If, for example, the only difference between the first image capture conditions and the second image capture conditions is the frame rate (with the charge accumulation times being equal), with the frame rate of the first image capture conditions being 30 fps while the frame rate of the second image capture conditions is 60 fps, the image processing unit 33 (i.e. the correction unit 33b), as correction processing, employs the image data of those frame images whose acquisition start timings are closest to those of the frame images that were acquired under the first image capture conditions (i.e. 30 fps) in place of the image data that has been captured under the second image capture conditions (i.e. at 60 fps) in the image data for the reference pixels. By doing this, variance in the image data due to difference in the image capture conditions is reduced.

It should be understood that it would also be acceptable to perform correction processing in which interpolation calculation of the image data of frame images whose acquisition start timings are close to those of the frame images that were acquired under the first image capture conditions (i.e. at 30 fps) on the basis of a plurality of previous and subsequent frame images acquired under the second image conditions (i.e. at 60 fps).

On the other hand, if the image capture conditions that were applied to the pixel for attention P (here supposed to be the first image capture conditions) and the image capture conditions that were applied to all of the reference pixels surrounding the pixel for attention P (here supposed to be the second image capture conditions) are the same, then the image processing unit 33 (i.e. the correction unit 33b) does not perform any correction processing upon the image data for the reference pixels. In other words, the generation unit 33c performs image processing for calculation of the image data of the pixel for attention P by referring to the image data for the reference pixels just as it is without alteration.

It should be understood that, as mentioned above, even if there are relatively insubstantial differences in the image capture conditions, they are considered as being the same image capture conditions Examples of Image Processing Examples of image processing accompanied by correction processing will now be described.

(1) Pixel Defect Correction Processing

In this embodiment, pixel defect correction processing is one type of image processing that is performed at the time of image capture. Generally, in the image capturing element 32a that is a solid-state image sensor, one or more pixel defects may occur during the process of manufacture or after manufacture, so that some data having anomalous levels may be outputted. Accordingly the image processing unit 33 (i.e. the generation unit 33c) is adapted, by correcting the image data outputted from those pixels for which pixel defects have occurred, to ensure that the image data at the pixel positions at which pixel defects have occurred does not stand out conspicuously.

An example of such pixel defect correction processing will now be explained. The image processing unit 33 (i.e. the generation unit 33c) may, for example, take a pixel in the image of one frame that is positioned at a pixel defect that is recorded in advance in a non-volatile memory (not shown in the figures) as being a pixel for attention P (i.e. as a pixel to be the subject of processing), and may take pixels (in this example, eight pixels) around the periphery of the pixel for attention P that are included in a predetermined range 90 (for example 3×3 pixels) centered on the pixel for attention P as being reference pixels.

The image processing unit 33 (i.e. the generation unit 33c) calculates the maximum values and the minimum values of the image data for the reference pixels, and, if the image data outputted from the pixel for attention P is outside the limits of the maximum value and the minimum value, performs so-called "Max, Min" filter processing to replace the image data outputted from the pixel for attention P with the above described maximum value or minimum value. This type of processing is performed for all of the pixel defects for which position information is recorded in the non-volatile memory (not shown in the figures).

In this embodiment, if some pixels to which the second image capture conditions have been applied that are different from the first image capture conditions applied to the pixel for attention P are included in the reference pixels described above, then the image processing unit 33 (i.e. the correction unit 33b) performs correction processing on the image data to which the second image capture conditions were applied. Subsequently, the image processing unit 33 (i.e. the generation unit 33c) performs the "Max, Min" filter processing described above.

(2) Color Interpolation Processing

In this embodiment, color interpolation processing is one type of image processing that is performed at the time of image capture. As shown in the example of FIG. 3, in the image capturing chip 111 of the imaging element 100, green color pixels Gb and Gr, blue color pixels B, and red color pixels R are arranged in a Bayer array. Since there is a lack of the image data of the color component that is different from the color component of the color filter F disposed at a corresponding pixel position, accordingly, by referring to the image data for surrounding pixel positions, the image processing unit 33 (i.e. the generation unit 33c) performs color interpolation processing in order to generate image data of the color component that is lacking.

Figures 8A, 8B, 8C:
FIG. 8A is a figure showing an example of an arrangement of photoelectrically converted signals outputted from the pixels.
FIG. 8B is a figure for explanation of interpolation of the G color component.
FIG. 8C is a figure showing an example of the image data for the G color component after interpolation.

An example of such color interpolation processing will now be explained. FIG. 8A is a figure showing an example of the arrangement of image data outputted from the imaging element 32a. Corresponding to each pixel position, this arrangement has color components of each of the colors R, G, and B, according to the Bayer array rule.

G Color Interpolation

First, the usual G color interpolation will be explained. In performing the G color interpolation, the image processing unit 33 (i.e. the generation unit 33c) takes the positions of the R color component and the B color component in order as positions for attention, and generates image data for the G color component at these positions for attention by referring to four items of G color component image data at four reference positions around these positions for attention. When, for example, generating image data for the G color component at the position for attention shown by the thick frame in FIG. 8B (at the second row and the second column, counting from the upper left position, and subsequently the position of attention is specified by counting in a similar manner from the upper left position), the four G color component image data items G1 through G4 positioned in the neighborhood of the position for attention (at the second row and the second column) are referred to. For example, the image processing unit 33 (i.e. the generation unit 33c) may take the value (aG1+bG2+cG3+dG4)/4 as being the image data for the G color component at the position for attention (i.e. at the second row and the second column). It should be understood that "a" through "d" here are weighting coefficients that are provided to correspond to the distances between the reference positions and the position for attention, and to the structure of the image.

Next, the G color interpolation in this embodiment will be explained. In FIGS. 8A to 8C, it will be supposed that the first image capture conditions are applied to the region that is leftward of and above the thick line, while the second image capture conditions are applied to the region that is rightward of and below the thick line. And it should be understood that, in FIGS. 8A through 8C, the first image capture conditions and the second image capture conditions are different from one another. Moreover, the image data items G1 through G4 of the G color component in FIG. 8B are reference positions for the image processing for the pixel at the position for attention (at the second row and the second column). In FIG. 8B, the first image capture conditions are applied at the position for attention (at the second row and the second column). And, among the reference positions, the first image capture conditions are applied to the image data items G1 through G3. However, among the reference positions, the second image capture conditions are applied to the image data item G4. Due to this, the image processing unit 33 (i.e. the generation unit 33c) performs correction processing on the image data item G4. And subsequently the image processing unit 33 (i.e. the generation unit 33c) calculates the image data of the G color component at the position for attention (at the second row and the second column).

By generating image data of the G color component at each of the positions of the B color component and at each of the positions of the R color component in FIG. 8A, the image processing unit 33 (i.e. the generation unit 33c) is able to obtain image data of the G color component at each of the pixel positions, as shown in FIG. 8C.

R Color Interpolation

Figure 9A:
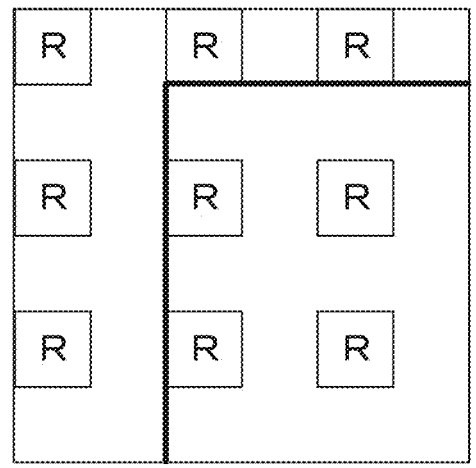
FIG. 9A is a figure in which the image data of the R color component has been extracted from FIG. 8A.

FIG. 9A is a figure in which the image data of the R color component has been extracted from FIG. 8A. The image processing unit 33 (i.e. the generation unit 33c) calculates the image data of the color difference component Cr shown in FIG. 9B on the basis of the image data for the G color component shown in FIG. 8C and the image data for the R color component shown in FIG. 9A.

First, the usual interpolation of the color difference component Cr will be explained. When, for example, generating image data for the color difference component Cr at the position for attention shown by the thick frame (at the second row and the second column) in FIG. 9B, the image processing unit 33 (i.e. the generation unit 33c) refers to the four items of image data Cr1 through Cr4 of the color difference component positioned in the neighborhood of the position for attention (at the second row and the second column). For example, the image processing unit 33 (i.e. the generation unit 33c) may take the value (eCr1+fCr2+gCr3+hCr4)/4 as being the image data for the color difference component Cr at the position for attention (i.e. at the second row and the second column). It should be understood that "e" through "h" here are weighting coefficients that are provided to correspond to the distances between the reference positions and the position for attention, and to the structure of the image.

Figure 9B:
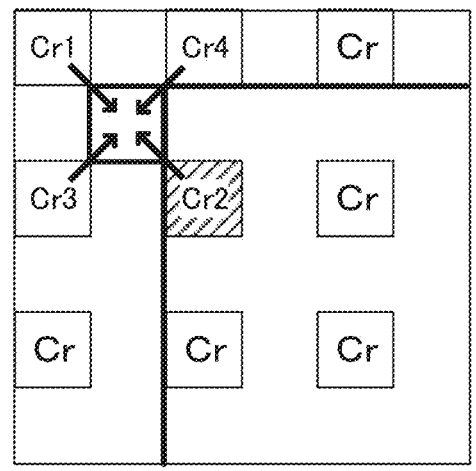
FIG. 9B is a figure for explanation of interpolation of the color difference component Cr.
Figure 9C:
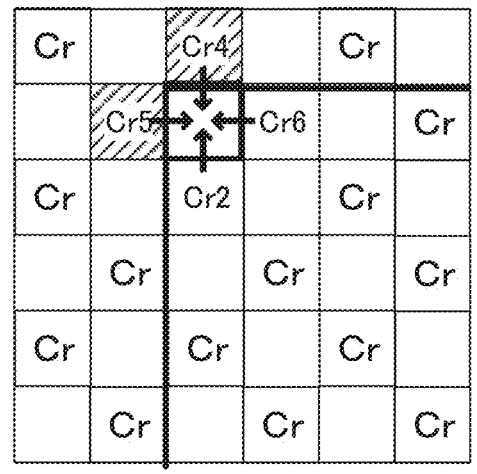
FIG. 9C is a figure for explanation of interpolation of the image data of the color difference component Cr.

In a similar manner, when, for example, generating image data for the color difference component Cr at the position for attention shown by the thick frame in FIG. 9C (at the second row and the third column), the image processing unit 33 (i.e. the generation unit 33c) refers to the four items of image data Cr2 and Cr4 through Cr6 of the color difference component positioned in the neighborhood of the position for attention (at the second row and the third column). For example, the image processing unit 33 (i.e. the generation unit 33c) may take the value (qCr2+rCr4+sCr5+tCr6)/4 as being the image data for the color difference component Cr at the position for attention (at the second row and the third column). It should be understood that "q" through "t" here are weighting coefficients that are provided to correspond to the distances between the reference positions and the position for attention, and to the structure of the image. In this manner, image data for the color difference component Cr is generated for all the pixel positions.

Next, the interpolation of the color difference component Cr in this embodiment will be explained. In FIGS. 9A through 9C, for example, it is supposed that the first image capture conditions are applied to the region that is leftward of and above the thick line, while the second image capture conditions are applied to the region that is rightward of and below the thick line. It should be understood that, in FIGS. 9A through 9C, the first image capture conditions and the second image capture conditions are different from one another. In FIG. 9B, the position shown by the thick frame (at the second row and the second column) is the position for attention of the color difference coefficient Cr. Moreover, the image data items Cr1 through Cr4 for the color difference component in FIG. 9B are reference positions for performing image processing upon the pixel at the position for attention (at the second row and the second column). In FIG. 9B, the first image capture conditions are applied at the position for attention (at the second row and the second column). Among the reference positions, the first image capture conditions are applied to the image data items Cr1, Cr3, and Cr4. Moreover, among the reference positions, the second image capture conditions are applied to the image data item Cr2. Due to this, the image processing unit 33 (i.e. the correction unit 33b) performs correction processing on the image data item Cr2. And subsequently the image processing unit 33 (i.e. the generation unit 33c) calculates the image data of the color difference component Cr at the position for attention (i.e. at the second row and the second column).

Furthermore, in FIG. 9C, the position shown by the thick frame (at the second row and the third column) is the position for attention of the color difference coefficient Cr. Moreover, the image data items Cr2, Cr4, Cr5, and Cr6 for the color difference component in FIG. 9C are reference positions for performing image processing on the pixel at the position for attention (at the second row and the third column). In FIG. 9C, the second image capture conditions are applied to the position for attention (at the second row and the third column). And, among the reference positions, the first image capture conditions are applied to the image data items Cr4 and Cr5. Moreover, among the reference positions, the second image capture conditions are applied to the image data items Cr2 and Cr6. Because of this, the image processing unit 33 (i.e. the correction unit 33b) performs correction processing on the image data items Cr4 and Cr5. And subsequently the image processing unit 33 (i.e. the generation unit 33c) calculates the image data of the color difference component Cr at the position for attention (at the second row and the third column).

After the image processing unit 33 (i.e. the generation unit 33c) has obtained the image data of the color difference component Cr at each pixel position, it then is able to obtain the image data for the R color component at each pixel position by adding the image data for the G color component shown in FIG. 8C corresponding to each pixel position.

B Color Interpolation

Figure 10A:
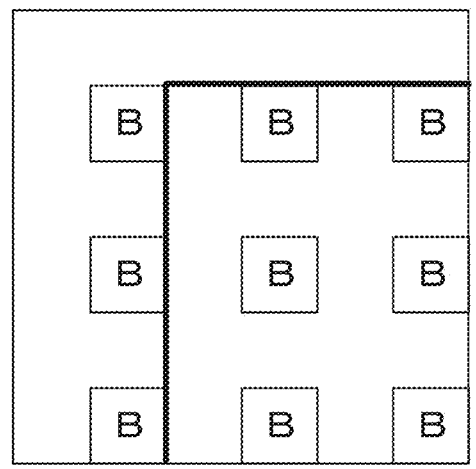
FIG. 10A is a figure in which the image data of the B color component has been extracted from FIG. 8A.

FIG. 10A is a figure in which the image data of the B color component has been extracted from FIG. 8A. The image processing unit 33 (i.e. the generation unit 33c) calculates the image data of the color difference component Cb shown in FIG. 10B on the basis of the image data for the G color component shown in FIG. 8C and the image data for the B color component shown in FIG. 10A.

First, the usual interpolation of the color difference component Cb will be explained. When, for example, generating image data for the color difference component Cb at the position for attention shown by the thick frame (at the third row and the third column) in FIG. 10B, the image processing unit 33 (i.e. the generation unit 33c) refers to the four items of image data Cb1 through Cb4 of the color difference component positioned in the neighborhood of the position for attention (at the third row and the third column). For example, the image processing unit 33 (i.e. the generation unit 33c) may take the value (uCb1+vCb2+wCb3+xCb4)/4 as being the image data for the color difference component Cb at the position for attention (at the third row and the third column). It should be understood that "u" through "x2 here are weighting coefficients that are provided to correspond to the distances between the reference positions and the position for attention, and to the structure of the image.

Figure 10B:
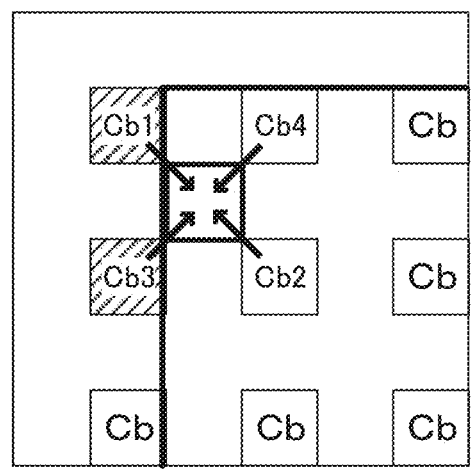
FIG. 10B is a figure for explanation of interpolation of the color difference component Cb.
Figure 10C:
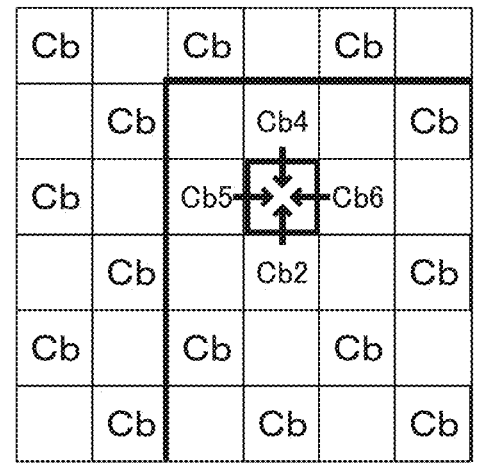
FIG. 10C is a figure for explanation of interpolation of the image data of the color difference component Cb.

In a similar manner, when, for example, generating image data for the color difference component Cb at the position for attention shown by the thick frame in FIG. 10C (at the third row and the fourth column), the image processing unit 33 (i.e. the generation unit 33c) refers to the four items of image data Cb2 and Cb4 through Cb6 of the color difference component positioned in the neighborhood of the position for attention (at the third row and the fourth column). For example, the image processing unit 33 (i.e. the generation unit 33c) may take the value (yCb2+zCb4+αCb5+βCb6)/4 as being the image data for the color difference component Cb at the position for attention (at the third row and the fourth column). It should be understood that y, z, α, and β here are weighting coefficients that are provided to correspond to the distances between the reference positions and the position for attention, and to the structure of the image. In this manner, image data for the color difference component Cb is generated for all the pixel positions.

Next, the interpolation of the color difference component Cb in this embodiment will be explained. In FIGS. 10A through 10C, for example, it is supposed that the first image capture conditions are applied to the region that is leftward of and above the thick line, while the second image capture conditions are applied to the region that is rightward of and below the thick line. It should be understood that, in FIGS. 10A through 10C, the first image capture conditions and the second image capture conditions are different from one another. In FIG. 10B, the position shown by the thick frame (at the third row and the third column) is the position for attention of the color difference component Cb. Moreover, the image data items Cb1 through Cb4 for the color difference component in FIG. 10B are reference positions for performing image processing on the pixel at the position for attention (at the third row and the third column). In FIG. 10B, the second image capture conditions are applied at the position for attention (at the third row and the third column). And, among the reference positions, the first image capture conditions are applied to the image data items Cb1 and Cb3. Moreover, among the reference positions, the second image capture conditions are applied to the image data items Cb2 and Cb4. Because of this, the image processing unit 33 (i.e. the correction unit 33b) performs correction processing on the image data items Cb1 and Cb3. And subsequently the image processing unit 33 (i.e. the generation unit 33c) calculates the image data of the color difference component Cb at the position for attention (the third row and the third column).

Furthermore, in FIG. 10C, the position shown by the thick frame (at the third row and the fourth column) is the position for attention of the color difference coefficient Cb. Moreover, the image data items Cb2 and Cb4 through Cb6 for the color difference component in FIG. 10C are the reference positions for performing image processing upon the pixel at the position for attention (at the third row and the fourth column). In FIG. 10C, the second image capture conditions are applied to the position for attention (at the third row and the fourth column). And the second image capture conditions are applied to the image data items Cb2 and Cb4 through Cb6 at all the reference positions. Due to this, the image processing unit 33 (i.e. the generation unit 33c) calculates the image data for the color difference component Cb at the position for attention (at the third row and the fourth column) by referring to the image data items Cb2 and Cb4 through Cb6 at the reference positions, without any correction processing being performed by the image processing unit 33 (i.e. by the correction unit 33b).

After having obtained the image data of the color difference component Cb at each pixel position, the image processing unit 33 (i.e. the generation unit 33c) is able to obtain the image data for the B color component at each pixel position by adding the image data shown in FIG. 8C for the G color component corresponding to each pixel position.

It should be understood that although, in the "G color interpolation" described above, when for example generating image data for the G color component at the position for attention shown by the thick frame in FIG. 8B (at the second row and the second column), reference is made to the four image data items G1 through G4 of the G color component that are positioned in the neighborhood of the position for attention, it would also be acceptable to arrange to vary the number of image data items of the G color component with reference to the structure of the image. For example, if the image in the neighborhood of the position for attention has the similarity in the vertical direction (for example, if it is a pattern of vertical stripes), then the interpolation processing may be performed by using only the image data above and below the position for attention (i.e., only G1 and G2 in FIG. 8B). Moreover, if for example the image in the neighborhood of the position for attention has the similarity in the horizontal direction (for example, if it is a pattern of horizontal stripes), then the interpolation processing may be performed by using only the image data on the left and the right of the position for attention (i.e., only G3 and G4 in FIG. 8B). In these cases, the image data item G4 upon which correction is performed by the correction unit 33b may be, or may not be used.

(3) Contour Emphasis Processing

An example of the contour emphasis processing will now be explained. In the image for one frame, for example, the image processing unit 33 (i.e. the generation unit 33c) may perform a per se known linear filter calculation by employing a kernel of a predetermined size that is centered on the pixel for attention P (i.e. on the pixel that is the subject of processing). If the size of the kernel of the sharpening filter, which is an example of a linear filter, is N×N pixels, and the position of the pixel for attention P is the position for attention, then the positions of the (N²−1) reference pixels surrounding the pixel for attention P are the reference positions.

It should be understood that it would also acceptable for the size of the kernel to be N×M pixels.

The image processing unit 33 (i.e. the generation unit 33c) performs filter processing to replace the image data at the pixel for attention P with the result of the linear filter calculation, while shifting the pixel for attention from left to right along successive horizontal lines, for example from the horizontal line at the upper portion of the frame image toward the horizontal line at the lower portion thereof.

In this embodiment, if a pixel to which second image capture conditions have been applied that are different from the first image capture conditions that were applied to the pixel for attention P is included in the reference pixels described above, then the image processing unit 33 (i.e. the correction unit 33b) performs correction processing upon the image data to which the second image capture conditions have been applied. And subsequently the image processing unit 33 (i.e. the generation unit 33c) performs the linear filter processing described above.

(4) Noise Reduction Processing

An example of noise reduction processing will now be explained. In the image for one frame, the image processing unit 33 (i.e. the generation unit 33c) may perform, for example, a per se known linear filter calculation by employing a kernel of a predetermined size that is centered on the pixel for attention P (i.e. on the pixel that is the subject of processing). If the size of the kernel of the smoothing filter, which is an example of a linear filter, is N×N pixels, and the position of the pixel for attention P is the position for attention, then the positions of the (N²−1) reference pixels surrounding the pixel for attention P are the reference positions.

It should be understood that it would also acceptable for the size of the kernel to be N×M pixels.

The image processing unit 33 (i.e. the generation unit 33c) performs filter processing to replace the image data at the pixel for attention P with the result of linear filter calculation, while shifting the pixel for attention from left to right along successive horizontal lines, for example from the horizontal line at the upper portion of the frame image toward the horizontal line at the lower portion thereof.

In this embodiment, if a pixel to which the second image capture conditions have been applied that are different from the first image capture conditions applied to the pixel for attention P is included in the above described reference pixels, then the image processing unit 33 (i.e. the correction unit 33b) performs correction processing on the image data to which the second image capture conditions have been applied. And subsequently the image processing unit 33 (i.e. the generation unit 33c) performs the linear filter processing described above.

2. When Performing Focus Detection Processing

The control unit 34 (i.e. the AF calculation unit 34d) performs focus detection processing by employing signal data (i.e. image data) corresponding to a predetermined position (the focus detection position) in the image capturing screen. If different image capture conditions are set for different ones of the divided regions, and the focus detection position for AF operation is positioned at a boundary portion between these subdivided regions, then, as pre-processing for the focus detection processing, the control unit 34 (i.e. the AF calculation unit 34d) performs correction processing on the signal data for focus detection from at least one of those regions.

This correction processing is performed in order to suppress the reduction of the accuracy of focus detection processing that might originate due to the image capture conditions being different for different regions in the image capturing screen divided by the setting unit 34b. For example, if the signal data for focus detection at the focus detection position at which the amount of image deviation (i.e. the phase difference) in the image is detected is positioned near a boundary between the subdivided regions, then signal data to which different image capture conditions have been applied may be mixed together in the signal data for focus detection. In this embodiment, rather than performing detection of the amount of image deviation (i.e. of the phase difference) by employing the signal data to which different image capture conditions have been applied just as it is without alteration, correction processing as described below is performed, on the basis of the consideration that it is more desirable to perform detection of the amount of image deviation (i.e. of the phase difference) by employing signal data on which correction processing has been performed, so as to suppress any discrepancy in the signal data due to variation of the image capture conditions.

Example of Focus Detection Processing

An example of such focus detection processing accompanied by correction processing will now be described. In the AF operation according to this embodiment, for example, the focus is adjusted to a photographic subject that corresponds to a focus detection position that is selected by the user from among a plurality of focusing points in the image capturing screen. The control unit 34 (i.e. the AF calculation unit 34d (the generation unit)) calculates the amount of defocusing of the image capturing optical system 31 by detecting the amount of image deviation (i.e. the phase difference) of a plurality of images of the photographic subject formed by the light fluxes having passed through different pupil regions of the image capturing optical system 31. And the control unit 34 (i.e. the AF calculation unit 34d) shifts a focusing lens of the image capturing optical system 31 to a position that makes the amount of defocusing become zero (or less than some permitted value), in other words to its focusing position.

Figure 11:
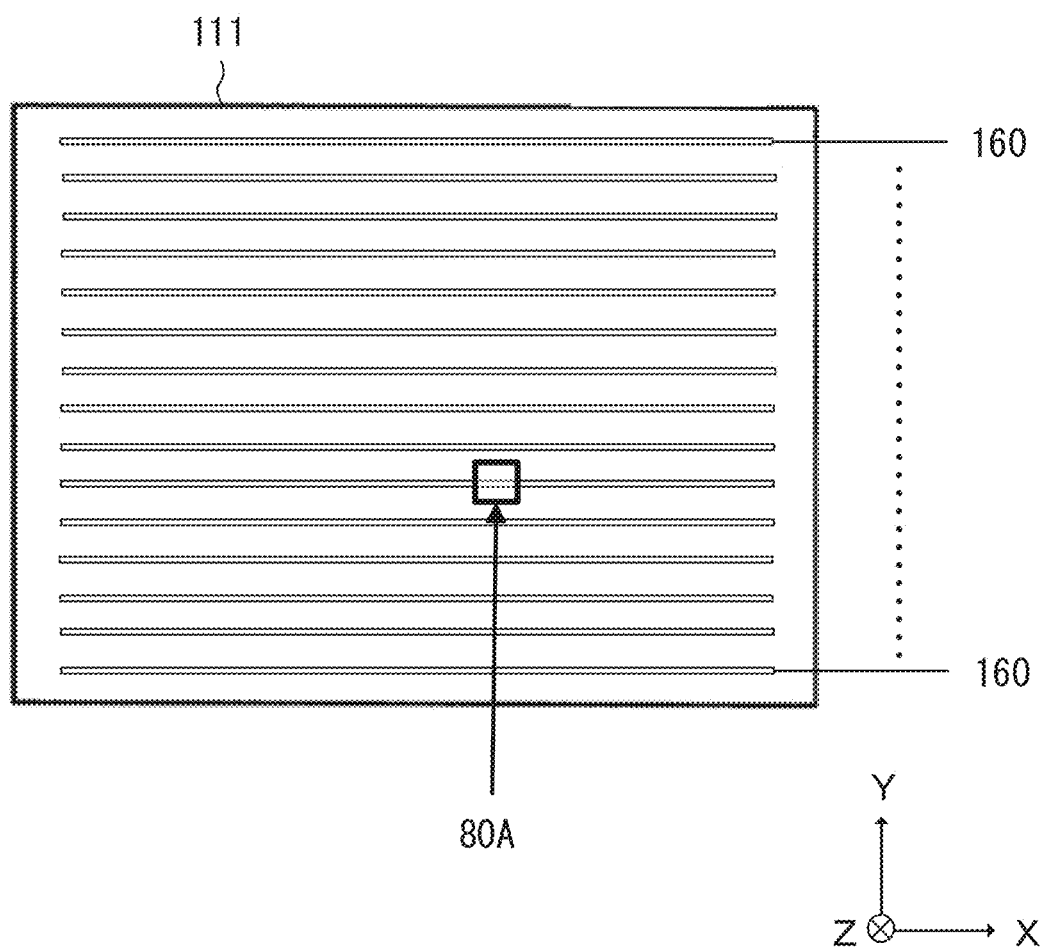
FIG. 11 is a figure showing an example of the positioning of pixels for focus detection upon the image capturing surface.

FIG. 11 is a figure showing an example of positioning of pixels for focus detection in the image capturing surface of the imaging element 32a. In this embodiment, pixels for focus detection are provided separately as lined up along the X axis direction (i.e. the horizontal direction) of the image capturing chip 111. In the example of FIG. 11, fifteen focus detection pixel lines 160 are provided, spaced apart at predetermined intervals. Each of the pixels for focus detection that make up these focus detection pixel lines 160 outputs a photoelectrically converted signal for focus detection. Normal pixels for image capturing are provided in the image capturing chip 111 at positions other than those of the focus detection pixel lines 160. These pixels for image capturing output photoelectrically converted signals for provision of a live view image, and/or for recording.

Figure 12:
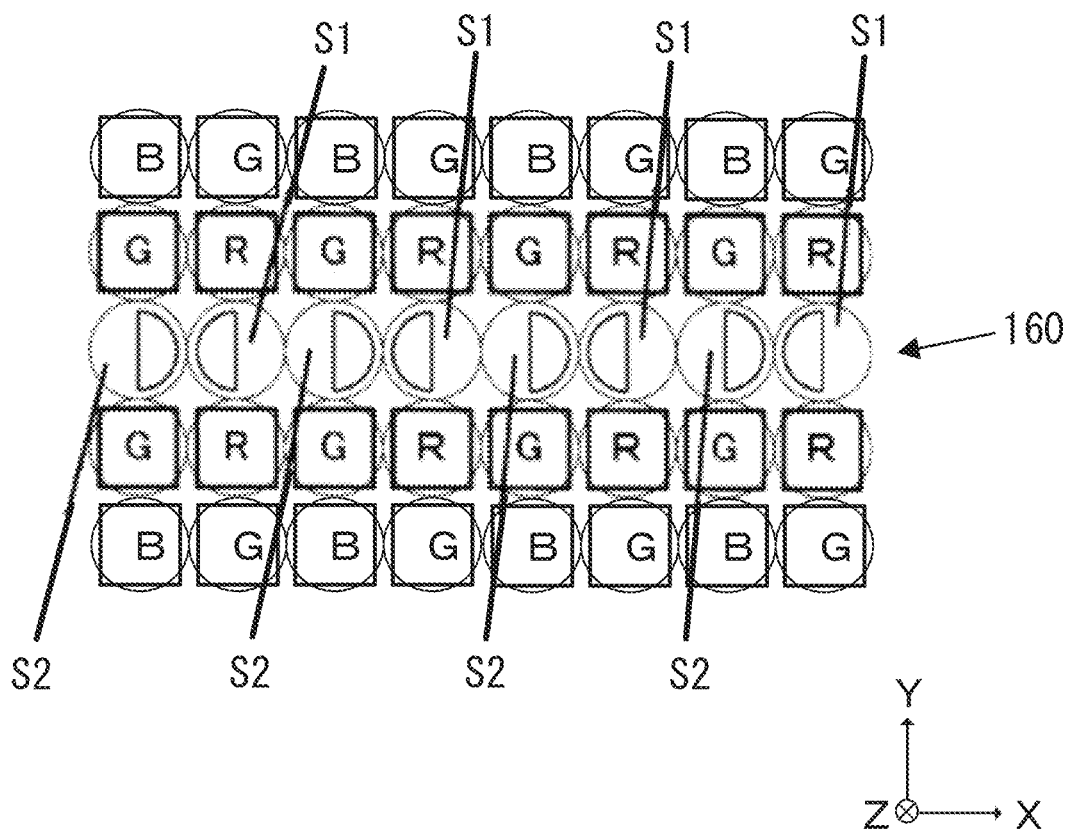
FIG. 12 is a figure showing a partial region of a focus detection pixel line in an enlarged view.

FIG. 12 is a figure giving an enlarged view of a partial region of one of the focus detection pixel lines 160 described above corresponding to a focus detection position 80A shown in FIG. 11. In FIG. 12, examples are shown of red color pixels R, green color pixels G (Gb and Gr), blue color pixels B, pixels for focus detection S1, and other pixels for focus detection S2. The red color pixels R, the green color pixels G (Gb and Gr), and the blue color pixels B are arranged according to the rule of the Bayer array described above.

The square shaped regions shown by way of example for the red color pixels R, the green color pixels G (Gb and Gr), and the blue color pixels B represent the light receiving areas of these image capturing pixels. Each of the pixels for image capturing receives the light flux that has passed through an exit pupil of the image capturing optical system 31 (refer to FIG. 1). In other words, each of the red color pixels R, the green color pixels G (Gb and Gr), and the blue color pixels B has a square shaped mask opening portion, and light passing through these mask opening portions reaches the light reception portions of these image capturing pixels.

It should be understood that the shapes of the light reception regions (i.e. of the mask openings) of the red color pixels R, the green color pixels G (Gb and Gr), and the blue color pixels B are not limited to being quadrilateral; for example, they could be circular.

The semicircular shaped regions shown by way of example for the pixels for focus detection S1 and the pixels for focus detection S2 represent the light receiving areas of these pixels for focus detection. In other words, each of the pixels for focus detection S1 has a semicircular shaped mask opening portion on the left side of its pixel position in FIG. 12, and light passing through this mask opening portion reaches the light reception portion of this pixel for focus detection S1. On the other hand, each of the pixels for focus detection S2 has a semicircular shaped mask opening portion on the right side of its pixel position in FIG. 12, and light passing through this mask opening portion reaches the light reception portion of this pixel for focus detection S2. In this manner, the pixels for focus detection S1 and the pixels for focus detection S2 respectively receive one of a pair of light fluxes that have passed through different regions of the exit pupil of the image capturing optical system 31 (refer to FIG. 1).

It should be understood that the positions of the focus detection pixel lines 160 in the image capturing chip 111 are not limited to being the positions shown by way of example in FIG. 11. Moreover, the number of the focus detection pixel lines 160 is not limited to the number thereof shown by way of example in FIG. 11. Furthermore, the shapes of the mask opening portions in the pixels for focus detection S1 and in the pixels for focus detection S2 are not limited to being semicircular; for example, it would be acceptable to arrange to divide the quadrilateral light reception regions (i.e. the mask opening portions) of the image capturing pixels R, the image capturing pixels G, and the image capturing pixels B in the horizontal direction, so as to define rectangular shapes.

Yet further, it would also be acceptable for the focus detection pixel lines 160 in the image capturing chip 111 to be lines in which the pixels for focus detection are provided as lined up along the Y axis direction of the image capturing chip 111 (i.e. along the vertical direction). Even further, an imaging element of the type shown in FIG. 12 in which pixels for image capturing and pixels for focus detection are arranged in a two dimensional array is per se known, and accordingly the details thereof are not shown in the figures, and explanation thereof will be curtailed.

It should be understood that, in the FIG. 12 example, a so-called 1PD configuration has been explained in which each of the pixels S1 and S2 for focus detection receives one of a pair of light fluxes for focus detection. Instead of this, it would also be acceptable to arrange to provide a so-called 2PD configuration in which each of the pixels for focus detection receives both of the pair of light fluxes for focus detection. By adopting the 2PD configuration, it becomes possible also to employ the photoelectrically converted signals obtained from the pixels for focus detection as photoelectrically converted signals for recording.

On the basis of the photoelectrically converted signals for focus detection outputted from the pixels for focus detection S1 and from the pixels for focus detection S2, the control unit 34 (i.e. the AF calculation unit 34d) detects the amount of image deviation (i.e. the phase difference) between the pair of images formed by the pair of light fluxes that have passed through different regions of the image capturing optical system 31 (refer to FIG. 1). And the amount of defocusing is calculated on the basis of the amount of image deviation (i.e. the phase difference). Since calculation of the amount of defocusing according to this type of split pupil phase method is per se known in the camera field, accordingly detailed description thereof will be omitted.

Figure 13:
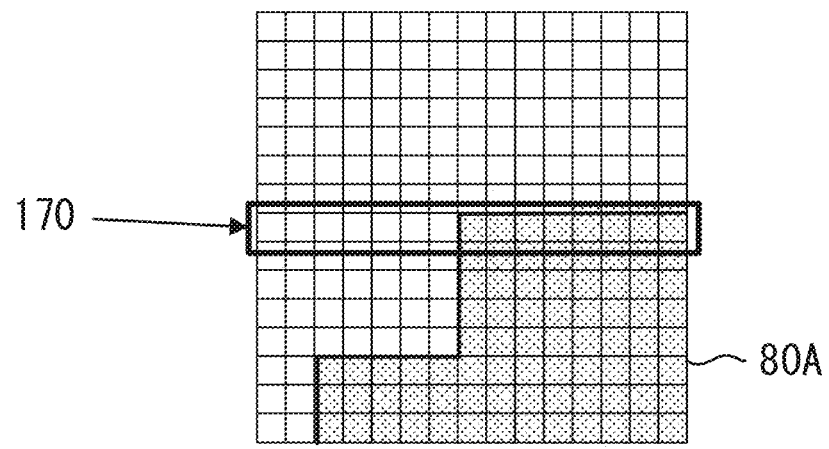
FIG. 13 is a figure showing a focus detection position in an enlarged view.

It will be supposed that the focus detection position 80A (refer to FIG. 11) is selected by the user to a position in the live view image 60a shown by way of example in FIG. 7A that corresponds to a region 80 near the boundary of the region 61. FIG. 13 is an enlarged view showing the focus detection position 80A. Pixels with white background indicate that the first image capture conditions are set, while shaded pixels indicate that the second image capture conditions are set. In FIG. 13, the position surrounded by the frame 170 corresponds to one of the focus detection pixel lines 160 (refer to FIG. 11).

Normally, the control unit 34 (i.e. the AF calculation unit 34d) performs focus detection processing by employing the signal data from the pixels for focus detection shown by the frame 170 just as it is without alteration. However, if signal data to which the first image capture conditions have been applied and signal data to which the second image capture conditions have been applied are mixed together in the signal data surrounded by the frame 170, then, among the signal data surrounded by the frame 170, the control unit 34 (i.e. the AF calculation unit 34d) performs correction processing on the signal data to which the second image capture conditions have been applied, as shown in the following Example #1 through Example #3. And the control unit 34 (i.e. the AF calculation unit 34d) performs focus detection processing by utilizing the signal data after this correction processing.

Example #1

If, for example, the only difference between the first image capture conditions and the second image capture conditions is the ISO sensitivity, with the ISO sensitivity in the first image capture conditions being 100 while the ISO sensitivity in the second image capture conditions is 800, then, as correction processing, the control unit 34 (i.e. the AF calculation unit 34d) multiplies the signal data captured under the second image capture conditions by 100/800. By doing this, variance in the signal data due to the difference between the image capture conditions is reduced.

It should be understood that, although variance in the signal data becomes small if the amounts of light incident on the pixels to which the first image capture conditions are applied and the amounts of light incident on the pixels to which the second image capture conditions are applied are the same, by contrast, in principle, if the amounts of light incident upon the pixels to which the first image capture conditions are applied and the amounts of light incident upon the pixels to which the second image capture conditions are applied are different, or the like, then the variance in the signal data may not become small. The same is true for the other examples described below.

Example #2

If, for example, the only difference between the first image capture conditions and the second image capture conditions is the shutter speed, with the shutter speed in the first image capture conditions being $\frac{1}{1000}$ sec. while the shutter speed in the second image capture conditions is $\frac{1}{100}$ sec., then, as correction processing, the control unit 34 (i.e. the AF calculation unit 34d) multiplies the signal data captured under the second image capture conditions by $\frac{1}{1000}/\frac{1}{100} = \frac{1}{10}$. By doing this, variance in the signal data caused by the different image capture conditions is reduced.

Example #3

If, for example, the only difference between the first image capture conditions and the second image capture conditions is their frame rate (and with the charge accumulation time being the same), with the frame rate in the first image capture conditions being 30 fps while the frame rate in the second image capture conditions is 60 fps, then, as correction processing, the control unit 34 (i.e. the AF calculation unit 34d) employs, for the signal data that was acquired under the second image capture conditions (i.e. at 60 fps), the signal data for those frame images whose starting timings of acquisition are close to those of the frame images that was acquired under the first image capture conditions (i.e. at 30 fps). By doing this, variance in the signal data due to difference in the image capture conditions is reduced.

It should be understood that it would also be acceptable to perform the correction processing by performing interpolation calculation of the signal data for the frame images whose starting timings of acquisition are close to those of the frame images that were acquired under the first image capture conditions (at 30 fps), on the basis of a plurality of the previous and subsequent frame images that were acquired under the second image capture conditions (60 fps).

On the other hand, if the image capture conditions that were applied to the image data surrounded by the frame 170 are all the same, then it will be acceptable for the control unit 34 (i.e. the AF calculation unit 34d) not to perform any correction processing such as described above. In other words, the control unit 34 (i.e. the AF calculation unit 34d) performs focus detection processing by employing the signal data from the pixels for focus detection shown by the frame 170 just as it is without alteration.

It should be understood that, as described above, even if there are some relatively insubstantial differences in the image capture conditions, they are nevertheless considered to be the same image capture conditions.

Furthermore although, in the example described above, a case has been explained in which correction processing is performed upon, among the signal data, the signal data that was captured under the second image capture conditions by referring to the first image capture conditions, it would also be acceptable to perform correction processing upon, among the signal data, the signal data that was captured under the first image capture conditions by referring to the second image capture conditions.

It would also be acceptable to arrange for the control unit 34 (i.e. the AF calculation unit 34d) to decide whether to perform correction processing on the signal data that was acquired under the first image capture conditions, or to perform correction processing upon the signal data that was acquired under the second image capture conditions, for example on the basis of the ISO sensitivity or the like. If the first image capture conditions and the second image capture conditions differ in their ISO sensitivities, then it is desirable to perform correction processing on the signal data that was acquired under the image capture conditions whose ISO sensitivity is the lower, provided that the signal data that was acquired under the image capture conditions whose ISO sensitivity is the higher is not saturated. In other words, if the first image capture conditions and the second image capture conditions differ in their ISO sensitivities, then it is more desirable to perform correction processing on the signal data that is darker, so as to reduce its difference from the signal data that is brighter.

Even further, it would also be acceptable to arrange to reduce the difference after the correction processing between the signal data that has been acquired under the first image capture conditions and the signal data that has been acquired under the second image capture conditions, by performing correction processing upon both those sets of signal data.

In the above explanation, as an example, focus detection processing employing the split pupil phase method has been disclosed, but it would also be possible to perform focus detection processing in a similar manner in the case of employing a contrast detection method in which the focusing lens of the image capturing optical system 31 is shifted to its focusing position on the basis of the magnitude of the contrast of the photographic subject image.

In the case of employing such a contrast detection method, while shifting the focusing lens of the image capturing optical system 31, at each position of the focusing lens, the control unit 34 performs per se known calculation of a focus evaluation value on the basis of the signal data outputted from the image capturing pixels of the imaging element 32a corresponding to the focus detection position. And then the position of the focusing lens that makes the focus evaluation value attain its maximum is taken as being its focusing position.

Normally, the control unit 34 performs calculation of the focus evaluation value by employing the signal data outputted from the image capturing pixels corresponding to the focus detection position without performing any correction processing. However, if signal data to which the first image capture conditions have been applied and signal data to which the second image capture conditions have been applied are mixed together in the signal data corresponding to the focus detection position, then, among the signal data corresponding to the focus detection position, the control unit 34 performs correction processing as described above upon the signal data that was acquired under the second image capture conditions. And the control unit 34 performs calculation of the focus evaluation value by employing the signal data after this correction processing.

3. When Performing Photographic Subject Detection Processing

Figure 14A:
FIG. 14A is a figure showing an example of a template image representing an object that is to be detected.
Figure 14B:
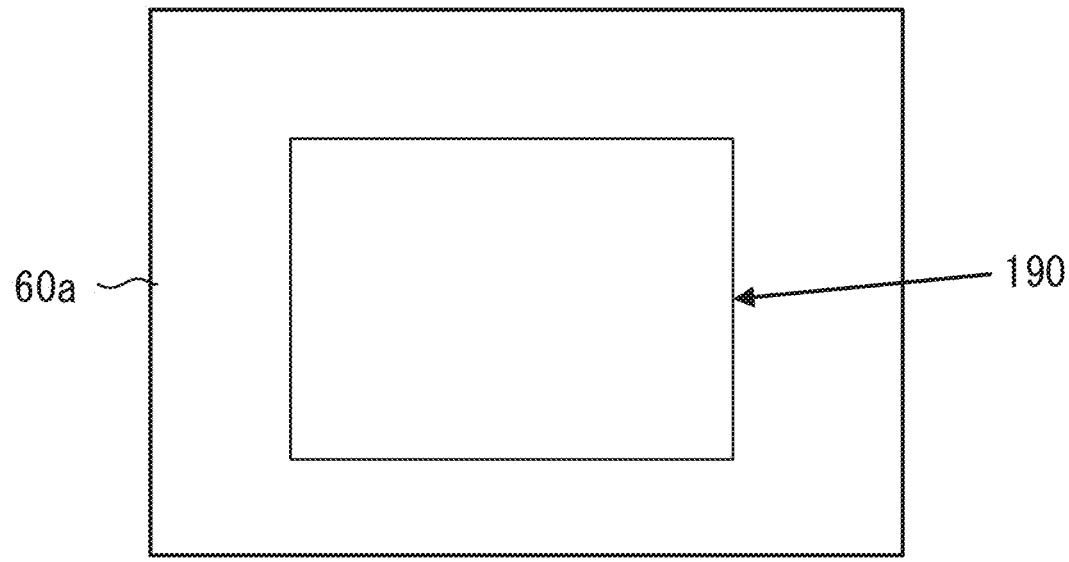
FIG. 14B is a figure showing an example of a live view image and a search range.

FIG. 14A is a figure showing an example of a template image representing an object that is to be detected, and FIG. 14B is a figure showing examples of a live view image 60(a) and a search range 190. The control unit 34 (i.e. the object detection unit 34a) detects the object from the live view image (in this example, the bag 63a, which is one of the elements of the photographic subject of FIG. 5). It will be acceptable to arrange for the control unit 34 (i.e. the object detection unit 34a) to take the range for detection of the object as being the entire range of the live view image 60a, but, in order to reduce the burden of the detection processing, it would also be acceptable to take only a portion of the live view image 60a as being the search range 190.

In the case in which different image conditions are set for the different divided regions, and the search range 190 includes a boundary between the divided regions, as preprocessing for the photographic subject detection processing, the control unit 34 (i.e. the object detection unit 34a) performs correction processing on the image data for at least one of the regions within the search range 190.

Correction processing is performed in order to suppress reduction of the accuracy of the photographic subject element detection processing, caused by the different image capture conditions in the regions into which the image capturing screen has been subdivided by the setting unit 34b. In general, if the search range 190 that is employed for detection of the photographic subject elements includes a boundary between two of the subdivided regions, then image data to which different image capture conditions have been applied may be mixed together in the image data for the search range 190. In this embodiment, rather than performing detection of the elements of the photographic subject by employing such image data to which different image capture conditions have been applied just as they are without alteration, correction processing is performed as described below, on the basis of the consideration that it is more desirable to perform detection of the photographic subject elements by employing image data upon which correction processing has been performed so as to suppress variance in the image data due caused by the different image capture conditions.

For the live view image 60a shown by way of example in FIG. 5, the case will now be explained of detecting the bag 63a, which is an object that is being held by the person 61a. The control unit 34 (i.e. the object detection unit 34a) sets the search range 190 to the neighborhood of the region that includes the person 61a. It should be understood that it would also be acceptable to set the region 61 that includes the person 61a as the search range.

In the case in which the search range 190 is not divided up into two regions for which the image capture conditions are different, the control unit 34 (i.e. the object detection unit 34a) performs the photographic subject detection processing by employing the image data representing the search range 190 without performing any correction processing. However, supposing that the image data for which first image capture conditions have been applied and the image data for which second image capture conditions have been applied are mixed together in the image data for the search range 190, then the control unit 34 (i.e. the object detection unit 34a) performs correction processing on, among the image data for the search range 190, the image data that was acquired under the second image capture conditions, as described in Examples #1 through #3 in the case of performing focus detection processing. And the control unit 34 (i.e. the object detection unit 34a) performs photographic subject detection processing by employing the image data after this correction processing.

It should be understood that, as described above, even if there are some relatively insubstantial differences in the image capture conditions, they are nevertheless considered to be the same image capture conditions.

Furthermore, although in the example described above a case has been explained in which correction processing is performed according to the first image capture conditions upon, among the image data, the image data that was captured under the second image capture conditions, it would also be acceptable to perform correction processing according to the second image capture conditions upon, among the image data, the image data that was captured under the first image capture conditions.

It will also be acceptable to apply the correction processing for the image data for the search range 190 described above to a search range that is employed in order to detect a specific photographic subject such as the face of a person or the like, or to a region that is employed for determining the type of scene that has been photographed.

Furthermore, the above described correction processing for the image data for the search range 190 is not limited to being applied to a search range that is employed in a pattern matching method that employs a template image, but may also be applied, in a similar manner, to a search range for detection of the amount of some characteristic of the image, on the basis of its color or its contour or the like.

Yet further it would also be acceptable, by performing per se known template matching processing employing image data for a plurality of frames whose time points of acquisition are different, to apply a region that is similar to a tracking subject in a frame image that is first acquired, to tracking processing of a moving object that is found from frame images that are subsequently acquired. In this case, if image data to which first image capture conditions have been applied and image data to which second image capture conditions have been applied are mixed together in the search ranges that are set for the frame images that are subsequently acquired, then the control unit 34 performs correction processing as described in Examples #1 through #3 above upon, among the image data for the search range, the image data that was acquired under the second image capture conditions. And then the control unit 34 performs tracking processing by employing the image data after this correction processing.

Even further, the same also applies to a known method for detecting a movement vector by employing image data for a plurality of frames whose time points of acquisition are different. If image data to which first image capture conditions have been applied and image data to which second image capture conditions have been applied are mixed together in the detection region that is employed for detection of the movement vector, then the control unit 34 performs correction processing as described in Examples #1 through #3 above upon, among the image data for the detection region that is employed for detection of the movement vector, the image data that was acquired under the second image capture conditions. And the control unit 34 detects the movement vector by employing the image data after this correction processing.

4. When Setting Image Capture Conditions

In the state in which the image capturing screen is subdivided into regions and different image capture conditions are set for different ones of these subdivided regions, if the control unit 34 (i.e. the setting unit 34b) newly performs photometry and determines new exposure conditions again, then correction processing is performed upon the image data for at least one of the regions, as preprocessing to set its exposure conditions.

The correction processing is performed in order to suppress deterioration of the accuracy of the processing for determination of the exposure conditions, caused by difference of the image capture conditions between the different regions into which the image capturing screen has been divided by the setting unit 34b. For example, if a boundary between the divided regions is included in a photometric range that is set in the central portion of the image capturing screen, then image data to which different image capture conditions have been applied may be present in the image data for the photometric range. In the present embodiment, rather than performing the exposure calculation processing by employing the image data for which different image capture conditions have been applied just as it is without alteration, correction processing as described below is performed on the basis of the consideration that it is more desirable to perform the exposure calculation processing by employing the image data upon which correction processing has been performed in order to suppress variance in the image data due to difference in the image capture conditions.

If the photometric range is not subdivided by a plurality of regions for which the image capture conditions are different, then the control unit 34 (i.e. the setting unit 34b) performs the exposure calculation processing by employing the image data making up the photometric range just as it is without performing any correction processing. However, supposing that image data to which first image capture conditions have been applied and image data to which second image capture conditions have been applied are mixed together in the image data for the photometric range, then the control unit 34 (i.e. the setting unit 34b) performs correction processing upon the image data, among the image data for the photometric range, to which the second image capture conditions were applied, as described in Example #1 through Example #3 above for the cases of performing the focus detection processing and the photographic subject detection processing. And then the control unit 34 (i.e. the setting unit 34b) performs exposure calculation processing by employing the image data after this correction processing.

It should be understood that, as described above, even if there are some relatively insubstantial differences in the image capture conditions, they are nevertheless considered to be the same image capture conditions.

Furthermore although, in the example described above, a case has been explained in which correction processing is performed according to the first image capture conditions upon, among the image data, the image data that was captured under the second image capture conditions, it would also be acceptable to perform correction processing according to the second image capture conditions upon, among the image data, the image data that was captured under the first image capture conditions.

The above considerations are not only limited to the photometric range when performing the exposure calculation processing described above; the same holds for the photometric (colorimetry) range that is employed when determining the white balance adjustment value, for the photometric range that is employed when determining whether or not it is proper to emit auxiliary photographic light from a light source that emits auxiliary photographic light, and to the photometric range that is employed when determining the amount of light to be emitted as auxiliary photographic light from the light source described above.

Furthermore, if the resolutions at which the photoelectric conversion signals are read out are to be made different between the different regions into which the image capturing screen is divided, the similar technique may be applied to regions that are employed for determining the type of the image capturing scene which are used to determine the resolution at which each region is to be read out.

Explanation of Flow Chart

Figure 15:
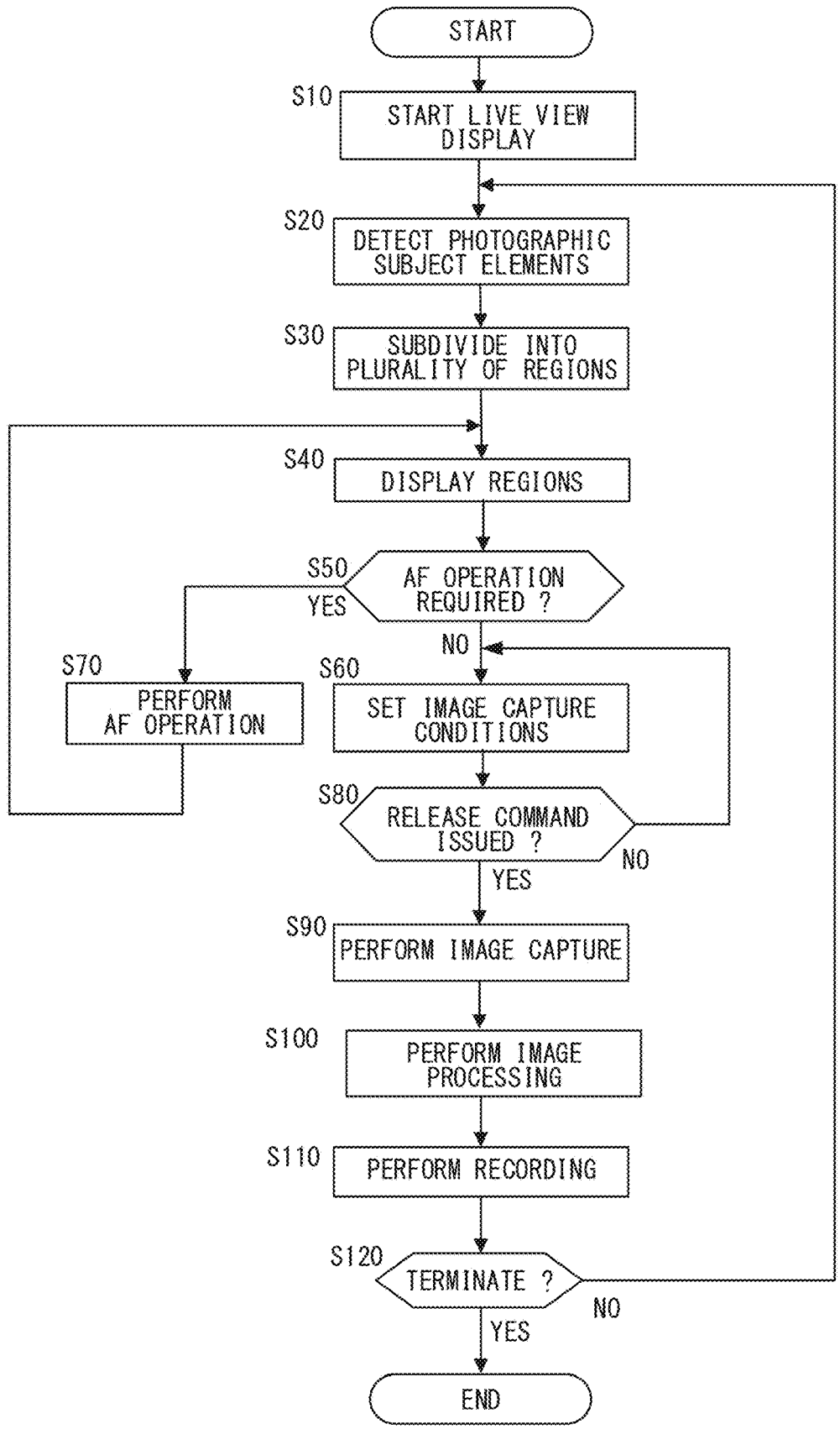
FIG. 15 is a flow chart for explanation of the flow of image capture processing for setting image capture conditions for each region individually.

FIG. 15 is a flow chart for explanation of the flow of processing for setting image capture conditions for each region individually and performing image capturing processing. When a main switch of the camera 1 is turned on, the control unit 34 starts a program for executing the processing shown in FIG. 15. In step S10, the control unit 34 starts to provide a live view display upon the display unit 35, and then the flow of control proceeds to step S20.

In concrete terms, the control unit 34 commands the imaging unit 32 to start acquisition of live view images, and causes the live view images that are thus acquired to be successively displayed upon the display unit 35. As described above, at this time point the same image capture conditions are set for the entire area of the image capturing chip 111, in other words for the entire screen.

It should be understood that, if a setting is made for performing AF operation during this live view display, then, by performing focus detection processing, the control unit 34 (i.e. the AF calculation unit 34d) controls AF operation to adjust the focus to the element of the photographic subject that corresponds to a predetermined focus detection position. And, the AF calculation unit 34d performs focus detection processing after having performed the correction processing described above as necessary.

Furthermore, if no setting is made for performing AF operation during the live view display, then the control unit 34 (i.e. the AF calculation unit 34d) performs AF operation when AF operation is subsequently commanded.

In step S20, the control unit 34 (i.e. the object detection unit 34a) detects one or more elements in the photographic subject from the live view image, and then the flow of control proceeds to step S30. And, after having performed the correction processing described above if necessary, the object detection unit 34a performs photographic subject detection processing. In step S30, the control unit 34 (i.e. the setting unit 34b) subdivides the screen of the live view image into regions containing different elements of the photographic subject, and then the flow of control proceeds to step S40.

In step S40, the control unit 34 performs display of the regions upon the display unit 35. And, as shown in FIG. 6, among the subdivided regions, the control unit 34 displays the region that is the subject of setting (or of changing) its image capture conditions as accentuated. Furthermore, the control unit 34 causes the display unit 35 to display the image capture conditions setting screen 70, and then the flow of control proceeds to step S50.

It should be understood that, if the display position of some other main photographic subject is tapped on the display screen by the finger of the user, then the control unit 34 changes the region that includes this selected main photographic subject to newly become the region that is the subject of setting (or of changing) its image capture conditions, and causes this region to be displayed as accentuated.

In step S50, the control unit 34 makes a decision as to whether or not AF operation is required. If, for example, the focal point adjustment state has changed due to movement of the photographic subject, or if the position of the point for focus detection has changed due to user actuation, or if due to user actuation a command has been issued for AF operation to be performed, then the control unit 34 reaches an affirmative decision in step S50 and the flow of control is transferred to step S70. But if the focal point adjustment state has not changed, and the position of the point for focus detection has not changed due to user actuation, and no command has been issued due to user actuation for AF operation to be performed, then the control unit 34 reaches a negative decision in step S50, and the flow of control is transferred to step S60.

In step S70, the control unit 34 causes AF operation to be performed, and then the flow of control returns to step S40.

According to requirements, the AF calculation unit 34*d* performs the focus detection processing, i.e. the AF operation, after having performed the correction processing described above. And, after the flow of control has returned to step S40, the control unit 34 repeats processing similar to that described above on the basis of the live view image that is acquired after the AF operation.

On the other hand, in step S60, according to user actuation, the control unit 34 (i.e. the setting unit 34*b*) sets the image capture conditions for the region that is being displayed as accentuated, and then the flow of control is transferred to step S80. It should be understood that the changing over of the display of the display unit 35 and the setting of image capture conditions according to user actuation in the step S60, are as described above. And, according to requirements, the control unit 34 (i.e. the setting unit 34*b*) performs exposure calculation processing after having performed the correction processing described above.

In step S80, the control unit 34 makes a decision as to whether or not an image capture command has been issued. If a release button not shown in the figures included in the actuation members 36 has been actuated, or a display icon for commanding image capture has been actuated, then the control unit 34 reaches an affirmative decision in step S80 and the flow of control proceeds to step S90. On the other hand, if no image capture command has been issued, then the control unit 34 reaches a negative decision in step S80 and the flow of control returns to step S60.

In step S90, the control unit 34 performs predetermined image capture processing. That is, the image capturing control unit 34*c* control the image capturing element 32*a* to perform image capture under the image capture conditions that have been set for each region as described above, and then the flow of control proceeds to step S100.

In step S100, the control unit 34 (i.e. the imaging control unit 34*c*) sends a command to the image processing unit 33, and thereby causes predetermined image processing to be performed upon the image data obtained by the image capture described above, and then the flow of control proceeds to step S110. This image processing may include the pixel defect correction processing, the color interpolation processing, the contour emphasis processing, and the noise reduction processing described above.

It should be understood that, according to requirements, the image processing unit 33 (i.e. the correction unit 33*b*) may perform the image processing after having performed correction processing upon the image data that is positioned in the vicinity of a boundary between regions.

In step S110, the control unit 34 sends a command to the recording unit 37 and causes it to record the image data after image processing upon the recording medium not shown in the figures, and then the flow of control proceeds to step S120.

In step S120, the control unit 34 determines whether or not a termination actuation has been performed. If a termination actuation has been performed, then the control unit 34 reaches an affirmative decision in step S120 and the processing of FIG. 15 terminates. But if no termination actuation has been performed, then the control unit 34 reaches a negative decision in step S120 and the flow of control returns to step S20. If the flow of control returns to step S20, then the control unit 34 repeats the processing described above.

While, in the explanation given above, an example has been given in which a laminated type imaging element 100 is employed as the imaging element 32*a*, it is not necessary for the imaging element to be of the laminated type, provided that it is capable of setting image capture conditions individually for each of a plurality of blocks upon the imaging element (i.e. upon the image capturing chip 111).

According to the first embodiment of the present invention described above, the following advantageous operational effects are obtained.

(1) This camera 1 equipped with an image processing device comprises the control unit 34 (i.e. the setting unit 34*b*) that sets image capture conditions for the first region of the imaging unit 32 that are different from the image capture conditions for the second region of the imaging unit 32, the image processing unit 33 (i.e. the correction unit 33*b*) that corrects the first image data generated by image capture of light incident upon the first region under the image capturing conditions set by the setting unit 34*b* on the basis of the image capture conditions for the second region set by the setting unit 34*b*, and the image processing unit 33 (i.e. the generation unit 33*c*) that generates an image by the first image data corrected by the correction unit 33*b* and the second image data generated by image capture of light incident upon the second region. Due to this, it is possible to perform processing in an appropriate manner for each of the regions having different image capture conditions. In other words, it is possible to generate an image in an appropriate manner by the image data that has been generated for each of the regions. For example, it is possible to suppress any discontinuity or strangeness appearing in the image that might be generated due to differences in the image capture conditions between the various regions.

(2) Since the correction unit 33*b* of the camera 1 corrects the first image data so that the differences between the values of the first image data and the values of the second image data are reduced, accordingly it is possible to perform processing in an appropriate manner for both of these two regions whose image capture conditions are different.

(3) Since the correction unit 33*b* of the camera 1 corrects the first image data on the basis of variance between the image capture conditions for the first region and the image capture conditions for the second region, accordingly it is possible to perform processing in an appropriate manner for each of the regions whose image capture conditions are different.

(4) It would also be acceptable to arrange for the correction unit 33*b* of the camera 1 to correct the second image data on the basis of the image capture conditions set for the first region by the setting unit 34*b*, and for the generation unit 33*c* to generate an image from the first image data that has been corrected by the correction unit 33*b* and from the second image data that has also been corrected by the correction unit 33*b*. By doing this, again, it is possible to perform processing in an appropriate manner for each of the regions whose image capture conditions are different.

(5) It would also be acceptable to arrange for the correction unit 33*b* of the camera 1 to correct the second image data according to the first image data, and for the generation unit 33*c* to generate an image according to the first image data that has been corrected by the correction unit 33*b* and the second image data that has also been corrected by the correction unit 33*b*. Also, by doing this, it is possible to perform processing in an appropriate manner for each of the regions whose image capture conditions are different.

(6) Since the generation unit 33*c* of the camera 1 performs image processing upon the second image data by employing the first image data that has been corrected by the correction unit 33*b*, accordingly it is possible to perform processing in an appropriate manner for each of the regions whose image capture conditions are different.

(7) Since the generation unit 33c of the camera 1 changes the value of the second image data by employing the value of the first image data that have been corrected by the correction unit 33b, accordingly it is possible to perform processing in an appropriate manner for each of the regions whose image capture conditions are different.

(8) Since the generation unit 33c of the camera 1 replaces the value of the second image data with the value of the first image data that have been corrected by the correction unit 33b, accordingly it is possible to perform processing in an appropriate manner for each of the regions whose image capture conditions are different.

(9) Since the generation unit of the camera 1 generates third image data from the second image data and the first image data that has been corrected by the correction unit 33b, accordingly it is possible to perform processing in an appropriate manner for each of the regions whose image capture conditions are different.

(10) The setting unit 34b of the camera 1 sets the image capture sensitivity for the first region of the imaging unit 32 to a first image capture sensitivity as the image capture conditions for the first region, and sets the image capture sensitivity for the second region of the imaging unit 32 to a second image capture sensitivity that is different from the first image capture sensitivity as the image capture conditions for the second region, and the correction unit 33b corrects the first image data that has been generated by image capture under the image capture conditions set by the setting unit 34b on the basis of the difference between the first image capture sensitivity and the second image capture sensitivity. Due to this, it is possible to perform processing in an appropriate manner for each of the regions whose image capturing sensitivities are different.

It would also be acceptable to change over between a first mode in which correction processing described above is performed as pre-processing and a second mode in which no correction processing is performed as pre-processing. When the first mode is selected, the control unit 34 performs processing such as image processing or the like after performing the pre-processing described above. On the other hand, when the second mode is selected, the control unit 34 performs processing such as image processing or the like without performing the pre-processing described above. For example, if a part of a face that has been detected as a photographic subject element is in shadow, when color interpolation processing is performed after having performed correction processing upon an image that has been generated by image capture with the image capture conditions for a region that includes the shadowed portion of the face and the image capture conditions for a region that includes a portion of the face that is not in shadow being set differently, so that the brightness of the shadowed portion of the face is approximately the same as the brightness of the portion of the face that is not in shadow, then, due to differences in the image capture conditions that are set, unintended color interpolation may be performed upon the face portion that is in shadow. However, by making it possible to change over between the first mode and the second mode, it becomes possible to avoid the occurrence of unintended color interpolation by enabling color interpolation processing to be performed while employing the captured image data just as it is without any correction processing being performed thereupon.

Variants of First Embodiment

The following modifications also come within the scope of the present invention, and moreover it would be possible to combine one or a plurality of these modifications with the embodiment described above.

Variant Embodiment #1

Figure 16A:
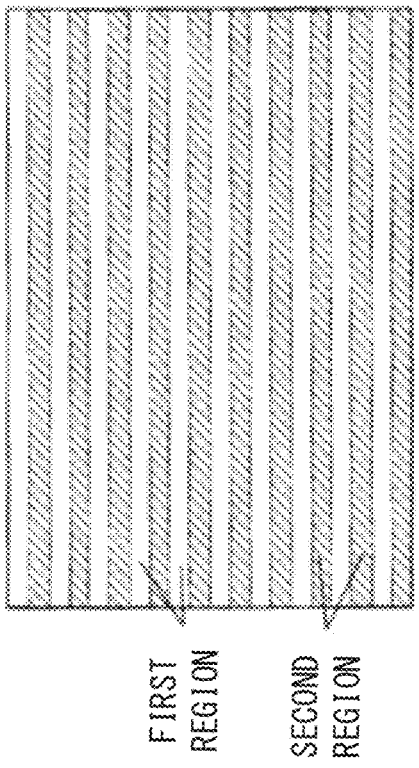
FIGS. 16A through 16C are figures showing various examples of arrangement of a first region and a second region upon the image capturing surface of the imaging element.
Figure 16B:
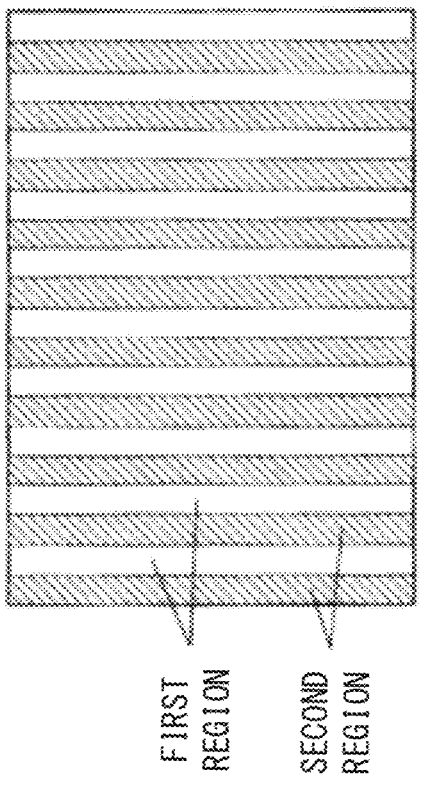
Figure 16C:
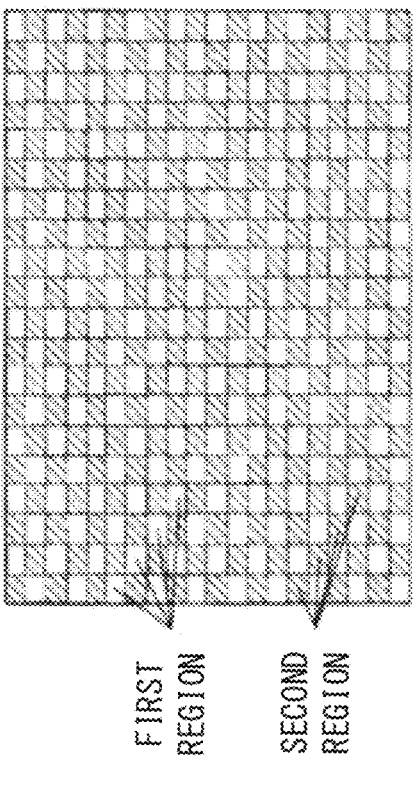

FIGS. 16A through 16C are figures showing various arrangements of the first region and the second region upon the image capturing surface of the imaging element 32a. According to the example shown in FIG. 16A, the first region consists of a group of even numbered columns, and the second region consists of a group of odd numbered columns. In other words, the image capturing surface is subdivided into the even numbered columns and the odd numbered columns.

And, according to the example shown in FIG. 16B, the first region consists of the even numbered rows, and the second region consists of the odd numbered rows. In other words, the image capturing surface is subdivided into the even numbered rows and the odd numbered rows.

Moreover, according to the example shown in FIG. 16C, the first region consists of the blocks on the even numbered rows in the odd numbered columns and the blocks on the odd numbered rows in the even numbered columns. And the second region consists of the blocks on the even numbered rows in the even numbered columns and the blocks on the odd numbered rows in the odd numbered columns. In other words, the image capturing surface is subdivided into a checkerboard pattern.

In each of FIG. 16A through FIG. 16C, a first image that is based upon the photoelectrically converted signals outputted from the first region and a second image that is based upon the photoelectrically converted signals outputted from the second region are generated from the photoelectrically converted signals read out from the imaging element 32a after capturing one frame. According to this Variant Embodiment #1, the first image and the second image are captured at the same angle of view, and include a common photographic subject image.

In this Variant Embodiment #1 of the present invention, the control unit 34 employs the first image for display, while employing the second image for detection. In concrete terms, the control unit 34 causes the display unit 35 to display the first image as a live view image. Furthermore, the control unit 34 causes the photographic subject detection processing to be performed by the object detection unit 34a by employing the second image, causes the focus detection processing to be performed by the AF calculation unit 34d by employing the second image, and causes the exposure calculation processing to be performed by the setting unit 34b by employing the second image.

In this Variant Embodiment #1, it will be supposed that the image capture conditions that are set for the first region in which the first image is captured are termed the "first image capture conditions", and that the image capture conditions that are set for the second region in which the second image is captured are termed the "second image capture conditions". The control unit 34 may make the first image capture conditions be different from the second image capture conditions.

1. As one example, the control unit 34 may set the first image capture conditions to be conditions that are appropriate for display by the display unit 35. For example, these first image capture conditions that are set for the first region may be set to be the same over the entire first region of the image capturing screen. On the other hand, the control unit 34 may set the second image capture conditions that are set for the second region to be conditions that are appropriate for the focus detection processing, for the photographic subject detection processing, and for the exposure calculation processing. These second image capture conditions are set to be the same over the entire second region of the image capturing screen.

It should be understood that, if the conditions that are suitable for the focus detection processing, for the photographic subject detection processing, and for the exposure calculation processing are different from one another, then it would be acceptable for the control unit 34 to make the second image capture conditions that are set for the second region be different for each frame. For example, the second image capture conditions for a first frame may be set to be suitable for the focus detection processing, the second image capture conditions for the next second frame may be set to be are suitable for the photographic subject detection processing, and the second image capture conditions for the next third frame may be set to be suitable for the exposure calculation processing. In these cases, for each frame, the second image capture conditions are made to be the same over the entire second region of the image capturing screen.

2. As another example, it would also be acceptable for the control unit 34 to make the first image capture conditions that are set for the first region vary between different regions. Thus, the control unit 34 (i.e. the setting unit 34b) sets different first image capture conditions for each of the regions including photographic subject elements that have been subdivided by the setting unit 34b. On the other hand, the control unit 34 sets the second image capture conditions that are set for the second region to be the same over the entire second region upon the image capturing screen. The control unit 34 sets the second image capture conditions to conditions that are appropriate for the focus detection processing, for the photographic subject detection processing, and for the exposure calculation processing, but if the conditions that are respectively appropriate for the focus detection processing, for the photographic subject detection processing, and for the exposure calculation processing are different from one another, then it will be acceptable for the image capture conditions set for the second region to be different for each frame.

3. Moreover, as yet another example, it will also be acceptable for the control unit 34 to set the first image capture conditions that are set for the first region to be the same over the entire first region of the image capturing screen, while on the other hand making the second image capture conditions that are set for the second region vary between different regions of the image capturing screen. For example, the second image capture conditions may be set to be different for each of the regions including a photographic subject element into which the setting unit 34b has subdivided the image capturing screen. Also, in this case, if the conditions that are appropriate for the focus detection processing, for the photographic subject detection processing, and for the exposure calculation processing are different from one another, then the image capture conditions that are set for the second region may be different for each frame.

4. Still further, as yet another example, the control unit 34 may make the first image capture conditions that are set for the first region vary between different regions of the image capturing screen, and may also make the second image capture conditions that are set for the second region vary between different regions of the image capturing screen. For example, along with the first image capture conditions being set to be different for each of the regions including a photographic subject element into which the setting unit 34b has subdivided the image capturing screen, also the second image capture conditions may be set to be different for each of the regions including a photographic subject element into which the setting unit 34b has subdivided the image capturing screen.

In FIG. 16A through FIG. 16C, it would also be acceptable for the area ratios to be different between the first region and the second region. For example, on the basis of actuation by the user or a determination by the control unit 34, the control unit 34 may set the area ratio of the first region to be higher than that of the second region, or may set the area ratio of the first region and the area ratio of the second region to be equal as shown by way of example in FIGS. 16A through 16C, or may set the area ratio of the first region to be lower than that of the second region. By making the area ratios be different between the first region and the second region, it is possible to make the resolution of the first image be higher as compared with the second image, or to make the resolutions of the first image and the second image be equal, or to make the resolution of the second image be higher as compared with the first image.

Variant Embodiment #2

In the correction processing when performing image processing, if the image capture conditions that are applied at the position for attention (here supposed to be the first image capture conditions) and the image conditions that are applied to one or more reference positions in the neighborhood of the position for attention (here supposed to be the second image capture conditions) are different from one another, then the image processing unit 33 (i.e. the correction unit 33b) corrects the image data captured under the second image capture conditions (i.e. the image data, among the image data for the reference positions, which was captured under the second image capture conditions) on the basis of the first image capture conditions. In other words, by performing correction processing on the image data for the reference position or positions that was captured under the second image capture conditions, it is arranged to alleviate discontinuity in the image caused by the difference between the first image capture conditions and the second image capture conditions.

Instead of the above it would also be acceptable, in Variant Embodiment #2 of the present invention, to arrange for the image processing unit 33 (i.e. the correction unit 33b) to correct the image data that has been captured under the first image capture conditions (i.e. the image data for the position of attention and the image data, among the image data for the reference positions, that has been captured under the first image capture conditions) on the basis of the second image capture conditions. In this case as well, it is possible to alleviate discontinuity in the image arising due to the difference between the first image capture conditions and the second image capture conditions.

Alternatively, it would also be acceptable to arrange for the image processing unit 33 (i.e. the correction unit 33b) to correct both the image data captured under the first image capture conditions and the image data captured under the second image capture conditions. In other words it will be acceptable to arrange to alleviate discontinuity in the image due to the difference between the first image capture conditions and the second image capture conditions, by performing correction processing upon the image data for the position for attention that has been captured under the first image capture conditions, upon the image data, among the image data for the reference positions, that has been captured under the first image conditions, and also upon the image data, among the image data for the reference positions, that has been captured under the second image capture conditions.

For example, in Example #1 described above, as correction processing, the image data for the reference pixels that were captured under the first image capture conditions (in which the ISO sensitivity was 100) may be multiplied by 400/100, while, as correction processing, the image data for the reference pixels that were captured under the second image capture conditions (in which the ISO sensitivity was 800) may be multiplied by 400/800. By doing this, variance in the image data due to the difference in the image capture conditions is reduced. It should be understood that correction processing is performed upon the pixel data for the pixel for attention by multiplying it by 100/400 after the color interpolation processing. By this correction processing, it is possible to change the pixel data for the pixel for attention after color interpolation processing to be the same value as when it was captured under the first image capture conditions. Moreover it would also be acceptable, in Example #1 described above, to vary the level of correction processing according to the distance from the boundary between the first region and the second region. Thereby, it is possible to reduce the proportion by which the image data is increased or decreased by the correction processing, as compared with the case of Example #1 described above, so that it is possible to reduce the noise generated by the correction processing. Although the above explanation has related to the case of Example #1 described above, the same principles can also be applied to Example #2 above, in a similar manner.

According to this Variant Embodiment #2, in a similar manner to the embodiment described previously, it is possible to perform image processing in an appropriate manner on the image data generated for each of the regions having different image capture conditions.

Variant Embodiment #3

In the explanation given above, it was arranged, when performing correction processing on the image data, to obtain the corrected image data by performing calculation on the basis of the difference between the first image capture conditions and the second image capture conditions. Instead of performing such a calculation, it would also be acceptable to obtain the corrected image data by referring to a correction table. For example, it would be acceptable to read out the corrected image data by inputting the first image capture conditions and the second image capture conditions as arguments. Alternatively, it would also be acceptable to provide a structure in which a correction coefficient is read out by inputting the first image capture conditions and the second image capture conditions as arguments.

Variant Embodiment #4

It would also be acceptable to set an upper limit and a lower limit of the image data after correction for the correction processing described above. By setting such an upper limit value and lower limit value, it is possible to impose limitation in order that more correction than necessary should not be performed. The upper limit value and the lower limit value may be determined in advance; or, if a photometric sensor is provided separately from the image capturing element 32a, the upper limit value and the lower limit value may be determined on the basis of the output signal from that photometric sensor.

Variant Embodiment #5

In the embodiments described above, examples have been described in which photographic subject elements are detected by the control unit 34 (i.e. by the setting unit 34b) on the basis of the live view image, and the screen of the live view image is subdivided into regions that include those photographic subject elements. However, in Variant Embodiment #5, it would also be acceptable, if a photometric sensor is provided separately from the imaging element 32a, to subdivide the regions on the basis of the output signal from that photometric sensor.

A foreground and a background are subdivided on the basis of the output signal from the photometric sensor. In concrete terms, the live view image acquired by the imaging element 32b is subdivided into a foreground region corresponding to a region that is determined to be the foreground from the output signal of the photometric sensor, and a background region corresponding to a region that is determined to be the background from the output signal of the photometric sensor.

Furthermore, the control unit 34 arranges a first region and a second region as shown by way of example in FIGS. 16A through 16C with respect to the position corresponding to the foreground region of the image capturing surface of the imaging element 32a. On the other hand, the control unit 34 arranges only a first region on the image capturing surface of the imaging element 32a with respect to the position corresponding to the background region of the image capturing surface of the imaging element 32a. The control unit 34 employs the first image for display, and employs the second image for detection.

According to this Variant Embodiment #5, it is possible to perform subdivision of the live view image acquired by the imaging element 32b into regions by employing the output signal from the photometric sensor. Furthermore, it would be possible to obtain both the first image for display and the second image for detection for the foreground region, and to obtain only the first image for display for the background region.

Variant Embodiment #6

In Variant Embodiment #6, as one example of correction processing, the image processing unit 33 (i.e. the generation unit 33c) performs contrast adjustment processing. In other words, the generation unit 33c alleviates discontinuity in the image caused by variance between the first image capture conditions and the second image capture conditions by making their gradation curves (i.e. their gamma curves) be different.

For example, suppose that the only difference between the first image capture conditions and the second image capture conditions is their ISO sensitivities, and that the ISO sensitivity of the first image capture conditions is 100 while the ISO sensitivity of the second image capture conditions is 800. In this case, among the image data for the reference positions, the generation unit 33c compresses the values of the image data captured under the second image conditions by ⅛, by making the gradation curve or tone curve flatter.

Alternatively it will also be acceptable, for the generation unit 33c to expand the values of the image data for the position of attention and the image data captured under the first image conditions among the image data for the reference positions by 8 times, by making the gradation curve steeper.

According to this Variant Embodiment #6, in a similar manner to the other embodiments described above, it is possible to perform image processing in an appropriate manner upon the image data generated for each of several different regions that have different image capture conditions. For example, it is possible to suppress discontinuity or strangeness appearing in the image after image processing that might be generated due to differences in the image capture conditions at the boundaries between the various regions.

Variant Embodiment #7

In Variant Embodiment #7, it is arranged for the image processing unit 33 not to lose the contours of a photographic subject element during the image processing described above (for example, during the noise reduction processing). In general, smoothing filter processing is employed when performing noise reduction. Although there is a beneficial effect with regard to reduction of noise when a smoothing filter is employed, the boundaries between photographic subject elements may become blurred.

Accordingly, for example, the image processing unit 33 (i.e. the generation unit 33c) may compensate for blurring at a boundary at the photographic subject element described above by performing contrast adjustment processing, in addition to the noise reduction processing or along with the noise reduction processing. In this Variant Embodiment #7, the image processing unit 33 (i.e. the generation unit 33c) sets a curve shaped in a letter-S shape (i.e. so-called letter-S conversion) as a grayscale conversion curve (i.e. as the gradation conversion curve). And, by performing contrast adjustment while employing this letter-S conversion, the image processing unit 33 (i.e. the generation unit 33c) extends the gradations of both the bright data and the dark data, thereby increasing the gradation levels (i.e. tones) of the bright data (and of the dark data) while also compressing the image data having intermediate tones and reducing its gradation levels. Due to this, the amount of image data whose brightness is of intermediate level is reduced, while the amount of image data classified as either bright or dark is increased, so that, as a result, it is possible to compensate blurring at the boundaries of the photographic subject elements.

According to this Variant Embodiment #7, it is possible to compensate blurring at boundaries of the photographic subject elements by emphasizing the brightness of the image.

Variant Embodiment #8

In Variant Embodiment #8, the image processing unit 33 (i.e. the generation unit 33c) changes the white balance adjustment gain so as to alleviate discontinuity in the image engendered by discrepancy between the first image capture conditions and the second image capture conditions.

For example, in a case in which the image capture conditions that were applied for image capture at the position for attention (here supposed to be the first image capture conditions) and the image capture conditions that were applied for image capture at reference positions in the neighborhood of the position for attention (here supposed to be the second image capture conditions) are different from one another, the image processing unit 33 (i.e. the generation unit 33c) changes the white balance adjustment gain so that the white balance of the image data, among the image data for the reference positions, that was acquired under the second image capture conditions becomes closer to the white balance of the image data that was acquired under the first image capture conditions.

It should be understood that it would also be acceptable to arrange for the image processing unit 33 (i.e. the generation unit 33c) to change the white balance adjustment gain, so that the white balance of the image data, among the image data for the reference positions, that was acquired under the first image capture conditions, and also the white balance of the image data for the position for attention, become closer to the white balance of the image data that was acquired under the second image capture conditions.

According to this Variant Embodiment #8, for image data that has been generated for several regions whose image capture conditions are different from one another, it is possible to alleviate discontinuity in the image engendered by variance between the first image capture conditions and the second image capture conditions, by matching the white balance adjustment gains of one region to the white balance adjustment gain of another region whose image capture conditions are different.

Variant Embodiment #9

It would also be acceptable to provide a plurality of the image processing units 33, and for them to perform the image processing in parallel. For example, image processing may be performed on image data that has been captured for a region A of the image capturing unit 32, while also performing image processing on image data that has been captured for a region B of the image capturing unit 32. The plurality of image processing units 33 may perform the same type of image processing, or may perform different types of image processing. In other words, the plurality of image processing units 33 may perform similar image processing on the image data for the region A and on the image data for the region B by employing the same parameters and so on; or, alternatively, they may perform different types of image processing on the image data for the region A and on the image data for the region B by employing different parameters and so on.

If a plurality of image processing units 33 are provided, then it would be acceptable to perform image processing with one of the image processing units upon image data to which the first image capture conditions have been applied, while performing image processing with another of the image processing units upon image data to which the second image capture conditions have been applied. Moreover, the number of image processing units is not limited to being two as described above; for example, it would also be acceptable to provide the same number of image processing units as the number of image capture conditions that can be set. In other words, each of the image processing units would be tasked with performing image processing for one of the regions to which different image capture conditions have been applied. According to this Variant Embodiment #9, it is possible to progress in parallel the image capturing under different image capture conditions for each of the regions, and also the image processing upon the image data for the images obtained for each of the above described regions.

Variant Embodiment #10

In the embodiments described above, the camera 1 has been described as an example, but it would also be acceptable to provide a similar structure to a high-functioning portable telephone handset 250 (refer to FIG. 18) such as a smartphone that is equipped with a camera function, or to a mobile device such as a tablet terminal or the like.

Variant Embodiment #11

In the embodiments described above, the camera 1 that is built as a single integral electronic device incorporating the image capturing unit 32 and the control unit 34 has been described by way of example. However, instead of that configuration, it would also be acceptable to provide an image capturing system 1B in which an image capturing unit 32 and a control unit 34 are provided separately, and the image capturing unit 32 is controlled from the control unit 34 via a communication system.

In the following, an example will be explained with reference to FIG. 17 in which an image capturing device 1001 that is equipped with an image capturing unit 32 is controlled from a display device 1002 to which a control unit 34 is provided.

Figure 17:
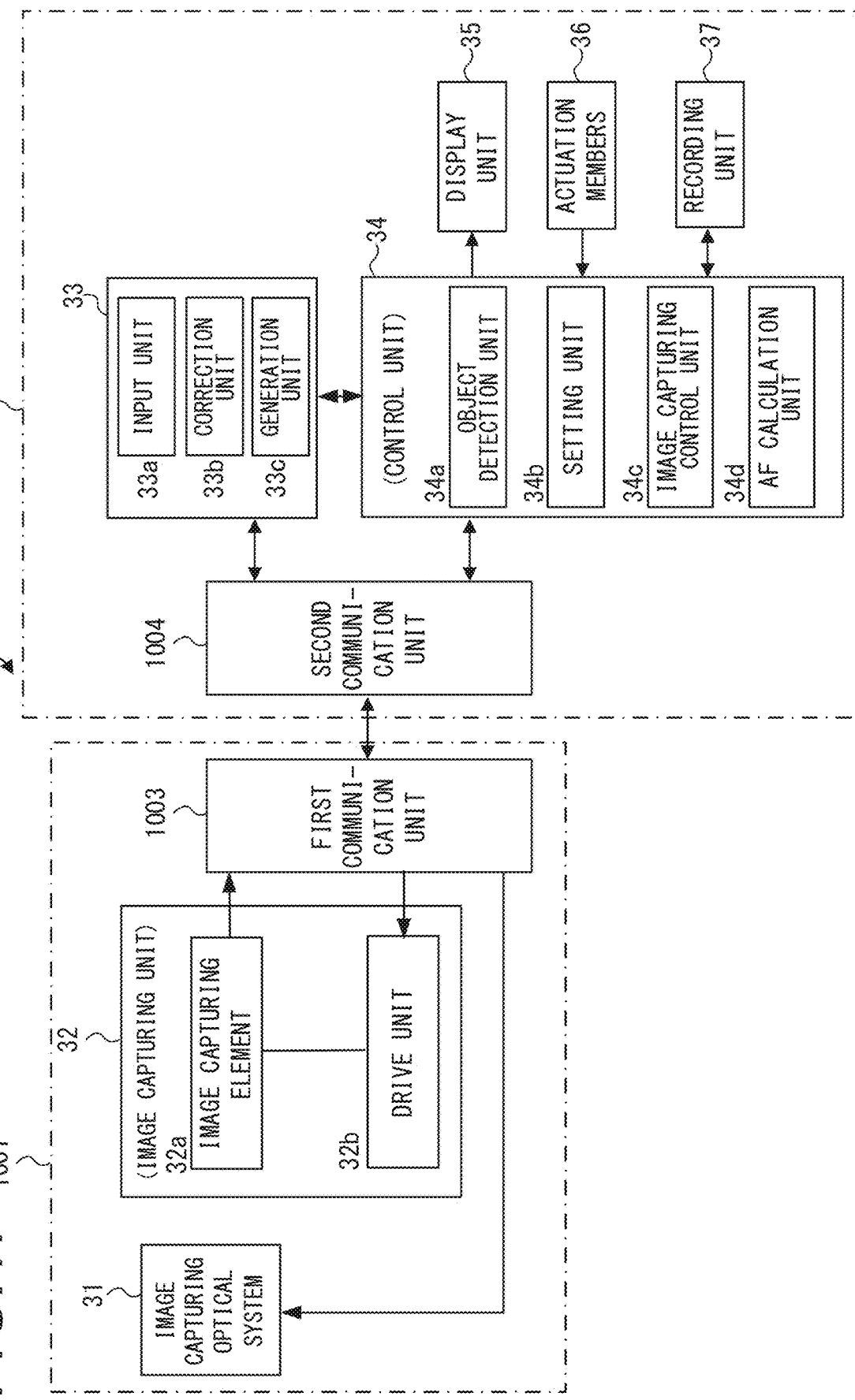
FIG. 17 is a block diagram showing an example of the structure of an image capturing system according to a Variant Embodiment #11.

FIG. 17 is a block diagram showing an example of the structure of an image capturing system 1B according to this Variant Embodiment #11. In FIG. 17, the image capturing system 1B comprises an image capturing device 1001 and a display device 1002. In addition to the image capturing optical system 31 and the image capturing unit 32 of the types described in connection with the above embodiments, the image capturing device 1001 also comprises a first communication unit 1003. Furthermore, in addition to the image processing unit 33, the control unit 34, the display unit 35, the actuation members 36, and the recording unit 37 as described in connection with the above embodiments, the display device 1002 also comprises a second communication unit 1004.

The first communication unit 1003 and the second communication unit 1004 are capable of performing bidirectional image data communication by, for example, a per se known wireless communication technique or optical communication technique or the like.

It should be understood that it would also be acceptable to connect the image capturing device 1001 and the display device 1002 together by cable connection, so that the first communication unit 1003 and the second communication unit 1004 can perform bidirectional image data communication.

In the image capturing system 1B, the control unit 34 performs control of the image capturing unit 32 by performing data communication via the second communication unit 1004 and the first communication unit 1003. For example, by predetermined control data being transmitted and received between the image capturing device 1001 and the display device 1002, the display device 1002 divides the screen into a plurality of regions, sets different image capture conditions for each of the divided regions, and reads out photoelectric conversion signals that have been photoelectrically converted at each region, on the basis of images such as described above.

Since, according to this Variant Embodiment #11, the live view image that is acquired at the image capturing device 1001 and that is transmitted to the display device 1002 is displayed on the display unit 35 of the display device 1002, accordingly the user is able to perform remote actuation from the display device 1002, which is located at a position remote from the image capturing device 1001.

The display device 1002 may, for example, be constituted by a high function portable telephone handset 250 such as a smartphone. Moreover, the image capturing device 1001 may be constituted by an electronic device that is equipped with an imaging element 100 of the laminated type described above.

It should be understood that, although an example has been described in which the detection unit 34a, the setting unit 34b, the image capturing control unit 34c, and the AF calculation unit 34d are provided to the control unit 34 of the display device 1002, it would also be acceptable to arrange for some of the detection unit 34a, the setting unit 34b, the image capturing control unit 34c, and the AF calculation unit 34d to be provided to the image capturing device 1001.

Variant Embodiment #12

Figure 18:
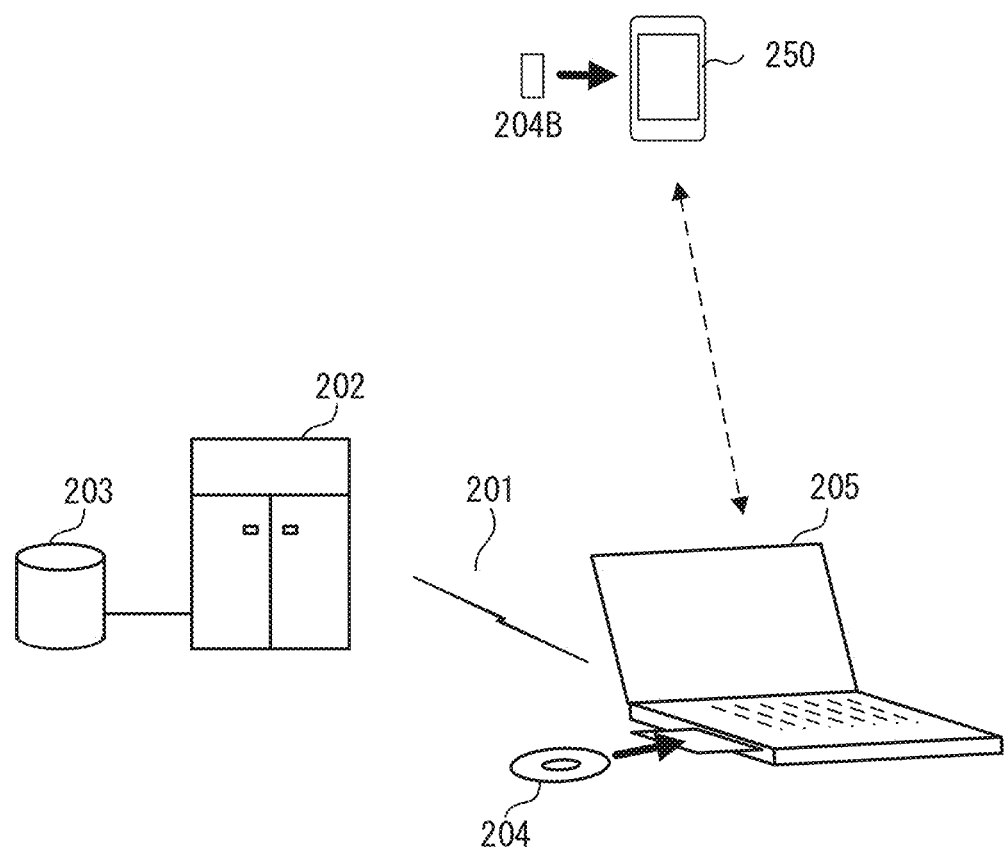
FIG. 18 is a figure for explanation of provision of a program to a mobile device.

As shown by way of example in FIG. 18, supply of the program to a mobile device such as the camera 1 described above, to the high-functioning portable telephone handset 250, or to a tablet terminal or the like may be implemented by infrared radiation transmission to the mobile device from a personal computer 205 on which the program is stored, or by short distance wireless communication.

Supply of the program to the personal computer 205 may be performed by loading a recording medium 204 such as a CD-ROM or the like upon which the program is stored into the personal computer 205, or by loading the program into the personal computer 205 by transmission via a communication line 201 such as a network or the like. If the program is transmitted via such a communication line 201, then the program may be stored in a storage device 203 of a server 202 or the like that is connected to that communication line.

It would also be possible to transmit the program directly to the mobile device by transmission via an access point of a wireless LAN (not shown in the figures) that is connected to the communication line 201. Moreover, it would be possible to load a recording medium 204B such as a memory card or the like upon which the program is stored into the mobile device. In this manner, the program may be supplied as a computer program product in various formats, such as by provision upon a recording medium or via a communication line or the like.

Second Embodiment

A digital camera will now be explained with reference to FIGS. 19 through 25, as one example of an electronic device that is equipped with an image processing device according to the second embodiment of the present invention. In the following explanation, the same reference symbols as those employed for the first embodiment will be appended to structural elements that are similar, and the explanation will principally focus upon the points of difference. Features that are not particularly explained are the same as in the first embodiment. The main feature by which this second embodiment differs from the first embodiment is that, instead of the image processing unit 33 that is provided in the first embodiment, an image capturing unit (or an imaging unit) 32A further comprises an image processing unit 32c that has a similar function to that of the image processing unit 33 of the first embodiment.

Figure 19:
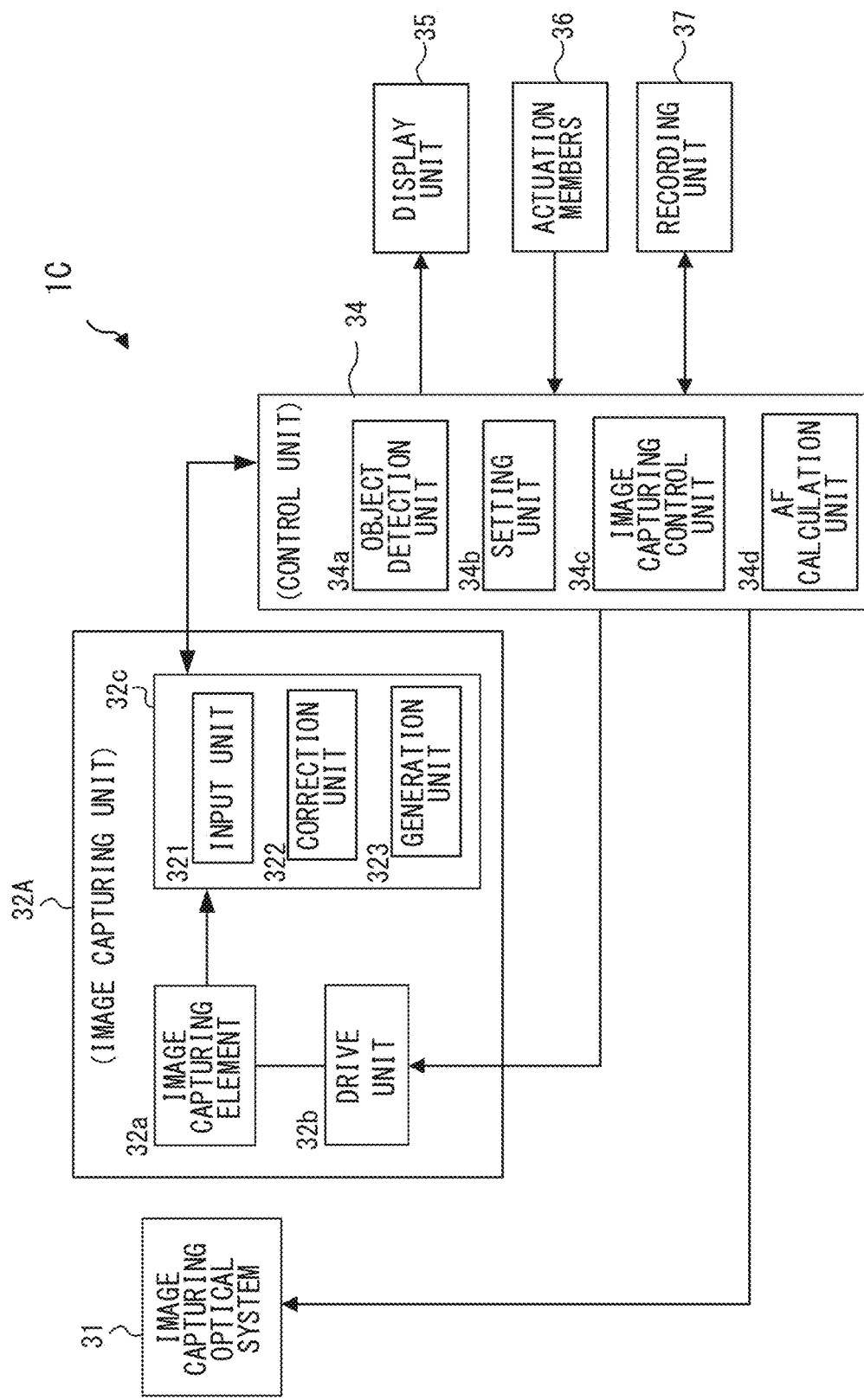
FIG. 19 is a block diagram showing an example of the structure of a camera according to a second embodiment.

FIG. 19 is a block diagram showing an example of the structure of a camera 1C according to this second embodiment. In FIG. 19, the camera 1C comprises the image capturing optical system 31, the aforementioned image capturing unit 32A, the control unit 34, the display unit 35, the actuation members 36, and the recording unit 37. The image capturing unit 32A further comprises an image processing unit 32c that has a function similar to that of the image processing unit 33 of the first embodiment.

The image processing unit 32c includes an input unit 321, a correction unit 322, and a generation unit 323. Image data from the image capturing element 32a is inputted to the input unit 321. The correction unit 322 performs pre-processing to correct the image data that has been inputted as described above. The pre-processing performed by the correction unit 322 is the same as the pre-processing performed by the correction unit 33b in the first embodiment. The generation unit 323 performs image processing upon the image data that has been inputted as described above and upon the image data after pre-processing and generates an image. This image processing performed by the generation unit 323 is the same as the image processing performed by the generation unit 33c in the first embodiment.

Figure 20:
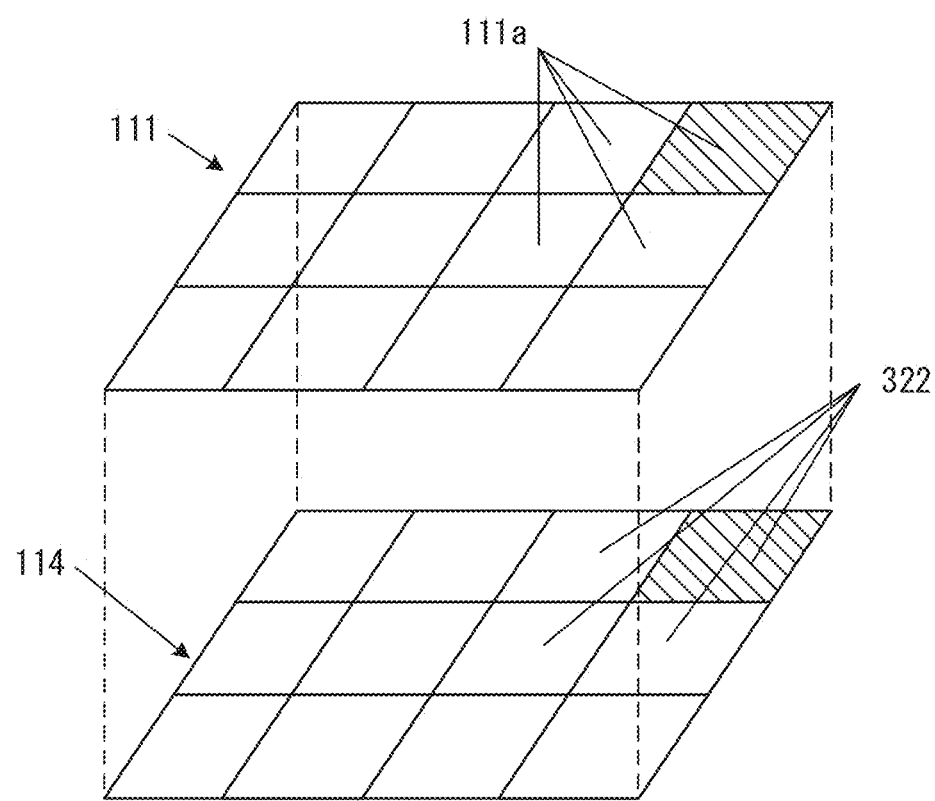
FIG. 20 is a figure schematically showing a correspondence relationship in this second embodiment between a plurality of blocks and a plurality of correction units.

FIG. 20 is a figure schematically showing a correspondence relationship in this second embodiment between a plurality of blocks and a plurality of the correction units 322. In FIG. 20, a single square frame shown as a rectangle on the image capturing chip 111 represents a single block 111a. In a similar manner, a single square frame shown as a rectangle on an image processing chip 114 that will be described hereinafter represents a single correction unit 322.

In this second embodiment, one of the correction units 322 is provided to correspond to each of the blocks 111a. To put this in another manner, one correction unit 322 is provided for each of the blocks, which are the minimum unit regions on the image capturing surface for which the image capture conditions can be changed. For example, the block 111a in FIG. 20 that is shown by shading and the correction unit 322 that is shown by shading are in a relationship of mutual correspondence. The correction unit 322 in FIG. 20 that is shown by shading performs pre-processing for the image data from the pixels that are included in the block 111a that is shown by shading. Thus, each of the correction units 322 performs pre-processing upon the image data from the pixels that are included in the corresponding block 111a.

Since, due to this, it is possible for the pre-processing of the image data to be performed by the plurality of correction units 322 in parallel, accordingly it is possible to alleviate the processing burden upon the correction units 322, and it is possible to generate an appropriate image in a short time period from the image data that has been generated for each of the regions for which the image capture conditions are different.

It should be understood that in the following explanation, when describing the relationship between a block 111a and the pixels that are included in that block 111a, that block 111a may be referred to as being the block 11a to which those pixels belong. Moreover, a block 111a may be referred to as a unit section, and a group having a plurality of the blocks 111a, in other words a collection in which a plurality of unit subdivisions are grouped together, may be referred to as a "compound section".

Figure 21:
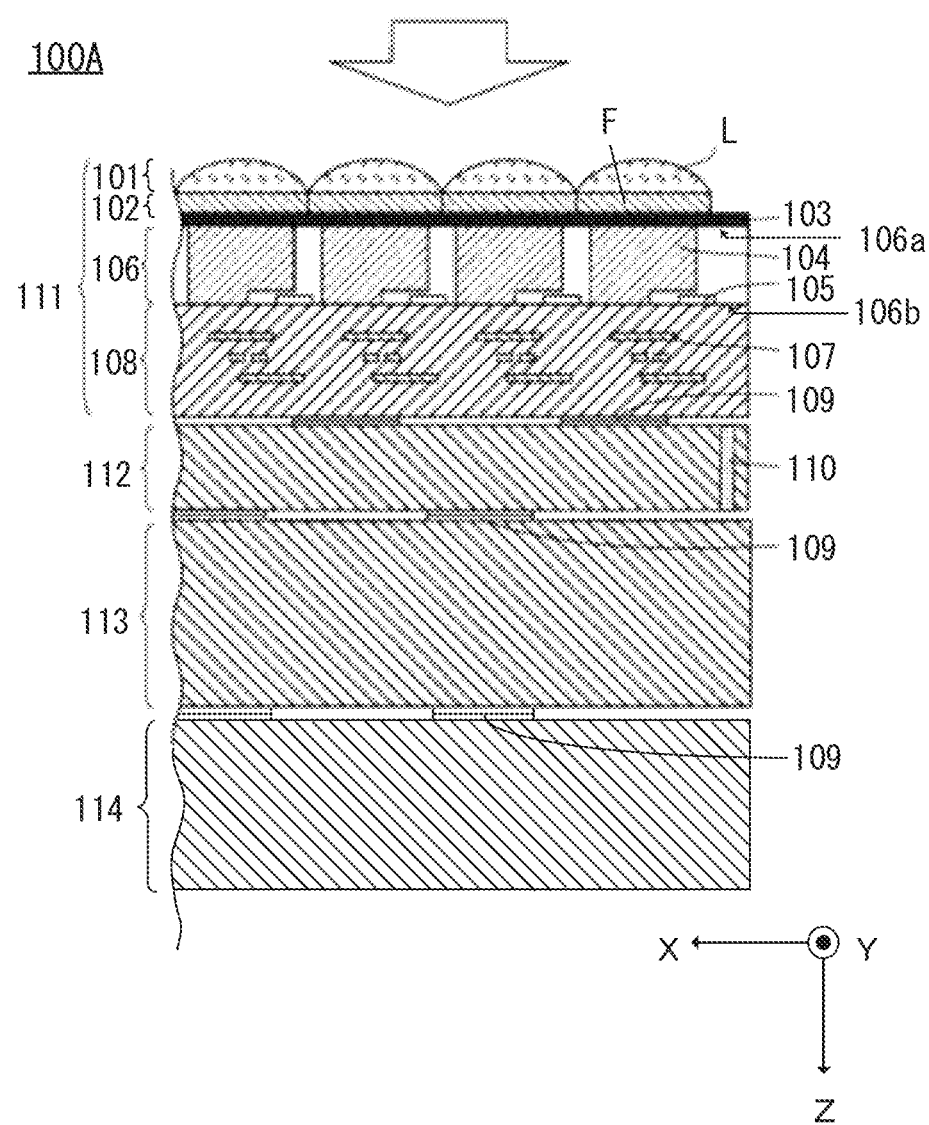
FIG. 21 is a sectional view of a laminated type imaging element.

FIG. 21 is a sectional view of a laminated type imaging element (or image sensor) 100A. In addition to a backside illumination type image capturing chip 111, a signal processing chip 112, and a memory chip 113, this laminated type imaging element 100A further comprises an image processing chip 114 that performs the pre-processing and the image processing described above. In other words, the image processing unit 32c described above is provided upon the image processing chip 114.

The image capturing chip 111, the signal processing chip 112, the memory chip 113, and the image processing chip 114 are laminated together, and are mutually electrically connected together by electrically conductive bumps 109 that are made from copper or the like.

A plurality of the bumps 109 are disposed at the mutually opposing faces of the memory chip 113 and the image processing chip 114. These bumps 109 are mutually positionally aligned, and, by pressing the memory chip 113 and the image processing chip 114 together or the like, the mutually positionally aligned bumps 109 are joined together and are mutually electrically connected.

Correction Processing

In a similar manner to the case with the first embodiment, in this second embodiment it is arranged, after the regions of the image capturing screen have been divided by the setting unit 34b, to be possible to set (or to change) the image capture conditions for a region that has been selected by the user, or for a region that has been determined by the control unit 34. When different image capture conditions have been set for various ones of the subdivided regions, then, according to requirements, the control unit 34 causes the correction units 322 to perform correction processing as follows.

1. When Performing Image Processing 1-1 when Image Capture Conditions for Pixel for Attention P and Image Capture Conditions for Plurality of Reference Pixels Surrounding Pixel for Attention P are the Same In this case, in the image processing unit 32c, correction processing is not performed by the correction units 322, and the generation unit 323 performs image processing by employing the image data for the plurality of reference pixels upon which no correction has been performed.

1-2 when Image Capture Conditions for Pixel for Attention P and Image Capture Conditions for at Least One Reference Pixel Among Plurality of Reference Pixels Surrounding Pixel for Attention P are Different It will be supposed that the image capture conditions that are applied at the pixel for attention P are the first image capture conditions, that the image capture conditions that are applied at a portion of the plurality of reference pixels are the first image capture conditions, and that the image capture conditions that are applied at the remainder of the reference pixels are the second image capture conditions.

In this case, the correction unit 322 corresponding to a block 111a to which a reference pixel to which the second image capture conditions have been applied belongs performs correction processing as shown in the following Examples #1 through #3 upon the image data for the reference pixel to which the second image capture conditions have been applied. And the generation unit 323 performs image processing for calculating the image data for the pixel for attention P by referring to the image data for the reference pixel to which the first image capture conditions have been applied, and to the image data for the reference pixel after correction processing.

Example #1

If, for example, the only difference between the first image capture conditions and the second image capture conditions is their ISO sensitivity, with the ISO sensitivity in the first image capture conditions being 100 while the ISO sensitivity in the second capture conditions is 800, then, as correction processing, the correction unit 322 corresponding to the block 111a, to which the reference pixel to which the second image capture conditions have been applied belongs, multiplies the image data for the reference pixel by 100/800.

By doing this, variance in the image data due to the difference in the image capture conditions is reduced.

Example #2

If, for example, the only difference between the first image capture conditions and the second image capture conditions is their shutter speed, with the shutter speed in the first image capture conditions being 1/1000 sec. while the shutter speed in the second capture conditions is 1/100 sec., then, as correction processing, the correction unit 322 corresponding to the block 111a, to which the reference pixel to which the second image capture conditions have been applied belongs, multiplies the image data for the reference pixel by 1/1000/1/100=1/10. By doing this, discrepancy in the image data caused by the difference in the image capture conditions is reduced.

Example #3

If, for example, the only difference between the first image capture conditions and the second image capture conditions is their frame rate (and with the charge accumulation time being the same), with the frame rate in the first image capture conditions being 30 fps while the frame rate in the second capture conditions is 60 fps, then, for the image data for the reference pixel, in other words for the image data to which the second image capture conditions (with frame rate 60 fps) have been applied, the correction units 322 corresponding to the block 111a, to which the reference pixel to which the second image capture conditions have been applied belongs, performs correction processing by employing the image data for the frame images whose starting times of acquisition are close to those of the frame images that were acquired under the first image capture conditions (with frame rate 30 fps). Due to this, variance in the image data due to the difference in the image capture conditions is reduced.

It should be understood that it would also be acceptable to perform the correction processing by, on the basis of the previous and subsequent frame images that were acquired under the second image capture conditions (with frame rate 60 fps), performing interpolation calculation upon the image data for the frame images whose starting times of acquisition are close to those of the frame images that were acquired under the first image capture conditions (with frame rate 30 fps).

Moreover, it should also be noted that the same applies to the case in which the image capture conditions that were applied to the pixel for attention P are taken as being the second image capture conditions, while the image capture conditions that were applied to reference pixels around the pixel for attention P are taken as being the first image capture conditions. In other words, in this case, the correction unit 322 corresponding to the block 111a to which the reference pixel to which the first image capture conditions have been applied performs correction processing as described in the above Examples #1 through #3 upon the image data for the reference pixel.

It should be understood that, as described above, even if the image capture conditions are slightly or insubstantially different, they are still considered to be the same image capture conditions.

Figure 22:
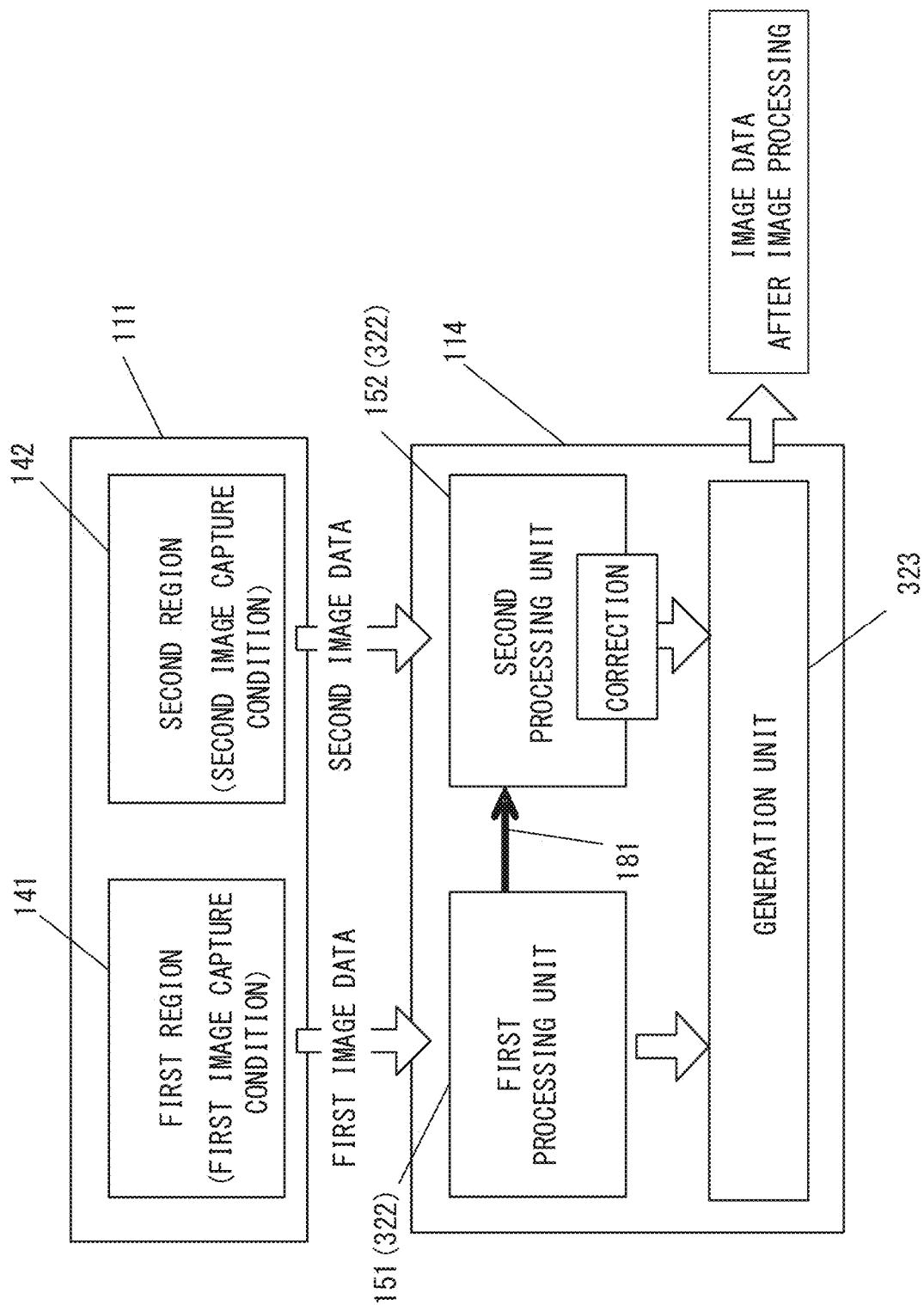
FIG. 22 is a figure relating to image processing, in which the processing of first image data and the processing of second image data are schematically illustrated.

On the basis of the image data for the reference pixel to which the same image capture conditions as the image capture conditions for the pixel for attention P have been applied and the image data for the reference pixel that has been corrected by the correction unit 322, the generation unit 323 perform image processing such as pixel defect correction processing, color interpolation processing, contour emphasis processing, and noise reduction processing and the like, in a similar manner to the case for the image processing unit 33 (i.e. the generation unit 33c) in the first embodiment of the present invention. FIG. 22 is a figure in which the processing of image data (hereinafter termed "first image data") from pixels that are included in a partial region (hereinafter termed the "first region 141") of the image capturing surface to which the first image capture conditions have been applied and the processing of image data (hereinafter termed "second image data") from pixels that are included in a partial region (hereinafter termed the "second region 142") of the image capturing surface to which the second image capture conditions have been applied are schematically illustrated.

First image data that has been captured under the first image capture conditions is outputted from each of the pixels included in the first region 141, and second image data that has been captured under the second image capture conditions is outputted from each of the pixels included in the second region 142. The first image data is outputted to those correction units 322, among the correction units 322 provided to the processing chip 114, that correspond to the blocks 111a to which the pixels generating the first image data belong. In the following explanation, the plurality of correction units 322, that respectively correspond to the plurality of blocks 111a to which the pixels generating the first image data belong, will be termed a "first processing unit 151".

In a similar manner, the second image data is outputted to those correction units 322, among the correction units 322 provided to the processing chip 114, that correspond to the blocks 111a to which the pixels generating the second image data belong. In the following explanation, the plurality of correction units 322, that respectively correspond to the plurality of blocks 111a to which the pixels generating the second image data belong, will be termed a "second processing unit 152".

For example, if the pixel for attention P is included in the first region 141, then the second image data from the reference pixels that are included in the second region 142 is subjected to the correction processing described above by the second processing unit 152, as shown in FIG. 22. It should be understood that the second processing unit 152 receives from the first processing unit 151, for example, information 181 related to the first image capture conditions that is required for reducing variance in the image data due to the difference in the image capture conditions.

In a similar manner, for example, if the pixel for attention P is included in the second region 142, then the first image data from the reference pixels that are included in the first region 141 is subjected to the correction processing described above by the first processing unit 151. It should be understood that the first processing unit 151 receives from the second processing unit 152 information related to the second image capture conditions that is required for reducing variance in the image data due to the difference in the image capture conditions.

It should be understood that, if the pixel for attention P and also the reference pixels are included in the first region 141, then the first processing unit 151 does not perform correction upon the first image data from those reference pixels. In a similar manner, if the pixel for attention P and also the reference pixels are included in the second region 142, then the second processing unit 152 does not perform correction upon the second image data from those reference pixels.

Alternatively, it would also be acceptable to arrange for both the image data that was captured under the first image capture conditions and the image data that was captured under the second image capture conditions to be corrected, respectively, by the first processing unit 151 and the second processing unit 152. In other words it would be acceptable to arrange to alleviate discontinuity in the image arising from the difference between the first image capture conditions and the second image capture conditions by performing correction processing upon the image data for the position of attention that was captured under the first image capture conditions, upon the image data, among the image data for the reference positions, that was captured under the first image capture conditions, and also upon the image data, among the image data for the reference positions, that was captured under the second image capture conditions.

For example, in Example #1 described above, the image data of the reference pixels that were captured under the first image capture conditions (with ISO sensitivity 100) may be multiplied by 400/100 as correction processing, while the image data of the reference pixels that were captured under the second image capture conditions (with ISO sensitivity 800) is multiplied by 400/800 as correction processing. By doing this, discrepancy in the image data due to the difference in the image capture conditions is reduced. It should be noted that the pixel data for the pixel for attention is subjected to correction processing by being multiplied by 100/400 after the color interpolation processing. Due to this correction processing, it is possible to change the pixel data of the pixel for attention after color interpolation processing to a value similar to the value obtained under the first image capture conditions. Moreover, in Example #1 above, it would also be acceptable to change the level of the correction processing according to the distances of the first region and the second region from a boundary. And it would also be possible to reduce the rate of increase or decrease of the image data in the correction processing as compared with the case of Example #1 above, thereby enabling reduction of the noise caused by the correction processing. Although the above explanation relates to Example #1 described above, it can also be applied, in a similar manner, to Example #2 described above as well.

On the basis of the image data from the first processing unit 151 and from the second processing unit 152, the generation unit 323 performs image processing such as pixel defect correction processing, color interpolation processing, contour emphasis processing, noise reduction processing, and the like, and outputs the image data after image processing.

It should be understood that, if the pixel for attention P is positioned in the second region 142, then it will be acceptable to arrange for the first processing unit 151 to perform correction processing upon the first image data from all of the pixels that are included in the first region 141; or, alternatively, it will also be acceptable to arrange for the first processing unit 151 to perform correction processing upon only the first image data from those pixels, among the pixels that are included in the first region 141, that are likely to be employed for interpolation of the pixel for attention P in the second region 142. In a similar manner, if the pixel for attention P is positioned in the first region 141, then it will be acceptable to arrange for the second processing unit 152 to perform correction processing upon the second image data from all of the pixels that are included in the second region 142; or, alternatively, it will also be acceptable to arrange for the second processing unit 152 to perform correction processing upon only the second image data from those pixels, among the pixels that are included in the second region 142, that are likely to be employed for interpolation of the pixel for attention P in the first region 141.

2. When Performing Focus Detection Processing

In a similar manner to the case with the first embodiment, the control unit 34 (i.e. the AF calculation unit 34d) performs focus detection processing by employing signal data (i.e. image data) corresponding to a predetermined position (i.e. the focus detection position) in the image capturing screen. It should be understood that, if different image capture conditions are set for the various divided regions, and the focus detection position for AF operation is positioned at a boundary portion between the divided regions, in other words if the focus detection position is divided into two between a first region and a second region, then, in this second embodiment, as explained in 2-2 below, the control unit 34 (i.e. the AF calculation unit 34d) causes the correction unit 322 so as to perform correction processing on the signal data for focus detection from at least one region.

2-1. If Signal Data to which the First Image Capture Conditions have been Applied and Signal Data to which the Second Image Capture Conditions have been Applied are not Mixed Together in the Signal Data from the Pixels in the Frame 170 of FIG. 13

In this case the correction unit 322 does not perform any correction processing, and the control unit 34 (i.e. the AF calculation unit 34d) performs the focus detection processing by employing the signal data from the pixels for focus detection shown by the frame 170 just as it is without alteration.

2-2. If Signal Data to which the First Image Capture Conditions have been Applied and Signal Data to which the Second Image Capture Conditions have been Applied are Mixed Together in the Signal Data from the Pixels in the Frame 170 of FIG. 13

In this case, the control unit 34 (i.e. the AF calculation unit 34d) causes the correction unit 322 corresponding to the block 111a to which the pixel, among the pixels within the frame 170, to which the second image capture conditions have been applied belongs, to perform correction processing as shown in the following Examples #1 through #3. And the control unit 34 (i.e. the AF calculation unit 34d) performs the focus detection processing by employing the signal data for the pixels to which the first image capture conditions have been applied, and also the signal data after the correction processing.

Example #1

If, for example, the only difference between the first image capture conditions and the second image capture conditions is their ISO sensitivity, with the ISO sensitivity in the first image capture conditions being 100 while the ISO sensitivity in the second capture conditions is 800, then, as correction processing, the correction unit 322 corresponding to the block 111a, to which the pixels to which the second image capture conditions have been applied belong, multiplies the signal data captured under the second image capture conditions by 100/800. By doing this, variance between the signal data caused by the different image capture conditions are reduced.

Example #2

If, for example, the only difference between the first image capture conditions and the second image capture conditions is their shutter speed, with the shutter speed in the first image capture conditions being 1/1000 sec. while the shutter speed in the second capture conditions is 1/100 sec., then, as correction processing, the correction unit 322 corresponding to the block 111a, to which the pixels to which the second image capture conditions have been applied belong, multiply the signal data captured under the second image capture conditions by 1/1000/1/100=1/10. By doing this, variance between the signal data caused by the difference in the image capture conditions are reduced.

Example #3

If, for example, the only difference between the first image capture conditions and the second image capture conditions is their frame rate (with the charge accumulation time being the same), with the frame rate in the first image capture conditions being 30 fps while the frame rate in the second capture conditions is 60 fps, then, as correction processing, the correction unit 322 corresponding to the block 111a, to which the pixels to which the second image capture conditions have been applied belong, performs correction processing upon the signal data captured under the second image capture conditions (i.e. at 60 fps) by employing the signal data for the frame images whose starting times of acquisition are close to the frame images that were acquired under the first image capture conditions (with frame rate 30 fps). By doing this, variance in the signal data due to the difference in the image capture conditions is reduced.

It should be understood that it would also be acceptable to perform, as the correction processing, on the basis of the previous and subsequent frame images that were acquired under the second image capture conditions (with frame rate 60 fps), interpolation calculation of the signal data for the frame image whose starting time of acquisition is close to that of the frame image acquired under the first image capture conditions (with frame rate 30 fps).

It should be understood that, as described above, even if the image capture conditions are slightly or insubstantially different, they are still considered to be the same image capture conditions.

Moreover, an example has been described above in which the correction processing is performed upon the signal data, among the signal data, that has been captured under the second image capture conditions; but it would also be acceptable to perform the correction processing upon the signal data, among the signal data, that has been captured under the first image capture conditions.

Yet further it would also be acceptable to arrange for the correction processing to be performed upon, among the signal data, both the signal data that has been captured under the first image capture conditions and the signal data that has been captured under the second image capture conditions, whereby the difference between the signal data after correction processing could be made yet smaller.

Figure 23:
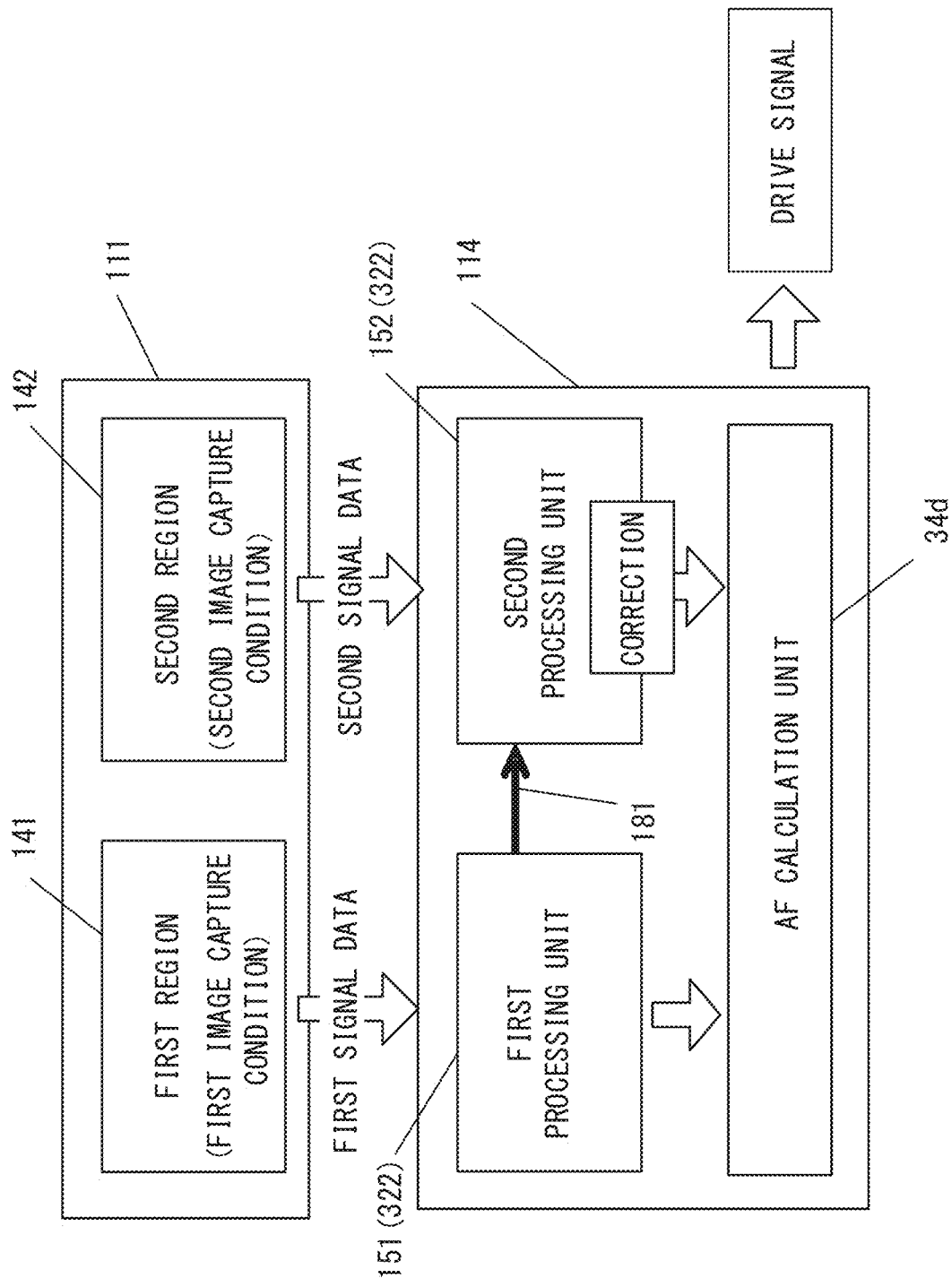
FIG. 23 is a figure relating to focus detection processing, in which the processing of the first image data and the processing of the second image data are schematically illustrated.

FIG. 23 is a figure in which the processing of the first image data and the processing of the second image data relating to focus detection processing are schematically shown.

First signal data that has been captured under the first image capture conditions is outputted from each pixel that is included in the first region 141, and second signal data that has been captured under the second image capture conditions is outputted from each pixel that is included in the second region 142. The first signal data from the first region 141 is outputted to the first processing unit 151. In a similar manner, the second signal data from the second region 142 is outputted to the second processing unit 152.

When performing correction processing upon, among the signal data, the signal data that has been captured under the second image capture conditions so as to reduce the difference between the signal data after correction processing and the signal data that was captured under the first image capture conditions, the second processing unit 152 performs that processing. The second processing unit 152 performs the correction processing described above upon the second signal data from the pixels included in the second region 142. It should be understood that the second processing unit 152 receives information 181 relating to the first image capture conditions that is required for reducing the difference in the signal data caused by the different image capture conditions, for example from the first processing unit 151.

On the other hand it should be understood that, in this case in which the difference between the signal data after correction processing and the signal data that was captured under the first image capture conditions is reduced by performing correction processing upon, among the signal data, the signal data that was captured under the second image capture conditions, the first processing unit 151 does not perform correction of the first signal data.

Furthermore, when reducing the difference between the signal data after correction processing and the signal data captured under the first capture conditions by performing correction processing upon the signal data, among the signal data, that was captured under the first image capture conditions, then the first processing unit 151 performs processing. The first processing unit 151 performs the correction processing described above upon the first signal data from the pixels that are included in the first region 141. It should be understood that the first processing unit 151 receives from the second processing unit 152 information relating to the second image capture conditions, required in order to reduce variance in the signal data due to the different image capture conditions.

It should be noted that, in this case in which the difference between the signal data after correction processing and the signal data that was captured under the first image capture conditions is reduced by performing correction processing upon, among the signal data, the signal data that has been captured under the first image capture conditions, then the second processing unit 152 does not correct the second signal data.

Even further, for reducing the difference between the two sets of signal data after the correction processing by performing correction processing upon, among the signal data, both the signal data captured under the first image capture conditions and the signal data captured under the second image capture conditions, then both the first processing unit 151 and the second processing unit 152 perform processing. The first processing unit 151 performs the correction processing described above upon the first signal data from the pixels that are included in the first region 141, and the second processing unit 152 performs the correction processing described above upon the second signal data from the pixels that are included in the second region 142.

The AF calculation unit 34d performs the focus detection processing on the basis of the signal data from the first processing unit 151 and from the second processing unit 152, and outputs a drive signal for causing the focusing lens of the image capturing optical system 31 to shift to its focusing position on the basis of the results of this calculation.

3. When Performing Photographic Subject Detection Processing

When different image capture conditions are set for the various subdivided regions and the search range 190 includes a boundary between the subdivided regions, then, in the present embodiment, as explained in 3-2 below, the control unit 34 (i.e. the object detection unit 34*a*) causes the correction unit 322 to perform correction processing upon the image data for at least one region within the search range 190.

3-1. If Image Data to which the First Image Capture Conditions have been Applied and Image Data to which the Second Image Capture Conditions have been Applied are not Mixed Together in the Image Data of the Search Range 190 of FIG. 14

In this case, the correction unit 322 does not perform any correction processing, and the control unit 34 (i.e. the object detection unit 34*a*) performs photographic subject detection processing by employing the image data that constitutes the search range 190 just as it is without alteration.

3-2. If Image Data to which the First Image Capture Conditions have been Applied and Image Data to which the Second Image Capture Conditions have been Applied are Mixed Together in the Image Data of the Search Range 190 of FIG. 14

In this case, the control unit 34 (i.e. the object detection unit 34*a*) causes the correction unit 322 corresponding to the block 111*a* to which the pixels, in the image of the search range 190, to which the second image capture conditions have been applied belong, to perform correction processing as explained in Examples #1 through #3 described above for performing focus detection processing. And the control unit 34 (i.e. the object detection unit 34*a*) performs the photographic subject detection processing by employing the image data for the pixels to which the first image capture conditions have been applied, and also the image data after the correction processing described above.

Figure 24:
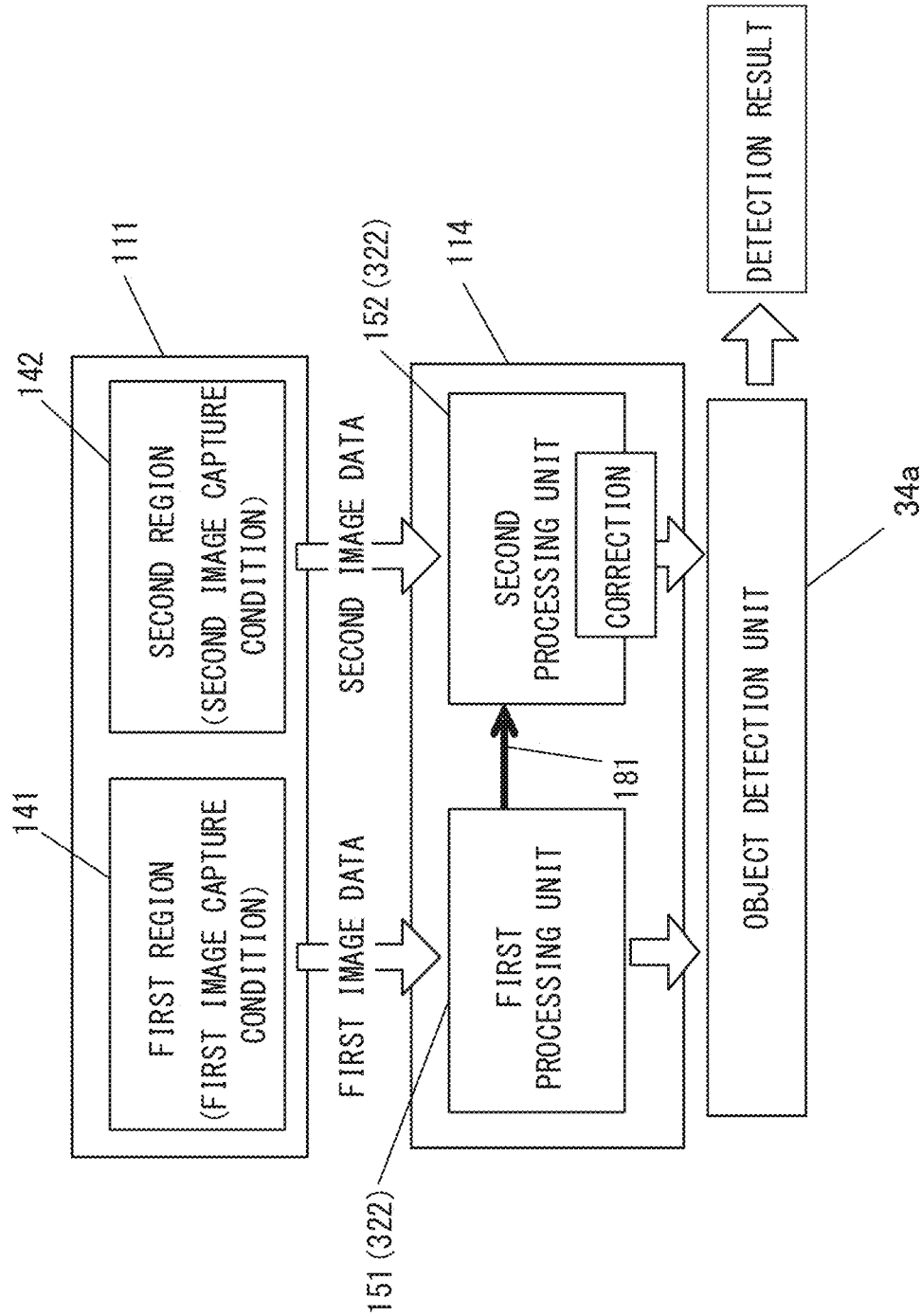
FIG. 24 is a figure relating to photographic subject detection processing, in which the processing of the first image data and the processing of the second image data are schematically shown.

FIG. 24 is a figure in which the processing of the first image data and the processing of the second image data relating to the photographic subject detection processing are schematically shown. The correction processing performed by the first processing unit 151 and/or the second processing unit 152 is the same as the correction processing of FIG. 23 for the case of performing the focus detection processing.

The object detection unit 34*a* performs processing for detection of the photographic subject elements on the basis of the image data from the first processing unit 151 and from the second processing unit 152, and outputs the results of this detection.

4. When Setting Image Capture Conditions

The case will now be explained in which, in the state that the image capturing screen has been subdivided into regions and different image capture conditions have been set for the different subdivided regions, photometry is newly performed and the exposure conditions are newly determined.

4-1. If Image Data to which the First Image Capture Conditions have been Applied and Image Data to which the Second Image Capture Conditions have been Applied are not Mixed Together in the Image Data of the Photometric Range In this case, the correction unit 322 does not perform any correction processing, and the control unit 34 (i.e. the setting unit 34*b*) performs the exposure calculation processing by employing the image data that constitutes the photometric range just as it is without alteration.

4-2. If Image Data to which the First Image Capture Conditions have been Applied and Image Data to which the Second Image Capture Conditions have been Applied are Mixed Together in the Image Data of the Photometric Range In this case, the control unit 34 (i.e. the setting unit 34*b*) causes the correction unit 322 corresponding to the block 111*a* to which the pixels, in the image data of the photometric range, to which the second image capture conditions have been applied belong, to perform correction processing as shown in Examples #1 through #3 described above for performing focus detection processing. And the control unit 34 (i.e. the setting unit 34*b*) performs the exposure calculation processing by employing the image data after the correction processing described above.

Figure 25:
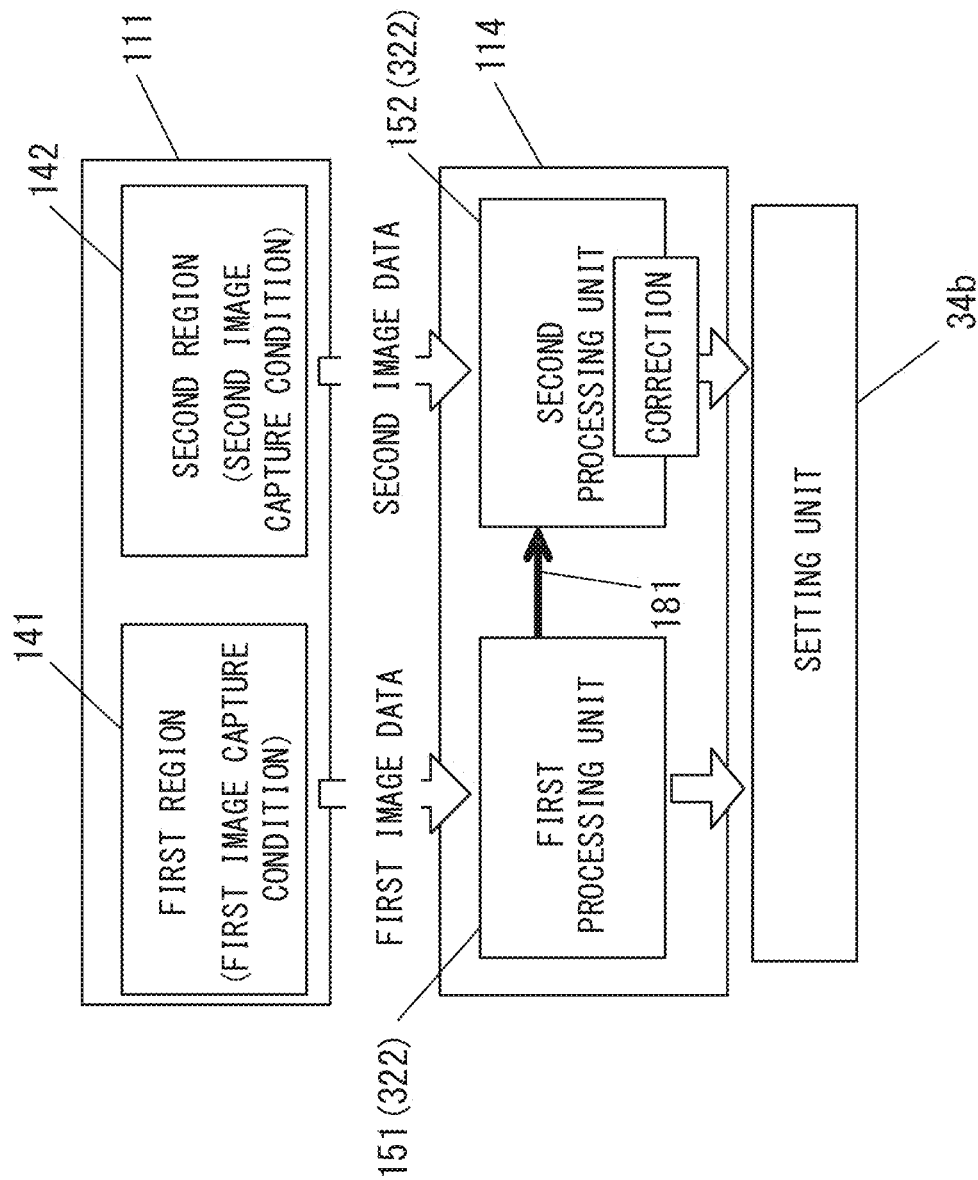
FIG. 25 is a figure relating to the setting of image capture conditions such as exposure calculation processing and so on, in which the processing of the first image data and the processing of the second image data are schematically illustrated.

FIG. 25 is a figure in which the processing of the first image data and the processing of the second image data are schematically shown, relating to setting of image capture conditions such as for exposure calculation processing and so on. The correction processing performed by the first processing unit 151 and/or the second processing unit 152 is the same as the correction processing of FIG. 23 described above for the case of performing the focus detection processing.

On the basis of the image data from the first processing unit 151 and from the second processing unit 152, the setting unit 34*b* performs calculation processing for image capture conditions such as for exposure calculation processing and so on, subdivides the image capturing screen of the image capturing unit 32 into a plurality of regions containing the photographic subject elements that have been detected, and then resets the image capture conditions for each of this plurality of regions on the basis of the results of the above calculation.

According to this second embodiment as explained above, the following advantageous operational effects are obtained.

(1) The camera 1C comprises the image capturing element 32*a* that is capable of capturing images under image capture conditions changed for each unit section of the image capturing surface, and that generates the first image data from the first region having at least one unit section in which image capture is performed under the first image capture conditions, and the second image data from the second region having at least one unit section in which image capture is performed under the second image capture conditions that are different from the first image capture conditions. And the camera 1C comprises a plurality of the correction units 322 that are provided to correspond to each of the unit sections, or to each of compound sections each having a plurality of unit sections, and that are capable of correcting the image data from the respective unit sections, or from the unit section within the respective compound sections. The correction units 322 that correspond to the unit sections or to the compound sections within the second region correct the first image data by the second image capture conditions. The image capturing element 32*a* is provided at the backside illumination type image capturing chip 111. And the plurality of correction units 322 are provided at the image processing chip 114.

As a result it is possible to alleviate the processing burden upon the correction units 322, since it is possible to perform the correction processing of the image data with a plurality of the correction units 322 in parallel.

(2) The backside illumination type image capturing chip 111 and the image processing chip 114 are laminated together or stacked one on top of another. Due to this, it is possible to connect the image capturing element 32*a* and the image processing unit 32*c* together simply and easily.

(3) The camera 1C comprises the generation unit 323 that generates an image on the basis of the first image data corrected by the correction units 322, and of the second image data. Since, due to this, the pre-processing by the plurality of correction units 322 is performed in a short time period by parallel processing, accordingly it is possible to shorten the time period until the image is generated.

(4) The camera 1C comprises the image capturing element 32a that is capable of capturing an image under image capture conditions changed for each unit sections of the image capturing surface, and that generates the first image data from the first region having at least one unit section in which an optical image incident via the image capturing optical system is captured under the first image capture conditions, and the second image data from the second region having at least one unit section in which the incident optical image is captured under the second image capture conditions that are different from the first image capture conditions. And the camera 1C comprises a plurality of the correction units 322 that are provided to correspond to each of the unit sections, or to each of compound sections each having a plurality of unit section, and that are capable of correcting the image data from the respective unit sections, or from the unit section within the respective compound sections. The camera 1C also comprises the AF calculation unit 34d that detects information for shifting the image capturing optical system. The correction units 322 that correspond to the unit sections or to the compound sections within the first region correct the first image data so as to reduce a difference from the second image data. The AF calculation unit 34d detects information for shifting the image capturing optical system on the basis of the first image data that has been corrected by the correction units 322, and of the second image data. The image capturing element 32a is provided at the backside illumination type image capturing chip 111. And the plurality of correction units 322 are provided at the image processing chip 114.

Since it is possible to perform the correction processing of the image data with the plurality of correction units 322 that perform processing in parallel, accordingly, along with it being possible to alleviate the processing burden upon the correction units 322, also it is possible for the pre-processing to be performed by the plurality of correction units 322 in a short time period by parallel processing, and thus it is possible to shorten the time period until focus detection processing by the AF calculation unit 34d starts, which makes a contribution to speeding up the focus detection processing.

(5) The camera 1C comprises the image capturing element 32a that is capable of capturing an image under image capture conditions changed for each unit sections of the image capturing surface, and that generates the first image data from the first region having at least one unit sections in which an incident image of the photographic subject is captured under the first image capture conditions, and the second image data from the second region having at least one unit section in which an incident image of the photographic subject is captured under the second image capture conditions that are different from the first image capture conditions. And the camera 1C comprises the plurality of correction units 322 that are provided to correspond to each of the unit sections, or to each of compound sections each having a plurality of the unit subdivisions, and that are capable of correcting the image data from the corresponding unit sections, or from the unit sections within the corresponding compound section. The camera 1C also comprises the object detection unit 34a that detects the objects from the photographic subject image. The correction units 322 that correspond to the unit sections or to the compound sections within the first region correct the first image data so as to reduce the difference of its values from the values of the second image data. The object detection unit 34a detects the objects from the photographic subject image, on the basis of the first image data that has been corrected by the correction units 322, and the second image data. The image capturing element 32a is provided at the backside illumination type image capturing chip 111. And the plurality of correction units 322 are provided at the image processing chip 114.

Since it is possible to perform the correction processing of the image data with the plurality of correction units 322 that operate by parallel processing, accordingly, along with it being possible to alleviate the processing burden upon the correction units 322, also it is possible for the pre-processing to be performed by the plurality of correction units 322 in a short time period by parallel processing, and thus it is possible to shorten the time period until photographic subject detection processing by the object detection unit 34a starts, which makes a contribution to speeding up the photographic subject detection processing.

(6) The camera 1C comprises the image capturing element 32a that is capable of capturing an image with different image capture conditions for each unit sections of the image capturing surface, and that generates the first image data from the first region having at least one unit section in which an incident optical image is captured under the first image capture conditions, and the second image data from the second region having at least one unit section in which an incident optical image is captured under the second image capture conditions that are different from the first image capture conditions. And the camera 1C comprises a plurality of the correction units 322 that are provided to correspond to each of the unit sections, or to each of compound subdivisions each having a plurality of unit sections, and that are capable of correcting the image data from the corresponding unit sections, or from the unit sections within the corresponding compound sections. The camera 1C also comprises the setting unit 34b that sets the image capture conditions. The correction units 322 that correspond to the unit sections or to the compound sections within the first region correct the first image data so as to reduce a difference from the second image data. The setting unit 34b sets the image capture conditions on the basis of the first image data that has been corrected by the correction units 322, and of the second image data. The image capturing element 32a is provided at the backside illumination type image capturing chip 111. And the plurality of correction units 322 are provided at the image processing chip 114.

Since it is possible to perform the correction processing of the image data with the plurality of correction units 322 that operate by parallel processing, accordingly, along with it being possible to alleviate the processing burden upon the correction units 322, also it is possible for the pre-processing to be performed by the plurality of correction units 322 in a short time period by parallel processing, and thus it is possible to shorten the time period until setting processing for the image capture conditions by the setting unit 34b starts, which makes a contribution to speeding up the processing for setting the image capture conditions.

Variants of Second Embodiment

The following modifications also come within the scope of the present invention, and moreover it would be possible to combine one or a plurality of these modifications with one another, and/or with the embodiments described above.

Variant Embodiment #13

The processing of the first image data and the second image data when the first region and the second region are arranged in the image capturing surface of the image capturing element 32a as shown in FIGS. 16A through 16C for Variant Embodiment #1 of the first embodiment of the present invention will now be explained.

In this Variant Embodiment as well, in a similar manner to Variant Embodiment #1, in any of the cases shown in FIGS. 16A through 16C, a first image based upon the image signals read out from the first region and a second image based upon the image signals read out from the second region are generated according to the pixel signals read out from the image capturing element 32a that has performed capture of one frame. In this Variant Embodiment as well, in a similar manner to Variant Embodiment #1, the control unit 34 employs the first image for display and employs the second image for detection.

The image capture conditions set for the first region for capture of the first image will be termed the "first image capture conditions", and the image capture conditions set for the second region for capture of the second image will be termed the "second image capture conditions". The control unit 34 may make the first image capture conditions and the second image capture conditions be different from one another.

Figure 26:
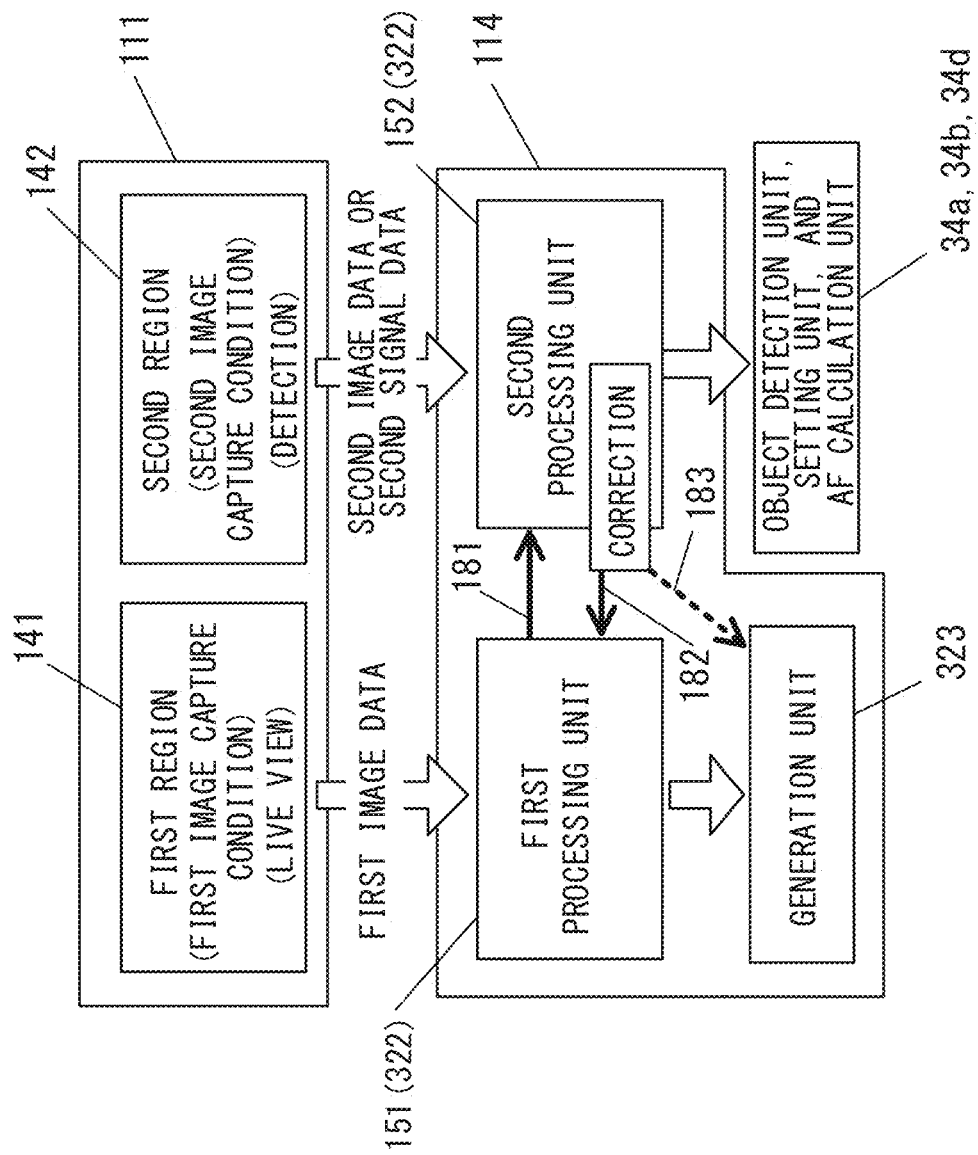
FIG. 26 is a figure in which processing of first image data and processing of second image data according to a Variant Embodiment #13 are schematically shown.

1. With reference to FIG. 26, an example will now be explained for the case in which the first image capture conditions set for the first region are the same over the entire first region of the image capturing screen, and also the second image capture conditions set for the second region are the same over the entire second region of the imaging screen. FIG. 26 is a figure schematically showing the processing of the first image data and the second image data.

The first image data captured under the first image capture conditions is outputted from each pixel included in the first region 141, and the second image data captured under the second image capture conditions is outputted from each pixel included in the second region 142. The first image data from the first region 141 is outputted to the first processing unit 151. In a similar manner, the second image data from the second region 142 is outputted to the second processing unit 152.

In this example, the first processing unit 151 does not perform any correction upon the first image data from the reference pixels belonging to the first region, since the first image capture conditions are the same over the entire first region of the image capturing screen. Furthermore, the second processing unit 152 does not perform any correction of the second image data to be employed in focus detection processing, photographic subject detection processing, or exposure calculation processing, since the second image capture conditions are the same over the entire second region of the image capturing screen. However, the second processing unit 152 does perform correction processing upon the second image data that is employed for interpolation of the first image data, in order to reduce a difference in the image data caused by the difference in the first image capture conditions and the second image capture conditions. The second processing unit 152 outputs the second image data after correction processing to the first processing unit 151, as shown by an arrow sign 182. It should be understood that it would also be acceptable for the second processing unit 152 to output the second image data after correction processing to the generation unit 323, as shown by a broken arrow sign 183.

The second processing unit 152 receives from the first processing unit 151, for example, information 181 relating to the first image capture conditions required for reducing variance in the image data due to the difference in the image capture conditions.

On the basis of the first image data from the first processing unit 151 and the second image data upon which correction processing has been performed by the second processing unit 152, the generation unit 323 performs image processing such as pixel defect correction processing, color interpolation processing, contour emphasis processing, noise reduction processing, and so on, and outputs the image data after this image processing.

The object detection unit 34a performs processing to detect the photographic subject elements on the basis of the second image data from the second processing unit 152, and outputs the results of this detection.

On the basis of the second image data from the second processing unit 152, the setting unit 34b performs calculation processing of image capture conditions such as for exposure calculation processing and so on, divides the image capturing screen of the image capturing unit 32 into a plurality of regions that include the photographic subject elements that have been detected, and then resets the image capture conditions for this plurality of regions on the basis of the results of the above calculation.

And the AF calculation unit 34d performs focus detection processing on the basis of the second signal data from the second processing unit 152, and outputs a drive signal for shifting the focusing lens of the image capturing optical system 31 to a focusing position on the basis of the results of this calculation.

Figure 27:
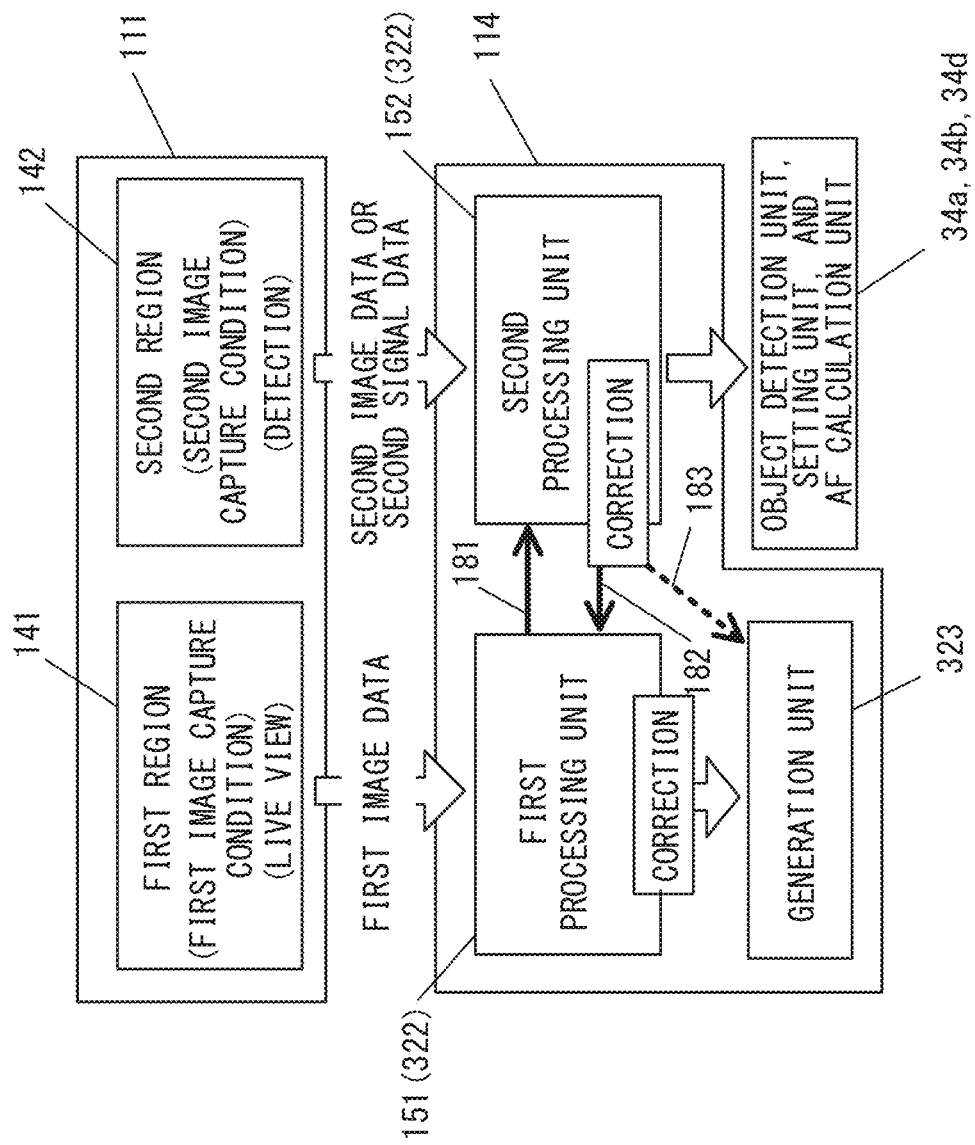
FIG. 27 is another figure in which processing of first image data and processing of second image data according to Variant Embodiment #13 are schematically shown.

2. With reference to FIG. 27, another example will now be explained for the case in which the first image capture conditions set for the first region are different for different areas of the image capturing screen, while the second image capture conditions set for the second region are the same over the entire second region of the image capturing screen. FIG. 27 is a figure schematically showing the processing of the first image data and the second image data.

The first image data captured under the first image capture conditions, which are different according to the areas of the image capturing screen, is outputted from each pixel included in the first region 141, and the second image data captured under the second image capture conditions, which are the same over the entire second region of the image capturing screen, is outputted from each pixel included in the second region 142. The first image data from the first region 141 is outputted to the first processing unit 151. In a similar manner, the second image data from the second region 142 is outputted to the second processing unit 152.

As described above, in this example, the first image capture conditions that are set for the first region vary, depending upon the areas on the image capturing screen. In other words, depending upon the partial region within the first region, the first image capture conditions are different. If different first image capture conditions are set for a pixel for attention P and for a reference pixel even though they are both positioned within the first region, then the first processing unit 151 performs similar correction processing to the correction processing described in 1-2 above upon the first image data from that reference pixel. It should be understood that, if the first image capture conditions that are set for the pixel for attention P and for the reference pixel are the same, then the first processing unit 151 does not perform any correction processing upon the first image data from that reference pixel.

In this example, since the second image capture conditions that are set for the second region of the image capturing screen are the same over the entire extent of the second region, accordingly the second processing unit 152 does not perform correction upon the second image data to be employed in focus detection processing, subject detection processing, and exposure calculation processing. However, for the second image data that is employed for interpolation of the first image data, the second processing unit 152 does perform correction processing in order to reduce variance in the image data due to the difference in the image capture conditions for the pixel for attention P that is included in the first region and the second image capture conditions. It should be understood that the second processing unit 152 outputs the second image data after correction processing to the first processing unit 151. Moreover, it should be understood that it would also be acceptable for the second processing unit 152 to output the second image data after correction processing to the generation unit 323.

The second processing unit 152 receives from the first processing unit 151, for example, information 181 relating to the image capture conditions for the pixel for attention P that is included in the first region, required for reducing variance in the image data caused by the different image capture conditions.

On the basis of the first image data from the first processing unit 151 and the second image data that has been subjected to correction processing by the second processing unit 152, the generation unit 323 performs image processing such as pixel defect correction processing, color interpolation processing, contour emphasis processing, noise reduction processing, and so on, and outputs the image data after this image processing.

The object detection unit 34a performs processing to detect the photographic subject elements on the basis of the second image data from the second processing unit 152, and outputs the results of this detection.

On the basis of the second image data from the second processing unit 152, the setting unit 34b performs calculation processing of the image capture conditions such as for exposure calculation processing and so on, divides the image capturing screen of the image capturing unit 32 into a plurality of regions that include the photographic subject elements that have been detected, and then resets the image capture conditions for this plurality of regions on the basis of the results of the above calculation.

And the AF calculation unit 34d performs focus detection processing on the basis of the second signal data from the second processing unit 152, and outputs a drive signal for shifting the focusing lens of the image capturing optical system 31 to a focusing position on the basis of the results of this calculation.

Figure 28:
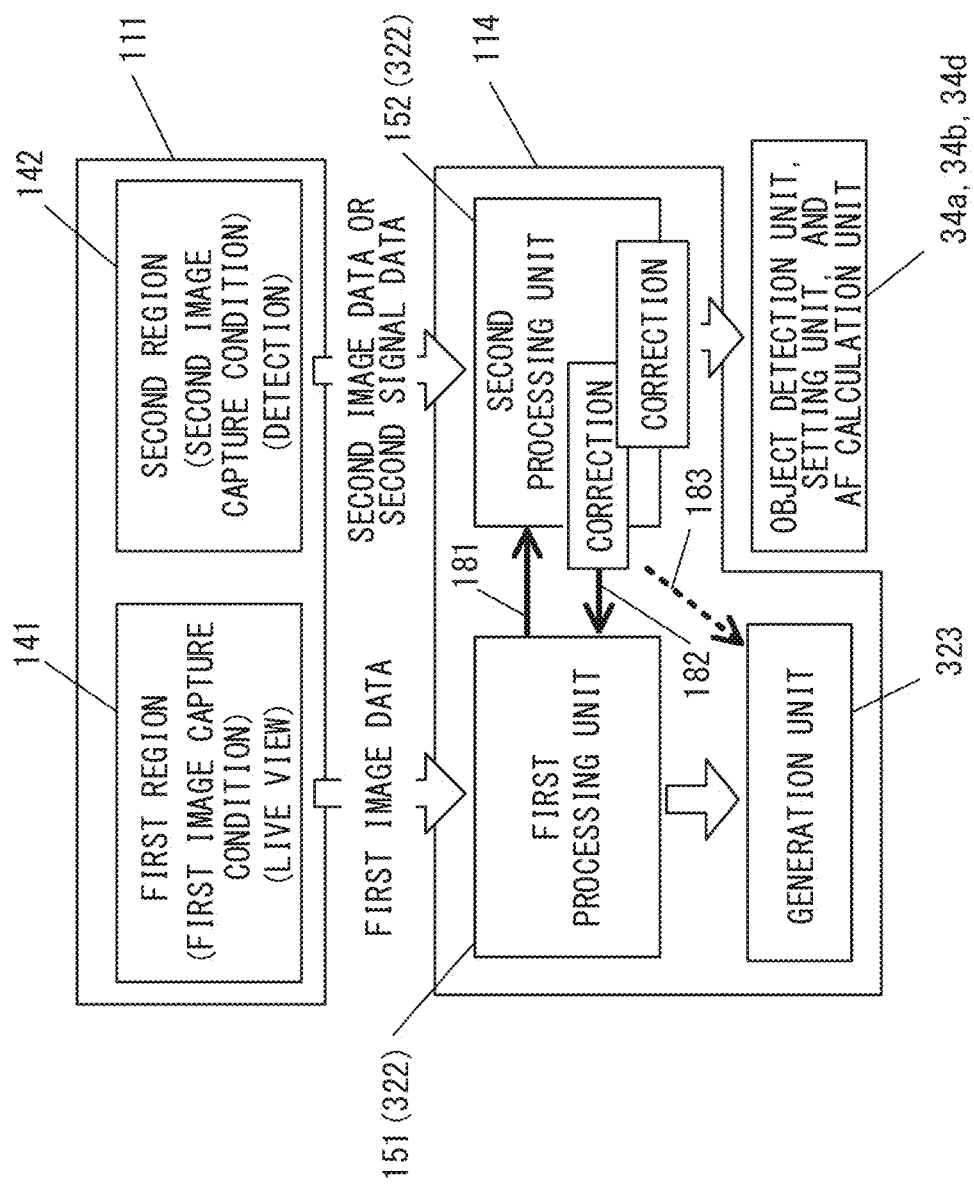
FIG. 28 is yet another figure in which processing of first image data and processing of second image data according to Variant Embodiment #13 are schematically shown.

3. With reference to FIG. 28, yet another example will now be explained for the case in which the first image capture conditions that are set for the first region are the same over the entire first region of the image capturing screen, while the second image capture conditions set for the second region are different for different areas of the image capturing screen. FIG. 28 is a figure schematically showing the processing of the first image data and the second image data.

The first image data captured under the first image capture conditions, which are the same over the entire first region of the image capturing screen, is outputted from each pixel included in the first region 141, and the second image data captured under the second image capture conditions, which are different depending upon the area of the image capturing screen, is outputted from each pixel included in the second region 142. The first image data from the first region 141 is outputted to the first processing unit 151. In a similar manner, the second image data from the second region 142 is outputted to the second processing unit 152.

Since, in this example, the first image capture conditions that are set for the first region of the image capturing screen are the same over the entire first region, accordingly the first processing unit 151 does not perform any correction upon the first image data from the reference pixels that are included in the first region.

Furthermore, in this example, since the second image capture conditions that are set for the second region are different for different areas of the image capturing screen, accordingly the second processing unit 152 performs the following correction processing upon the second image data. For example, the second processing unit 152 performs correction processing upon second image data, among the second image data, that has been captured under certain image conditions so as to reduce the difference between the second image data after the correction processing and the second image data that has been captured under other image capture conditions that are different from the abovementioned certain image conditions.

In this example, the second processing unit 152 performs correction processing upon the second image data that is employed for interpolation of the first image data, so as to reduce variance in the image data caused by the difference between the image capture conditions for the pixel for attention P that is included in the first region and the second image capture conditions. The second processing unit 152 outputs the second image data after correction processing to the first processing unit 151. It should be understood that it would also be acceptable for the second processing unit 152 to output the second image data after correction processing to the generation unit 323. Moreover it should be noted that, in FIG. 26, the output of the second image data after correction processing to the first processing unit 151 is denoted by the reference symbol 182, while the output of the second image data after correction processing to the generation unit 323 is denoted by the reference symbol 183.

The second processing unit 152 receives from the first processing unit 151, for example, information 181 relating to the image capture conditions for the pixel for attention P that is included in the first region, required for reducing variance in the image data due to the different image capture conditions.

On the basis of the first image data from the first processing unit 151 and the second image data that has been subjected to correction processing by the second processing unit 152, the generation unit 323 performs image processing such as pixel defect correction processing, color interpolation processing, contour emphasis processing, noise reduction processing, and so on, and outputs the image data after image processing.

The object detection unit 34a performs processing to detect the elements of the photographic subject on the basis of the second image data that has been captured under the certain image capture conditions and that has been subjected to correction processing by the second processing unit 152, and the second image data that has been captured under other image capture conditions, and outputs the results of this detection.

On the basis of the second image data that has been captured under the certain image capture conditions and that has been subjected to correction processing by the second processing unit 152, and the second image data that has been captured under the other processing conditions, the setting unit 34b performs calculation processing for image capture conditions such as exposure calculation processing and so on. The setting unit 34b divides the image capturing screen of the image capturing unit 32 into a plurality of regions that include the photographic subject elements that have been detected, and then resets the image capture conditions for this plurality of regions on the basis of the results of the above calculation.

And the AF calculation unit 34d performs focus detection processing on the basis of the second signal data that has been captured under the certain image capture conditions and that has been subjected to correction processing by the second processing unit 152, and the second signal data that has been captured under the other image capture conditions; and then the AF calculation unit 34d outputs a drive signal for shifting the focusing lens of the image capturing optical system 31 to its focusing position on the basis of the results of this calculation.

Figure 29:
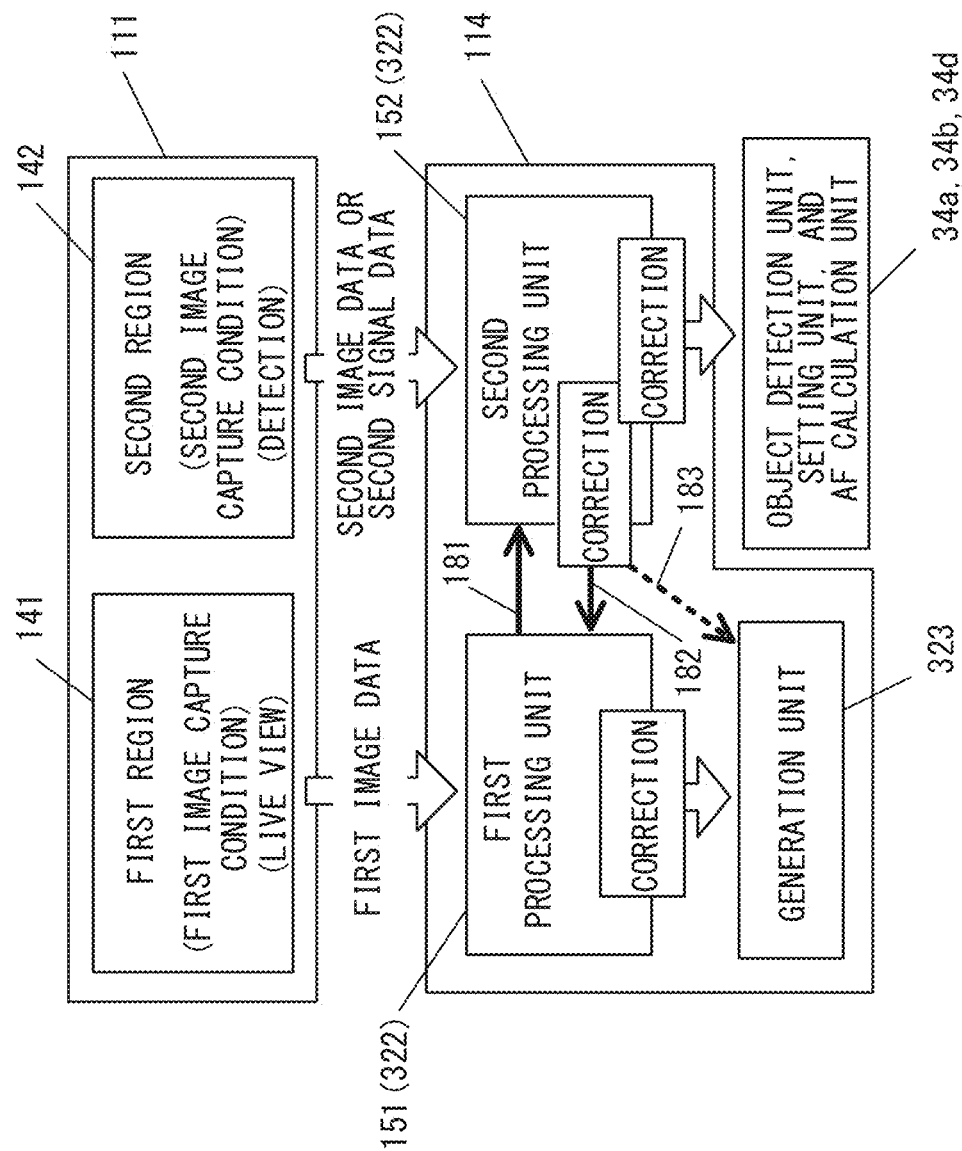
FIG. 29 is still another figure in which processing of first image data and processing of second image data according to Variant Embodiment #13 are schematically shown.

4. With reference to FIG. 29, still yet another example will now be explained for the case in which the first image capture conditions set for the first region are different for different areas of the image capturing screen, and also the second image capture conditions set for the second region are different for different areas of the image capturing screen. FIG. 29 is a figure schematically showing the processing of the first image data and the second image data.

The first image data captured under the first image capture conditions, which vary according to the areas of the image capturing screen, is outputted from each pixel included in the first region 141, and the second image data captured under the second image capture conditions, which also vary according to the areas of the image capturing screen, is outputted from each pixel included in the second region 142. The first image data from the first region 141 is outputted to the first processing unit 151. In a similar manner, the second image data from the second region 142 is outputted to the second processing unit 152.

As described above, in this example, the first image capture conditions that are set for the first region of the image capturing screen differ according to the areas of the image capturing screen. In other words, the first imaging conditions are different for different partial regions within the first region. If the first image conditions that are set for the pixel for attention P and for a reference pixel both of which are positioned within the first region are different, then the first processing unit 151 performs correction processing upon the first image data from that reference pixel, similar to the correction processing described in 1-2 above. Furthermore, it should be understood that, if the first image capture conditions that are set for the pixel for attention P and for a reference pixel are the same, then the first processing unit 151 does not perform any correction processing upon the first image data from that reference pixel.

Furthermore, in this example, since the second image capture conditions that are set for the second region differ according to the areas of the image capturing screen, accordingly the second processing unit 152 performs correction processing as in the case 3, described above.

On the basis of the first image data from the first processing unit 151 and the second image data that has been subjected to correction processing by the second processing unit 152, the generation unit 323 performs image processing such as pixel defect correction processing, color interpolation processing, contour emphasis processing, noise reduction processing, and so on, and then outputs the image data after image processing.

On the basis of the second image data that has been captured under certain image capture conditions and the second image data that has been captured under other image capture conditions, that both have been subjected to correction processing by the second processing unit 152, the object detection unit 34a performs processing for detection of the photographic subject elements, and outputs the result of this detection.

On the basis of the second image data that has been captured under the certain image capture conditions and the second image data that has been captured under the other image capture conditions, that both have been subjected to correction processing by the second processing unit 152, the setting unit 34b performs calculation processing for the image capture conditions such as exposure calculation processing and so on. And, the setting unit 34b divides the image capturing screen of the image capturing unit 32 into a plurality of regions that include the photographic subject elements that have been detected, and then resets the image capture conditions for this plurality of regions on the basis of the results of the above calculation.

And the AF calculation unit 34d performs focus detection processing on the basis of the second signal data that has been captured under the certain image capture conditions and the second signal data that has been captured under the other image conditions, that both have been subjected to correction processing by the second processing units 152; and then the AF calculation unit 34d outputs a drive signal for shifting the focusing lens of the image capturing optical system 31 to its focusing position on the basis of the results of this calculation.

Variant Embodiment #14

In the second embodiment described above, one of the correction units 322 corresponds to one of the blocks 111a (i.e. to a unit section). However, it would also be acceptable to arrange for one of the correction units 322 to correspond to a compound block (i.e. to a compound section) that incorporates a plurality of the blocks 111a (i.e. a plurality of unit sections). In this case, the correction unit 322 sequentially corrects the image data from the pixels belonging to the plurality of blocks 111a included in the compound section. Even when a plurality of the correction units 322 are provided to respectively correspond to the compound blocks each having a plurality of the blocks 111a, since it is possible to perform the correction processing of the image data with this plurality of correction units 322 in parallel, accordingly it is possible to alleviate the burden of processing upon the correction units 322, and it is possible to generate, in a short time period, an appropriate image from the image data generated for the various regions for which the image capture conditions are different.

Variant Embodiment #15

In the second embodiment described above, the generation unit 323 was provided internally to the image capturing unit 32A. However, it would also be possible to provide the generation unit 323 externally to the image capturing unit 32A. Even when the generation unit 323 is provided externally to the image capturing unit 32A, it is still possible to achieve similar advantageous operational effects to the advantageous operational effects described above.

Variant Embodiment #16

In the second embodiment described above, in addition to the backside illumination type image capturing chip 111, the signal processing chip 112, and the memory chip 113, the laminated type imaging element 100A was further provided with the image processing chip 114 that performed the pre-processing and the image processing described above. However, it would also be acceptable not to provide the image processing chip 114 to the laminated type imaging element 100A, but rather to provide the image processing unit 32c to the signal processing chip 112.

Variant Embodiment #17

In the second embodiment described above, the second processing unit 152 receives from the first processing unit 151 information relating to the first capture conditions, required for reducing variance in the image data due to the difference in the image capture conditions. Additionally, the first processing unit 151 receives from the second processing unit 152 information relating to the second capture conditions, required for reducing variance in the image data due to the difference in the image capture conditions. However, it would also be acceptable for the second processing unit 152 to receive from the drive unit 32b or from the control unit 34 information relating to the first image capture conditions, required for reducing variance in the image data caused by in the different image capture conditions. In a similar manner, it would also be acceptable for the first processing unit 151 to receive from the drive unit 32b or from the control unit 34 information relating to the second image capture conditions, required for reducing variance in the image data due to the difference in the image capture conditions.

It should be understood that it would also be acceptable to combine the embodiments and variant embodiments described above in various ways.

While various embodiments and variant embodiments have been explained in the above description, the present invention is not to be considered as being limited to the details thereof. Other forms that are considered to come within the scope of the technical concept of the present invention are also to be understood as being included within the range of the present invention.

Image capturing devices, image processing devices, and display devices such as described below are also included in the embodiments and variant embodiments described above.

(1) An image capturing device, comprising: an image capturing element having a first image capturing region that captures an image of a photographic subject and outputs a first signal, and a second image capturing region that captures an image of the photographic subject and outputs a second signal; a setting unit that sets an image capture condition for the first image capturing region to an image capture condition that is different from an image capture condition for the second image capturing region; a correction unit that performs correction upon the second signal outputted from the second image capturing region, for employment in interpolation of the first signal outputted from the first image capturing region; and a generation unit that generates an image of the photographic subject that has been captured by the first image capturing region by employing a signal generated by interpolating the first signal by the second signal as corrected by the correction unit.

(2) The image capturing device as described in (1) above, wherein, as correction for employment in interpolation of the first signal outputted from the first image capturing region, the correction unit performs correction upon the second signal outputted from the second image capturing region on the basis of the image capture condition for the first image capturing region and the image capture condition for the second image capturing region.

(3) The image capturing device as described in (2) above, wherein, as correction for employment in interpolation of the first signal outputted from the first image capturing region, the correction unit performs correction upon the second signal outputted from the second image capturing region on the basis of a difference between the image capture condition for the first image capturing region and the image capture condition for the second image capturing region.

(4) The image capturing device as described in (3) above, wherein: the image capture condition for the first image capturing region and the image capture condition for the second image capturing region are exposure conditions; and the correction unit performs correction upon the second signal outputted from the second image capturing region on the basis of a difference between the exposure condition for the first image capturing region and the exposure condition for the second image capturing region.

(5) The image capturing device as described in (4) above, wherein: the exposure condition for the first image capturing region and the exposure condition for the second image capturing region are charge accumulation times of light reception units of the image capturing portions; and the correction unit performs correction upon the second signal outputted from the second image capturing region on the basis of the ratio between the charge accumulation time for the first image capturing region and the charge accumulation time for the second image capturing region.

(6) The image capturing device as described in (4) above, wherein: the exposure condition for the first image capturing region and the exposure condition for the second image capturing region are image capture sensitivities of the image capturing regions; and the correction unit performs correction upon the second signal outputted from the second image capturing region on the basis of the logarithmic ratio of the image capture sensitivity for the first image capturing region and the image capture sensitivity for the second image capturing region.

(7) The image capturing device as described in (1) above, wherein, as correction for employment in interpolation of the first signal outputted from the first image capturing region, the correction unit performs correction upon the second signal outputted from the second image capturing region on the basis of the image capture condition for the first image capturing region or the image capture condition for the second image capturing region.

(8) The image capturing device as described in (1) above, wherein: the correction unit corrects the first signal outputted from the first image capturing region, and performs correction upon the second signal outputted from the second image capturing region for employment in interpolation of the corrected first signal; and the generation unit generates an image of the photographic subject captured by the first image capturing region by employing a signal generated by interpolating the corrected first signal by the second signal as corrected by the correction unit.

(9) The image capturing device as described in any one of (1) through (8) above, wherein: the first image capturing region photoelectrically converts light of a first color among the light from the photographic subject and outputs the first signal; and the second image capturing region photoelectrically converts light, among the light from the photographic subject, of a second color that is different from the first color, and outputs the second signal.

(10) An image capturing device, comprising: an image capturing element having a first image capturing region that captures an image of a photographic subject and outputs a first signal, and a second image capturing region that captures an image of the photographic subject and outputs a second signal; a setting unit that sets an image capture condition for the first image capturing region to an image capture condition that is different from an image capture condition for the second image capturing region; a correction unit that performs correction upon the second signal outputted from the second image capturing region, for employment in interpolation of a pixel in the first image capturing region that outputs the first signal; and a generation unit that generates an image of the photographic subject that has been captured by the first image capturing region by employing a signal generated by interpolating the pixel that outputs the first signal with the second signal corrected by the correction unit.

(11) The image capturing device as described in (10) above, wherein: a pixel of the first image capturing region that outputs the first signal photoelectrically converts light of a first color, among the light from the photographic subject, and outputs the first signal; and the second image capturing region photoelectrically converts light, among the light from the photographic subject, of a second color that is different from the first color, and outputs the second signal.

(12) An image capturing device, comprising: an image capturing element having a first image capturing region that captures an image of a photographic subject and outputs a first signal, and a second image capturing region that captures an image of the photographic subject and outputs a second signal; a setting unit that sets an image capture condition for the first image capturing region to an image capture condition that is different from an image capture condition for the second image capturing region; a correction unit that performs correction upon the second signal outputted from the second image capturing region, for reducing noise included in the first signal outputted from the first image capturing region; and a generation unit that reduces noise included in the first signal by employing the second signal as corrected by the correction unit, and generates an image of the photographic subject that has been captured by the first image capturing region.

(13) The image capturing device as described in (12) above, wherein, as correction for reducing noise included in the first signal outputted from the first image capturing region, the correction unit performs correction upon the second signal outputted from the second image capturing region on the basis of the image capture condition for the first image capturing region or the image capture condition for the second image capturing region.

(14) The image capturing device as described in (12) above, wherein, as correction for reducing noise included in the first signal outputted from the first image capturing region, the correction unit performs correction upon the second signal outputted from the second image capturing region on the basis of the image capture condition for the first image capturing region and the image capture condition for the second image capturing region.

(15) The image capturing device as described in (14) above, wherein, as correction for employment for interpolation of the first signal outputted from the first image capturing region, the correction unit performs correction upon the second signal outputted from the second image capturing region on the basis of the difference between the image capture condition for the first image capturing region and the image capture condition for the second image capturing region.

(16) The image capturing device as described in (15) above, wherein: the image capture condition for the first image capturing region and the image capture condition for the second image capturing region are exposure conditions; and the correction unit performs correction upon the second signal outputted from the second image capturing region on the basis of the difference between the exposure condition for the first image capturing region and the exposure condition for the second image capturing region.

(17) The image capturing device as described in (16) above, wherein: the exposure condition for the first image capturing region and the exposure condition for the second image capturing region are charge accumulation times of light reception units of the image capturing regions; and the correction unit performs correction upon the second signal outputted from the second image capturing region on the basis of the ratio between the charge accumulation time for the first image capturing region and the charge accumulation time for the second image capturing region.

(18) The image capturing device as described in (16) above, wherein: the exposure condition for the first image capturing region and the exposure condition for the second image capturing region are image capturing sensitivities of the image capturing regions; and the correction unit performs correction upon the second signal outputted from the second image capturing region on the basis of the logarithmic ratio of the image capture sensitivity for the first image capturing region and the image capture sensitivity for the second image capturing region.

(19) The image capturing device as described in (15) above, wherein: the correction unit corrects the first signal outputted from the first image capturing region, and performs correction upon the second signal outputted from the second image capturing region for reducing noise included in the first signal after correction; and the generation unit generates an image of the photographic subject captured by the first image capturing region by reducing noise included in the corrected first signal by the second signal as corrected by the correction unit.

(20) An image capturing device, comprising: an image capturing element having a first image capturing region that captures an image of a photographic subject and outputs a first signal, and a second image capturing region that captures an image of the photographic subject and outputs a second signal; a setting unit that sets an image capture condition for the first image capturing region to an image capture condition that is different from an image capture condition for the second image capturing region; a correction unit that performs correction upon the second signal outputted from the second image capturing region, for employment in image processing of the first signal outputted from the first image capturing region; and a generation unit that generates an image of the photographic subject that has been captured by the first image capturing region by image processing the first signal by employing the second signal as corrected by the correction unit.

(21) An image capturing device, comprising: an image capturing element having a first image capturing region that captures an image of a photographic subject and outputs a first signal, and a second image capturing region that captures an image of the photographic subject and outputs a second signal; a setting unit that sets an image capture condition for the first image capturing region and an image capture condition for the second image capturing region; a processing unit that, as processing to interpolate the first signal by employing the second signal outputted from the second image capturing region, performs different processing by using the image capture condition set for the second image capturing region by the setting unit; and a generation unit that generates an image of the photographic subject that has been captured by the first image capturing region, by employing a signal generated by interpolating the first signal by the processing unit.

(22) The image capturing device as described in (21) above, wherein, as processing to interpolate the first signal by employing the second signal outputted from the second image capturing region, the processing unit performs different processing when a first image capture condition is set by the setting unit for the first image capturing region and the second image capturing region, and when the first image capture condition is set for the first image capturing region and a second image capture condition that is different from the first image capture condition is set for the second image capturing region.

(23) The image capturing device as described in (22) above, wherein: the processing unit comprises a correction unit that, when the first image capture condition is set by the setting unit for the first image capturing region, and a second image capture condition that is different from the first image capture condition is set for the second image capturing region, performs correction upon the second signal outputted from the second image capturing region for employment in interpolation of the first signal outputted from the first image capturing region; and the generation unit generates an image of the photographic subject captured by the first image capturing region, by employing a signal generated by interpolating the first signal according to the second signal as corrected by the correction unit, as a signal resulted from the interpolation of the first signal by the processing unit.

(24) The image capturing device as described in (22) above, wherein, when the first image capture condition has been set by the setting unit for the first image capturing region and for the second image capturing region, the generation unit generates an image of the photographic subject captured by the first image capturing region, by employing a signal generated by interpolating the first signal according to the second signal, as a signal resulted from the interpolation of the first signal by the processing unit.

(25) An image capturing device, comprising: an image capturing element having a first image capturing region that captures an image of a photographic subject and outputs a first signal, and a second image capturing region that captures an image of the photographic subject and outputs a second signal; a setting unit that sets an image capture condition for the first image capturing region to an image capture condition that is different from an image capture condition for the second image capturing region; a correction unit that corrects the first signal outputted from the first image capturing region, and performs correction upon the second signal outputted from the second image capturing region, for employment in interpolation of the corrected first signal; and a generation unit that generates an image of the photographic subject that has been captured by the first image capturing region by employing a signal generated by interpolating the first signal as corrected by the correction unit, according to the second signal as corrected by the correction unit.

(26) The image capturing device as described in (25) above, wherein the correction unit performs correction upon the first signal on the basis of a set value that is different from a set value for the image capture condition for the first image capturing region and from a set value for the image capture condition for the second image capturing region, and the set value for the image capture condition for the first image capturing region, and performs correction upon the second signal for employment in interpolation of the corrected first signal, on the basis of the set value for the image capture condition for the second image capturing region, and the different set value.

(27) The image capturing device as described in (25) above, wherein the correction unit corrects the first signal on the basis of the difference between the set value for the image capture condition for the first image capturing region and the different set value, and corrects the second signal on the basis of the difference between the set value for the image capture condition for the second image capturing region and the different set value.

(28) The image capturing device as described in (27) above, wherein the correction unit corrects the first signal on the basis of the ratio of the different set value to the set value for the image capture condition for the first image capturing region, and corrects the second signal on the basis of the ratio of the different set value to the set value for the image capture condition for the second image capturing region.

(29) An image capturing device, comprising: an image capturing element having a first image capturing region that captures an image of a photographic subject and outputs a first signal, and a second image capturing region that captures an image of the photographic subject and outputs a second signal; a setting unit that sets an image capture condition for the first image capturing region to an image capture condition that is different from an image capture condition for the second image capturing region; a correction unit that corrects the first signal outputted from the first image capturing region, and performs correction upon the second signal outputted from the second image capturing region to be employed in interpolation of a pixel that outputs the corrected first signal; and a generation unit that generates an image of the photographic subject that has been captured by the first image capturing region by employing a signal generated by interpolating the pixel that outputs the first signal, that is corrected according to the second signal as corrected by the correction unit.

(30) The image capturing device as described in (29) above, wherein: a pixel of the first image capturing region that outputs the first signal photoelectrically converts light of a first color, among the light from the photographic subject, and outputs the first signal; and the second image capturing region photoelectrically converts light of a second color, among the light from the photographic subject, that is different from the first color, and outputs the second signal.

(31) An image processing device, comprising: a correction unit that, for employment in interpolation of a first signal outputted from a first image capturing region of an image capturing element that captures an image of a photographic subject, performs correction upon a second signal outputted from a second image capturing region of the image capturing element for which an image capture condition is different from an image capture condition for the first image capturing region; and a generation unit that generates an image of the photographic subject that has been captured by the first image capturing region by employing a signal generated by interpolating the first signal according to the second signal as corrected by the correction unit.

(32) An image processing device, comprising: a correction unit that, in order to reduce noise included in a first signal outputted from a first image capturing region of an image capturing element that captures an image of a photographic subject, performs correction upon a second signal outputted from a second image capturing region of the image capturing element for which an image capture condition is different from an image capture condition for the first image capturing region; and a generation unit that generates an image of the photographic subject that has been captured by the first image capturing region, in which noise included in the first signal is reduced by employing the second signal as corrected by the correction unit.

(33) A display device, comprising: a correction unit that, for employment in interpolation of a first signal outputted from a first image capturing region of an image capturing element that captures an image of a photographic subject, performs correction upon a second signal outputted from a second image capturing region of the image capturing element for which an image capture condition is different from an image capture condition for the first image capturing region; and a display unit that displays an image of the photographic subject that has been captured by the first image capturing region, generated by employing a signal generated by interpolating the first signal according to the second signal as corrected by the correction unit.

(34) A display device, comprising: a correction unit that, for reducing noise included in a first signal outputted from a first image capturing region of an image capturing element that captures an image of a photographic subject, performs correction upon a second signal outputted from a second image capturing region of the image capturing element for which an image capture condition is different from an image capture condition for the first image capturing region; and a display unit that displays an image of the photographic subject that has been captured by the first image capturing region, generated by reducing noise included in the first signal by employing the second signal as corrected by the correction unit.

(35) An image capturing device, comprising: an image capturing unit having a first region that captures incident light, and a second region, different from the first region, that captures incident light; a setting unit that sets an image capture condition for the first region so as to be different from an image capture condition for the second region; a correction unit that corrects first image data generated by capturing light incident upon the first region under the image capture condition set by the setting unit, on the basis of the image capture condition for the second region set by the setting unit; and a generation unit that generates an image according to the first image data as corrected by the correction unit, and second image data generated by capturing light incident upon the second region.

(36) An image capturing device, comprising: an image capturing unit having a first region that captures incident light, and a second region, different from the first region, that captures incident light; a setting unit that sets an image capture condition for the first region so as to be different from an image capture condition for the second region; a correction unit that corrects first image data generated by capturing light incident upon the first region under the image capture condition set by the setting unit on the basis of the image capture condition for the second region set by the setting unit, and that corrects second image data generated by capturing light incident upon the second region under the image capture condition set by the setting unit on the basis of the image capture condition for the first region set by the setting unit; and a generation unit that generates an image according to the first image data as corrected by the correction unit, and the second image data as corrected by the correction unit.

(37) An image processing device, comprising: a setting unit that sets an image capture condition for a first region of an image capturing unit so as to be different from an image capture condition for a second region of the image capturing unit; a correction unit that corrects first image data generated by capturing light incident upon the first region under the image capture condition set by the setting unit, on the basis of the image capture condition for the second region set by the setting unit; and a generation unit that generates an image from the first image data as corrected by the correction unit, and second image data generated by capturing light incident upon the second region.

(38) An image processing device, comprising: a setting unit that sets an image capture condition for a first region of an image capturing unit so as to be different from an image capture condition for a second region of the image capturing unit; a correction unit that corrects first image data generated by capturing light incident upon the first region under the image capture condition set by the setting unit on the basis of the image capture condition for the second region set by the setting unit, and corrects second image data generated by capturing light incident upon the second region under the image capture condition set by the setting unit on the basis of the image capture condition for the first region set by the setting unit; and a generation unit that generates an image from the first image data as corrected by the correction unit, and second image data generated by capturing light incident upon the second region.

(39) A display device, comprising: a setting unit that sets an image capture condition for a first region of an image capturing unit so as to be different from an image capture condition for a second region of the image capturing unit; a correction unit that corrects first image data generated by capturing light incident upon the first region under the image capture condition set by the setting unit, on the basis of the image capture condition for the second region set by the setting unit; and a display unit that displays an image generated from the first image data as corrected by the correction unit, and second image data generated by capturing light incident upon the second region.

(40) A display device, comprising: a setting unit that sets an image capture condition for a first region of an image capturing unit so as to be different from an image capture condition for a second region of the image capturing unit; a correction unit that corrects first image data generated by capturing light incident upon the first region under the image capture condition set by the setting unit on the basis of the image capture condition for the second region set by the setting unit, and corrects second image data generated by capturing light incident upon the second region under the image capture condition set by the setting unit on the basis of the image capture condition for the first region set by the setting unit; and a display unit that displays an image generated from the first image data as corrected by the correction unit, and second image data generated by capturing light incident upon the second region.

Furthermore, image capturing devices, image processing devices, and display devices such as described below are also included in the embodiments and variant embodiments described above.

(1) An image capturing device, comprising: an image capturing unit having a first region that captures incident light, and a second region, different from the first region, that captures incident light; a setting unit that sets an image capture condition for the first region so as to be different from an image capture condition for the second region; a correction unit that corrects first image data generated by capturing light incident upon the first region under the image capture condition set by the setting unit, on the basis of the image capture condition for the second region set by the setting unit; and a generation unit that generates an image from the first image data as corrected by the correction unit, and second image data generated by capturing light incident upon the second region.

(2) The image capturing device as described in (1) above, wherein the correction unit corrects the first image data so that the difference between the value of the first image data and the value of the second image data becomes smaller.

(3) The image capturing device as described in (1) or (2) above, wherein the correction unit corrects the first image data on the basis of the difference between the image capture condition for the first region and the image capture condition for the second region.

(4) The image capturing device as described in any one of (1) through (3) above, wherein the generation unit performs image processing upon the second image data by employing the first image data as corrected by the correction unit.

(5) The image capturing device as described in any one of (1) through (4) above, wherein the generation unit changes the value of the second image data by employing the value of the first image data as corrected by the correction unit.

(6) The image capturing device as described in any one of (1) through (5) above, wherein the generation unit replaces the value of the second image data with the value of the first image data as corrected by the correction unit.

(7) The image capturing device as described in any one of (1) through (6) above, wherein the generation unit generates third image data from the second image data and the first image data as corrected by the correction unit.

(8) The image capturing device as described in any one of (1) through (7) above, wherein the setting unit, as the image capture condition for the first region of the image capturing unit, sets an image capture sensitivity to a first image capture sensitivity, and, as the image capture condition for the second region of the image capturing unit, sets an image capture sensitivity to a second image capture sensitivity that is different from the first image capture sensitivity; and the correction unit corrects the first image data generated by image capture under the image capture condition set by the setting unit, on the basis of the difference between the first image capture sensitivity and the second image capture sensitivity.

(9) An image capturing device, comprising: an image capturing unit having a first region that captures incident light, and a second region, different from the first region, that captures incident light; a setting unit that sets an image capture condition for the first region so as to be different from an image capture condition for the second region; a correction unit that corrects first image data generated by capturing light incident upon the first region under the image capture condition set by the setting unit on the basis of the image capture condition for the second region set by the setting unit, and that corrects second image data generated by capturing light incident upon the second region under the image capture condition set by the setting unit on the basis of the image capture condition for the first region set by the setting unit; and a generation unit that generates an image from the first image data as corrected by the correction unit, and the second image data as corrected by the correction unit.

(10) The image capturing device as described in (9) above, wherein the correction unit corrects the first image data and the second image data so that the difference between the value of the first image data and the value of the second image data becomes smaller.

(11) The image capturing device as described in (10) above, wherein the correction unit performs correction so as to cause the value of the first image data to increase and so as to cause the value of the second image data to decrease.

(12) The image capturing device as described in any one of (9) through (11) above, wherein the correction unit corrects the first image data on the basis of the image capture condition for the first region and the image capture condition for the second region set by the setting unit, and corrects the second image data on the basis of the image capture condition for the first region and the image capture condition for the second region.

(13) The image capturing device as described in (12) above, wherein the correction unit corrects the first image data and the second image data on the basis of the difference between the image capture condition for the first region and the image capture condition for the second region.

(14) The image capturing device as described in any one of (9) through (13) above, wherein the generation unit performs image processing upon the second image data as corrected by the correction unit, by employing the first image data as corrected by the correction unit.

(15) The image capturing device as described in any one of (9) through (14) above, wherein the generation unit corrects the image that has been generated.

(16) An image processing device, comprising: a setting unit that sets an image capture condition for a first region of an image capturing unit so as to be different from an image capture condition for a second region of the image capturing unit; a correction unit that corrects first image data generated by capturing light incident upon the first region under the image capture condition set by the setting unit, on the basis of the image capture condition for the second region set by the setting unit; and a generation unit that generates an image from the first image data as corrected by the correction unit, and second image data generated by capturing light incident upon the second region.

(17) The image processing device as described in (16) above, wherein the correction unit corrects the first image data so that the difference between the value of the first image data and the value of the second image data becomes smaller.

(18) The image processing device as described in (16) or (17) above, wherein the correction unit corrects the first image data on the basis of the difference between the image capture condition for the first region and the image capture condition for the second region.

(19) An image processing device, comprising: a setting unit that sets an image capture condition for a first region of an image capturing unit so as to be different from an image capture condition for a second region of the image capturing unit; a correction unit that corrects first image data generated by capturing light incident upon the first region under the image capture condition set by the setting unit on the basis of the image capture condition for the second region set by the setting unit, and corrects second image data generated by capturing light incident upon the second region under the image capture condition set by the setting unit on the basis of the image capture condition for the first region set by the setting unit; and a generation unit that generates an image from the first image data as corrected by the correction unit, and second image data generated by capturing light incident upon the second region.

(20) The image processing device as described in (19) above, wherein the correction unit corrects the first image data and the second image data so that the difference between the value of the first image data and the value of the second image data becomes smaller.

(21) The image processing device as described in (19) or (20) above, wherein the correction unit corrects the first image data and the second image data on the basis of the difference between the image capture condition for the first region and the image capture condition for the second region.

(22) A display device, comprising: a setting unit that sets an image capture condition for a first region of an image capturing unit so as to be different from an image capture condition for a second region of the image capturing unit; a correction unit that corrects first image data generated by capturing light incident upon the first region under the image capture condition set by the setting unit, on the basis of the image capture condition for the second region set by the setting unit; and a display unit that displays an image generated from the first image data as corrected by the correction unit, and second image data generated by capturing light incident upon the second region.

(23) The display device as described in (22) above, wherein the correction unit corrects the first image data so that the difference between the value of the first image data and the value of the second image data becomes smaller.

(24) The display device as described in (22) or (23) above, wherein the correction unit corrects the first image data on the basis of the difference between the image capture condition for the first region and the image capture condition for the second region.

(25) A display device, comprising: a setting unit that sets an image capture condition for a first region of an image capturing unit so as to be different from an image capture condition for a second region of the image capturing unit; a correction unit that corrects first image data generated by capturing light incident upon the first region under the image capture condition set by the setting unit on the basis of the image capture condition for the second region set by the setting unit, and corrects second image data generated by capturing light incident upon the second region under the image capture condition set by the setting unit on the basis of the image capture condition for the first region set by the setting unit; and a display unit that displays an image generated from the first image data as corrected by the correction unit, and second image data generated by capturing light incident upon the second region.

(26) The display device as described in (25) above, wherein the correction unit corrects the first image data and the second image data so that the difference between the value of the first image data and the value of the second image data becomes smaller.

(27) The display device as described in (25) or (26) above, wherein the correction unit corrects the first image data and the second image data on the basis of the difference between the image capture condition for the first region and the image capture condition for the second region.

(28) The image capturing device as described in any one of (1) through (15) above, wherein: the correction unit comprises a first correction unit that corrects the first image data that has been generated by capturing light incident upon the first region under the image capture condition set by the setting unit, and a second correction unit that corrects the second image data that has been generated by capturing light incident upon the second region under the image capture condition set by the setting unit; the first correction unit corrects the first image data on the basis of the image capture condition for the second region; and the generation unit generates an image from the first image data as corrected by the first correction unit and the second image data.

(29) The image capturing device as described in (28) above, wherein the first correction unit corrects the first image data so that the difference between the value of the first image data and the value of the second image data becomes smaller.

(30) The image capturing device as described in (28) or (29) above, wherein the first correction unit corrects the first image data on the basis of the difference between the image capture condition for the first region and the image capture condition for the second region.

(31) The image capturing device as described in any one of (28) through (30) above, wherein the second correction unit corrects the second image data on the basis of the image capture condition for the first region, and the generation unit generates an image from the first image data as corrected by the first correction unit and the second image data as corrected by the second correction unit.

(32) The image capturing device as described in any one of (28) through (31) above, wherein the second correction unit corrects the second image data according to the first image data, and the generation unit generates an image from the first image data as corrected by the first correction unit and the second image data as corrected by the second correction unit.

(33) The image capturing device as described in any one of (28) through (32) above, wherein the image capturing unit is provided at a first semiconductor substrate, and the first correction unit and the second correction unit are provided at a second semiconductor substrate.

(34) The image capturing device as described in (33) above, wherein the first semiconductor substrate and the second semiconductor substrate are laminated together.

The content of the disclosure of the following base application, upon which priority is claimed, is hereby incorporated herein by reference:

Japanese Patent Application No. 2015-194612 (filed on 30 Sep. 2015).

REFERENCE SIGNS LIST 1, 1C . . . cameras
1B . . . image capturing system
32 . . . image capturing unit
32a, 100 . . . imaging elements
33 . . . image processing unit
33a, 321 . . . input unit
33b, 322 . . . correction units
33c, 323 . . . generation units
34 . . . control unit
34a . . . object detection unit
34b . . . setting unit
34c . . . image capturing control unit
34d . . . AF calculation unit
35 . . . display unit
90 . . . predetermined range
1001 . . . image capturing device
1002 . . . display device
P . . . pixel for attention

The invention claimed is:

1. An image capturing device, comprising:
an image capturing element having a first image capturing region that captures an image of a photographic subject and outputs a first signal, and a second image capturing region that captures an image of the photographic subject and outputs a second signal;
a central processor configured to enable setting of a different image capture condition for the first image capturing region and the second image capturing region; and
an image processor configured to (i) perform correction upon the second signal outputted from the second image capturing region based on the image capture condition for the first image capturing region and the image capture condition for the second image capture region, and (ii) use the second signal upon which the correction has been performed to perform interpolation of the first signal outputted from the first image capturing region.

2. The image capturing device according to claim 1, wherein:
the image processor performs correction upon the second signal outputted from the second image capturing region based on a difference between the image capture condition for the first image capturing region and the image capture condition for the second image capturing region.

3. The image capturing device according to claim 2, wherein:
the image capture condition for the first image capturing region and the image capture condition for the second image capturing region are exposure conditions; and
the image processor performs correction upon the second signal outputted from the second image capturing region based on a difference between the exposure condition for the first image capturing region and the exposure condition for the second image capturing region.

4. The image capturing device according to claim 3, wherein:
the exposure condition for the first image capturing region and the exposure condition for the second image capturing region are charge accumulation times of light reception units of the image capturing regions; and
the image processor performs correction upon the second signal outputted from the second image capturing region based on a ratio between the charge accumulation time for the first image capturing region and the charge accumulation time for the second image capturing region.

5. The image capturing device according to claim 3, wherein:
the exposure condition for the first image capturing region and the exposure condition for the second image capturing region are image capturing sensitivities of the image capturing regions; and
the image processor performs correction upon the second signal outputted from the second image capturing region based on a logarithmic ratio of the image capture sensitivity for the first image capturing region and the image capture sensitivity for the second image capturing region.

6. The image capturing device according to claim 1, wherein:
the image processor performs correction upon the second signal outputted from the second image capturing region based on the image capture condition for the first image capturing region or the image capture condition for the second image capturing region.

7. The image capturing device according to claim 1, wherein:
the image processor corrects the first signal outputted from the first image capturing region, and performs correction upon the second signal outputted from the second image capturing region for employment in interpolation of the corrected first signal.

8. The image capturing device according to claim 1, wherein:
the image processor is further configured to generate an image of the photographic subject that has been captured by the first image capturing region by employing a signal generated by interpolating the first signal according to the second signal as corrected by the image processor.

9. The image capturing device according to claim 1, wherein:
the central processor is further configured to detect a photographic subject an image of which is captured by the first image capturing region by employing a signal generated by interpolating the first signal according to the second signal as corrected by the image processor.

10. The image capturing device according to claim 1, wherein:
the central processor is further configured to control the setting of the image capturing condition set for the first image capturing region by employing a signal generated by interpolating the first signal according to the second signal as corrected by the image processor.

11. The image capturing device according to claim 1, wherein:
the image capturing element captures an image of the photographic subject through a lens that is movable in an optical axis direction of an optical system; and
the central processor is further configured to control drive of the lens according to a focusing state of the optical system detected by employing a signal generated by interpolating the first signal according to the second signal as corrected by the image processor.

12. The image capturing device according to claim 1, wherein:
the first image capturing region photoelectrically converts light of a first color, among light from the photographic subject, and outputs the first signal; and
the second imaging region photoelectrically converts light, among the light from the photographic subject, of a second color that is different from the first color, and outputs the second signal.

13. The image capturing device according to claim 1, wherein:
the central processor, before setting the image capture conditions of the first and second image capturing regions, divides the image capturing element into the first and second image capturing regions based on image data obtained by the image capturing element.

14. An image capturing device, comprising:
an image capturing element having a first image capturing region that captures an image of a photographic subject and outputs a first signal, and a second image capturing region that captures an image of the photographic subject and outputs a second signal;

a central processor configured to enable setting of a different image capture condition for the first image capturing region and the second image capturing region; and an image processor configured to (i) perform correction upon the second signal outputted from the second image capturing region based on the image capturing condition for the first image capturing region or the image capture condition for the second image capturing region, and (ii) use the second signal upon which the correction has been performed to reduce noise included in the first signal outputted from the first image capturing region.

15. The image capturing device according to claim 14, wherein:

the image processor performs correction upon the second signal outputted from the second image capturing region based on the image capture condition for the first image capturing region and the image capture condition for the second image capturing region.

16. The image capturing device according to claim 15, wherein:

the image processor performs correction upon the second signal outputted from the second image capturing region based on a difference between the image capture condition for the first image capturing region and the image capture condition for the second image capturing region.

17. The image capturing device according to claim 16, wherein:

the image capture condition for the first image capturing region and the image capture condition for the second image capturing region are exposure conditions; and the image processor performs correction upon the second signal outputted from the second image capturing region based on a difference between the exposure condition for the first image capturing region and the exposure condition for the second image capturing region.

18. The image capturing device according to claim 17, wherein:

the exposure condition for the first image capturing region and the exposure condition for the second image capturing region are charge accumulation times of light reception units of the image capturing regions; and the image processor performs correction upon the second signal outputted from the second image capturing region based on a ratio between the charge accumulation time for the first image capturing region and the charge accumulation time for the second image capturing region.

19. The image capturing device according to claim 17, wherein:

the exposure condition for the first image capturing region and the exposure condition for the second image capturing region are image capturing sensitivities of the image capturing regions; and the image processor performs correction upon the second signal outputted from the second image capturing region based on a logarithmic ratio of the image capture sensitivity for the first image capturing region and the image capture sensitivity for the second image capturing region.

20. The image capturing device according to claim 14, wherein:

the image processor corrects the first signal outputted from the first image capturing region, and performs correction upon the second signal outputted from the second image capturing region for reducing noise included in the corrected first signal.

21. The image capturing device according to claim 14, wherein:

the image processor is further configured to generate an image of the photographic subject that has been captured by the first image capturing region by employing a signal generated by interpolating the first signal according to the second signal as corrected by the image processor.

22. The image capturing device according to claim 14, wherein:

the central processor is further configured to detect a photographic subject an image of which is captured by the first image capturing region by employing a signal generated by interpolating the first signal according to the second signal as corrected by the image processor.

23. The image capturing device according to claim 14, wherein:

the central processor is further configured to control the setting of the image capturing condition set for the first image capturing region by employing a signal generated by interpolating the first signal according to the second signal as corrected by the image processor.

24. The image capturing device according to claim 14, wherein:

the image capturing element captures an image of the photographic subject through a lens that is movable in an optical axis direction of an optical system; and the central processor is further configured to control drive of the lens according to a focusing state of the optical system detected by employing a signal generated by interpolating the first signal according to the second signal as corrected by the image processor.

25. The image capturing device according to claim 14, wherein:

the first image capturing region photoelectrically converts light of a first color, among light from the photographic subject, and outputs the first signal; and the second imaging region photoelectrically converts light, among the light from the photographic subject, of a second color that is different from the first color, and outputs the second signal.

26. The image capturing device according to claim 14, wherein:

the central processor, before setting the image capture conditions of the first and second image capturing regions, divides the image capturing element into the first and second image capturing regions based on image data obtained by the image capturing element.

* * * * *